(12) United States Patent
Tokura et al.

(10) Patent No.: US 11,237,575 B2
(45) Date of Patent: Feb. 1, 2022

(54) CONTROL APPARATUS FOR LINEAR SOLENOID

(71) Applicant: TOYOTA JIDOSHA KABUSHIKI KAISHA, Toyota (JP)

(72) Inventors: Takaaki Tokura, Nagoya (JP); Katsumi Kono, Toyota (JP); Masato Kaigawa, Toyota (JP); Masato Matsubara, Toyota (JP); Hitoshi Matsunaga, Anjo (JP); Akira Hino, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 16/506,036

(22) Filed: Jul. 9, 2019

(65) Prior Publication Data

US 2020/0019196 A1 Jan. 16, 2020

(30) Foreign Application Priority Data

Jul. 10, 2018 (JP) .............................. JP2018-131133

(51) Int. Cl.
*F16K 31/36* (2006.01)
*G05D 16/20* (2006.01)
*F16H 61/4069* (2010.01)

(52) U.S. Cl.
CPC ..... *G05D 16/2022* (2019.01); *F16H 61/4069* (2013.01); *F16K 31/36* (2013.01)

(58) Field of Classification Search
CPC ............ G05D 16/2022; F16H 61/4069; F16H 61/0251; F16H 61/0009; F16H 61/0267; F16H 61/0276; F16H 59/24; F16H 59/68; F16H 59/36; F16H 2061/0255; F16H 2061/0078; F16H 2061/0279; F16H 2061/0258; F16H 2200/2046; F16H 2200/2069; F16K 31/36; F16K 31/02; F16K 31/12; F16K 31/0675; H01F 2007/1861; H01F 2007/1888; H01F 2007/1866; H01F 7/1844; H01F 7/18; H01F 7/064;

(Continued)

(56) References Cited

U.S. PATENT DOCUMENTS 5,479,803 A 1/1996 Imanari
5,515,272 A * 5/1996 Sakai ................... F16H 61/12
 180/273

(Continued)

FOREIGN PATENT DOCUMENTS

JP H07-154899 A 6/1995
JP H08-328605 A 12/1996

(Continued)

*Primary Examiner* — Craig J Price
*Assistant Examiner* — Andrew J Rost
(74) *Attorney, Agent, or Firm* — Oliff PLC

(57) ABSTRACT

A control apparatus for controlling a linear solenoid by controlling a driving current supplied to the linear solenoid through a feedback control. The feedback control is executed by a feedback control system having parameters that are determined in accordance with an ILQ design method. In a frequency characteristic of a gain of a transfer function representing a ratio of an output to a disturbance in the feedback control system, the gain is lower than 0 [dB] throughout all frequency ranges.

8 Claims, 32 Drawing Sheets

(58) Field of Classification Search
CPC ........ F02D 41/14; F02D 45/00; F02D 41/002; G05B 13/04; F01L 9/20; F01L 9/10
See application file for complete search history.

(56) References Cited

U.S. PATENT DOCUMENTS

| | | |
|---|---|---|
| 5,991,680 A | 11/1999 | Kono et al. |
| 8,843,276 B2* | 9/2014 | Kojo ...................... B62D 5/008 701/41 |
| 8,845,484 B2* | 9/2014 | Kamiya .................. F16D 25/10 477/5 |
| 9,018,870 B2* | 4/2015 | Kobayashi ............ B60W 20/00 318/400.02 |
| 2004/0186637 A1 | 9/2004 | Isogai et al. |
| 2009/0183677 A1* | 7/2009 | Tian .................. H01L 21/67248 118/667 |
| 2009/0222179 A1* | 9/2009 | Zheng ................ G05D 16/2013 701/58 |
| 2010/0163360 A1 | 7/2010 | Fujii et al. |
| 2011/0029220 A1 | 2/2011 | Sasaki et al. |
| 2012/0101641 A1 | 4/2012 | Tani et al. |
| 2012/0138415 A1 | 6/2012 | Yagi |
| 2018/0180194 A1 | 6/2018 | Lee et al. |

FOREIGN PATENT DOCUMENTS

| | | |
|---|---|---|
| JP | 2001-129647 A | 5/2001 |
| JP | 2003-067006 A | 3/2003 |
| JP | 2004-212182 A | 7/2004 |
| JP | 2009-014118 A | 1/2009 |
| JP | 2011-220388 A | 11/2011 |
| JP | 2012-093853 A | 5/2012 |

* cited by examiner

FIG.2

|  |  | CLUTCHES | | | BRAKES | | | ONE-WAY CLUTCHES | | ELECTROMAGNETIC OPENING/ CLOSING VALVES | |
|---|---|---|---|---|---|---|---|---|---|---|---|
|  |  | C1 | C2 | C3 | B1 | B2 | B3 | FC1 | FC2 | SV1 | SV2 |
|  | P |  |  |  |  |  |  |  |  | ○ | ○ |
|  | R |  |  | ○ |  | ○ |  |  |  | ○ | ○ |
|  | N |  |  |  |  |  |  |  |  | ○ | ○ |
| D | 1ST | ○ |  |  |  |  |  |  | ○ | ○ | ○ |
|  | 2ND | ○ |  |  |  | ○ |  | ○ |  | ○ |  |
|  | 3RD | ○ | ○ |  |  | ○ |  |  |  |  |  |
|  | 4TH |  | ○ |  | ○ | ○ |  |  |  |  | ○ |
| 2 | 1ST | ○ |  |  |  |  |  |  | ○ | ○ | ○ |
|  | 2ND | ○ |  |  | ○ | ○ |  | ○ |  | ○ |  |
|  | 3RD | ○ | ○ |  |  | ○ |  |  |  |  |  |
| L | 1ST | ○ |  |  |  |  | ○ |  | ○ | ○ | ○ |
|  | 2ND | ○ |  |  | ○ | ○ |  | ○ |  | ○ |  |
|  | (3RD) | ○ | ○ |  |  | ○ |  |  |  |  |  |

CONTROL APPARATUS FOR LINEAR SOLENOID

This application claims priority from Japanese Patent Application No. 2018-13133 filed on Jul. 10, 2018, the disclosure of which is herein incorporated by reference in its entirety.

FIELD OF THE INVENTION

The present invention relates to a control apparatus for a linear solenoid, and is more particularly concerned with techniques for reducing adapting steps of adapting parameters of a feedback control system for controlling the linear solenoid.

BACKGROUND OF THE INVENTION

There is known an electronic control unit (ECU) in which parameters of a feedback control system for a linear solenoid, which is used in a linear solenoid valve or the like, for example, are determined for each of various levels of a state value such as a power supply voltage, which is a responsiveness factor, and the determined parameters are stored in a ROM included in the electronic control unit, so that a constant responsiveness is realized in any level of the state value such as the power supply voltage. As an example of such as an electronic control unit, a control apparatus for a linear solenoid is disclosed in Patent Document 1.

PRIOR ART LITERATURES

Patent Documents

Patent Document 1: JP-2003-67006A
Patent Document 2: JP-2009-14118A
Patent Document 3: JP-2004-212182A

SUMMARY OF THE INVENTION

In the control apparatus for the linear solenoid disclosed in the above-identified Patent Document 1, it is necessary to obtain a responsiveness in each of various levels of the state value as the responsiveness factor, so as to appropriately determine the parameters of the feedback control system for the various levels of the state value, for the purpose of obtaining a high responsiveness without vibration being generated in the feedback control system. Thus, a considerably large number of adapting steps, i.e., steps for adapting the parameters for each of various levels of the state value, are required.

The present invention was made in view of the background art described above. It is therefore an object of the present invention to provide a control apparatus for a linear solenoid, which is capable of reducing adapting steps for adapting the parameters that are applied in a feedback control system of the control apparatus. This object is achieved according to the following aspects of the present invention.

According to a first aspect of the invention, there is provided a control apparatus for controlling a linear solenoid by controlling a driving current supplied to the linear solenoid, through a feedback control, wherein the feedback control is executed with a feedback control system having parameters that are determined in accordance with an ILQ design method, and wherein a gain of a transfer function, which represents a ratio of an output to a disturbance in the feedback control system, is lower than 0 [dB] throughout all frequency ranges. It is noted that, for example, where the driving current supplied to the linear solenoid is controlled by an input voltage that is obtained by causing a battery voltage to be subjected to an ON-OFF control based on a PWM signal, the control apparatus may include: an electric circuit approximating portion configured to approximate an electric circuit of the linear solenoid, through which the driving current flows, by a series circuit of a resistance and an inductance; a first formulating portion configured to formulate a circuit equation related to an instantaneous value of the driving current flowing through the series circuit; a second formulating portion configured to formulate an equation related to a controlled variable for controlling the driving current; a recurrence-equation deriving portion configured to derive a recurrence equation from the equation related to the controlled variable; a recurrence-equation solving portion configured to solve the recurrence equation; a linearizing portion configured to linearize the solved recurrence equation is linearized by an approximation equation; and a transfer-function deriving portion configured to derive, from the linearized equation related to the controlled variable, a transfer function of the feedback control, which is to be used to determine the controlled variable.

According to a second aspect of the invention, in the control apparatus according to the first aspect of the invention, the linear solenoid is provided in a linear solenoid valve, wherein the linear solenoid valve is configured to output a signal pressure whose magnitude corresponds to the driving current that is determined through the feedback control.

According to a third aspect of the invention, in the control apparatus according to the second aspect of the invention, in a hydraulic control unit of an vehicle automatic transmission, the linear solenoid valve is configured to supply the signal pressure to a line-pressure regulator valve for controlling a line pressure generated by the line-pressure regulator valve.

According to a fourth aspect of the invention, in the control apparatus according to the second aspect of the invention, in a hydraulic control unit of an vehicle automatic transmission, the linear solenoid valve is configured to supply the signal pressure to hydraulic friction engagement devices for controlling the hydraulic friction engagement devices that are operated to establish gear positions in the vehicle automatic transmission.

According to a fifth aspect of the invention, in the control apparatus according to the first aspect of the invention, the linear solenoid is provided in an actuator, wherein, in a hydraulic control unit for controlling a variable valve-timing mechanism configured to adjust opening/closing timing of valves of a vehicle engine, the actuator is configured to supply, to the variable valve-timing mechanism, a signal pressure whose magnitude corresponds to the driving current that is determined through the feedback control, for generating hydraulic pressure for adjusting the opening/closing timing.

According to a sixth aspect of the invention, in the control apparatus according to the first aspect of the invention, the driving current supplied to the linear solenoid is controlled by an input voltage that is obtained by causing a battery voltage to be subjected to an ON-OFF control based on a PWM signal, wherein an electric circuit of the linear solenoid, through which the driving current flows, is approximated by a series circuit of a resistance and an inductance, wherein a circuit equation related to an instantaneous value of the driving current flowing through the series circuit is formulated, wherein an equation related to a controlled variable for controlling the driving current is formulated, wherein the equation related to the controlled variable is derived as a recurrence equation, wherein the recurrence equation is solved, and the solved recurrence equation is linearized by an approximation equation, and wherein the transfer function of the feedback control is derived from the linearized equation related to the controlled variable, and the derived transfer function is used to determine the controlled variable.

According to a seventh aspect of the invention, in the control apparatus according to the sixth aspect of the invention, wherein the circuit equation is formulated as equation (1), the equation related to the controlled variable that is an average value of the driving current in an n-th period (n: natural number) is formulated as equation (2), the recurrence equation is formulated as equation (3), and the approximation equation is formulated as equation (4), where "t[s]" represents a time, "τ[s]" represents each driving period of the PWM signal, "$\tau_1$ [s]" represents an ON time that is a length of time for which the driving current (i(t)) is supplied to the linear solenoid in each driving period, "Pb[V]" represents the battery voltage, and "L(H)" represents the inductance.

[Formulas 1]

$$\frac{di(t)}{dt}L + Rz \cdot i(t) = vin(t) \quad (1)$$

$$\bar{i}(n\tau) = \frac{\int_{(n-1)\tau}^{n\tau} i(t)dt}{\tau} \quad (2)$$

$$\bar{i}(n\tau) = \frac{Pb}{\tau}\left\{\frac{L}{Rz^2}\left\{\left(1 - e^{\frac{Rz}{L}\tau_1}\right)\left(1 - e^{\frac{Rz}{L}\tau}\right)\right\}\left(e^{-\frac{Rz}{L}\tau_1}\right)^n + \bar{i}((n-1)\tau) \quad (3)$$

$$\frac{\left(e^{\frac{Rz}{L}\tau_1} - 1\right)}{\tau} \stackrel{.}{=} \frac{\tau_1}{\tau^2}\left(e^{\frac{Rz}{L}\tau} - 1\right) \quad (4)$$

According to an eighth aspect of the invention, in the control apparatus according to the first aspect of the invention, the driving current supplied to the linear solenoid is controlled by an input voltage that is obtained by causing a battery voltage to be subjected to an ON-OFF control based on a PWM signal, wherein a resistance Rz[Ω] of an electric circuit of the linear solenoid, through which the driving current flows, is calculated in accordance with equation (5), and an inductance L[H] of the electric circuit is calculated in accordance with equation (6), where "τ[s]" represents each driving period of the PWM signal, "$\tau_1$ [s]" represents an ON time that is a length of time for which the driving current is supplied to the linear solenoid in each driving period, "$\tau_2$ [s]" represents an OFF time that is a length of time for which the driving current is not supplied to the linear solenoid in each driving period, "Pb[V]" represents the battery voltage, "Iavec[A]" represents an average value of the driving current in a converged state, and "Iminc[A]" represents a minimum instantaneous current value of the driving current in the converged state, wherein the parameters are corrected depending on the resistance Rz[Ω] and the inductance L[H] that are calculated in accordance with the respective equations (5) and (6).

[Formulas 2]

$$Rz = \frac{\tau_1}{\tau} \cdot \frac{Pb}{Iavec} \quad (5)$$

$$Iminc = \frac{Pb}{Rz} \cdot \frac{e^{-\frac{Rz}{L}\tau_2} - e^{-\frac{Rz}{L}\tau}}{1 - e^{-\frac{Rz}{L}\tau}} \quad (6)$$

In the control apparatus according to the first aspect of the invention, the feedback control is executed with a feedback control system having parameters that are determined in accordance with the ILQ design method, wherein the gain of the transfer function, which represents the ratio of the output to the disturbance in the feedback control system, is lower than 0 [dB] throughout all frequency ranges. With use of the feedback control system having the parameters determined in accordance with the ILQ design method, it is possible to reduce the adapting steps of adapting the parameters for each of various levels of the state value such as the power supply voltage, which is the responsiveness factor. Further, in the execution of the feedback control with the feedback control system, the driving current is controlled such that the driving current is converged to a control target value (corresponding to a control command value) at a high responsiveness with respect to step change of the control target value and step change of a battery voltage of the drive circuit of the linear solenoid, without causing the control system to be vibrated and without causing coupled vibration in the linear solenoid.

In the control apparatus according to the second aspect of the invention, the linear solenoid is provided in the linear solenoid valve, wherein the linear solenoid valve is configured to output the signal pressure whose magnitude corresponds to the driving current that is determined through the feedback control. Owing to this arrangement, the driving current of the linear solenoid is converged to the control target value at a high responsiveness without the driving current being fluctuated, whereby the signal pressure outputted from the linear solenoid valve can be controlled to provide a high responsiveness without its fluctuation.

In the control apparatus according to the third aspect of the invention, in the hydraulic control unit of the vehicle automatic transmission, the linear solenoid valve is configured to supply the signal pressure to the line-pressure regulator valve for controlling the line pressure generated by the line-pressure regulator valve. Owing to this arrangement, the signal pressure, which is for controlling the line pressure generated by the line-pressure regulator valve provided in the vehicle automatic transmission, can be controlled to provide a high responsiveness without its fluctuation, whereby the line pressure generated by the line-pressure regulator valve can be also controlled to provide a high responsiveness without its fluctuation.

In the control apparatus according to the fourth aspect of the invention, in the hydraulic control unit of the vehicle automatic transmission, the linear solenoid valve is configured to supply the signal pressure to the hydraulic friction engagement devices for controlling the hydraulic friction engagement devices that are operated to establish the gear positions in the vehicle automatic transmission. Owing to this arrangement, the signal pressure, which is for controlling the hydraulic friction engagement devices provided in the vehicle automatic transmission, can be controlled to provide a high responsiveness without its fluctuation, whereby engaging and releasing actions of each of the hydraulic friction engagement devices can be also controlled to provide a high responsiveness without its vibration.

In the control apparatus according to the fifth aspect of the invention, the linear solenoid is provided in the actuator, wherein, in the hydraulic control unit for controlling the variable valve-timing mechanism configured to adjust the opening/closing timing of the valves of the vehicle engine, the actuator is configured to supply, to the variable valve-timing mechanism, the signal pressure whose magnitude corresponds to the driving current that is determined through the feedback control, for generating the hydraulic pressure for adjusting the opening/closing timing. Owing to this arrangement, the signal pressure, which is supplied to the variable valve-timing mechanism configured to adjust the opening/closing timing of the valves of the vehicle engine, can be controlled to provide a high responsiveness without its fluctuation, whereby the adjustment of the opening/closing timing by the variable valve-timing mechanism can be also controlled to provide a high responsiveness without its vibration.

In the control apparatus according to the sixth aspect of the invention, the driving current supplied to the linear solenoid is controlled by the input voltage that is obtained by causing the battery voltage to be subjected to an ON-OFF control based on the PWM signal, wherein the electric circuit of the linear solenoid, through which the driving current flows, is approximated by the series circuit of the resistance and the inductance, wherein the circuit equation related to the instantaneous value of the driving current flowing through the series circuit is formulated, wherein the equation related to the controlled variable for controlling the driving current is formulated, wherein the equation related to the controlled variable is derived as the recurrence equation, wherein the recurrence equation is solved, and the solved recurrence equation is linearized by the approximation equation, and wherein the transfer function of the feedback control is derived from the linearized equation related to the controlled variable, and the derived transfer function is used to determine the controlled variable. Thus, the transfer function, which is accurately linearized and approximated, is derived whereby the controlled variable is determined by calculations, so that it is possible to reduce the adapting steps of adapting the parameters for each of various levels of the state value such as the power supply voltage, which is the responsiveness factor.

In the control apparatus according to the seventh aspect of the invention, the circuit equation is formulated as the equation (1), the equation related to the controlled variable that is the average value of the driving current in an n-th period (n: natural number) is formulated as the equation (2), the recurrence equation is formulated as the equation (3), and the approximation equation is formulated as the equation (4), where "t[s]" represents the time, "τ[s]" represents each driving period of the PWM signal, "$τ_1$ [s]" represents the ON time that is a length of time for which the driving current (i(t)) is supplied to the linear solenoid in each driving period, "Pb[V]" represents the battery voltage, and "L(H)" represents the inductance. Thus, the transfer function, which is accurately linearized and approximated, is derived by the equations (3), (4) whereby the controlled variable is determined by calculations, so that it is possible to reduce the adapting steps.

In the control apparatus according to the eighth aspect of the invention, the driving current supplied to the linear solenoid is controlled by the input voltage that is obtained by causing the battery voltage to be subjected to an ON-OFF control based on the PWM signal, wherein the resistance Rz[Ω] of the electric circuit of the linear solenoid, through which the driving current flows, is calculated in accordance with equation (5), and the inductance L[H] of the electric circuit is calculated in accordance with equation (6), where "τ[s]" represents each driving period of the PWM signal, "$τ_1$ [s]" represents the ON time that is a length of time for which the driving current is supplied to the linear solenoid in each driving period, "$τ_2$ [s]" represents an OFF time that is a length of time for which the driving current is not supplied to the linear solenoid in each driving period, "Pb[V]" represents the battery voltage, "Iavec[A]" represents the average value of the driving current in the converged state, and "Iminc[A]" represents the minimum instantaneous current value of the driving current in the converged state, and wherein the parameters are corrected depending on the resistance Rz[Ω] and the inductance L[H] that are calculated in accordance with the respective equations (5) and (6). Thus, actual values of the resistance Rz and the inductance L even after aging for years after production of the vehicle or even under unusual condition such as low or high temperature can be calculated by the equations (5) and (6). Thus, the parameters of the feedback control system are corrected depending on the actual values of the resistance Rz and the inductance L that are calculated as described above, so that it is possible to reduce deterioration of dynamic control characteristics in control of the linear solenoid.

BRIEF DESCRIPTION OF THE DRAWINGS

FIG. 2 is a table explaining a combination of each of gear positions of an automatic transmission shown in FIG. 1 and a corresponding one or ones of hydraulic friction engagement devices of the automatic transmission, which are to be engaged to establish the each of the gear positions in the automatic transmission;

DETAILED DESCRIPTION OF PREFERRED EMBODIMENTS

In the present specification, there are descriptions related to various matrixes, wherein a suffix "−1" on right upper side of a matrix means an inverse matrix that is inverse to the matrix, a suffix "T" on right upper side of a matrix means a transposed matrix that is transposed to the matrix, and a matrix I means an identity matrix.

Hereinafter, some preferred embodiments of the invention will be described in detail with reference to the accompanying drawings.

First Embodiment

Figure 1:
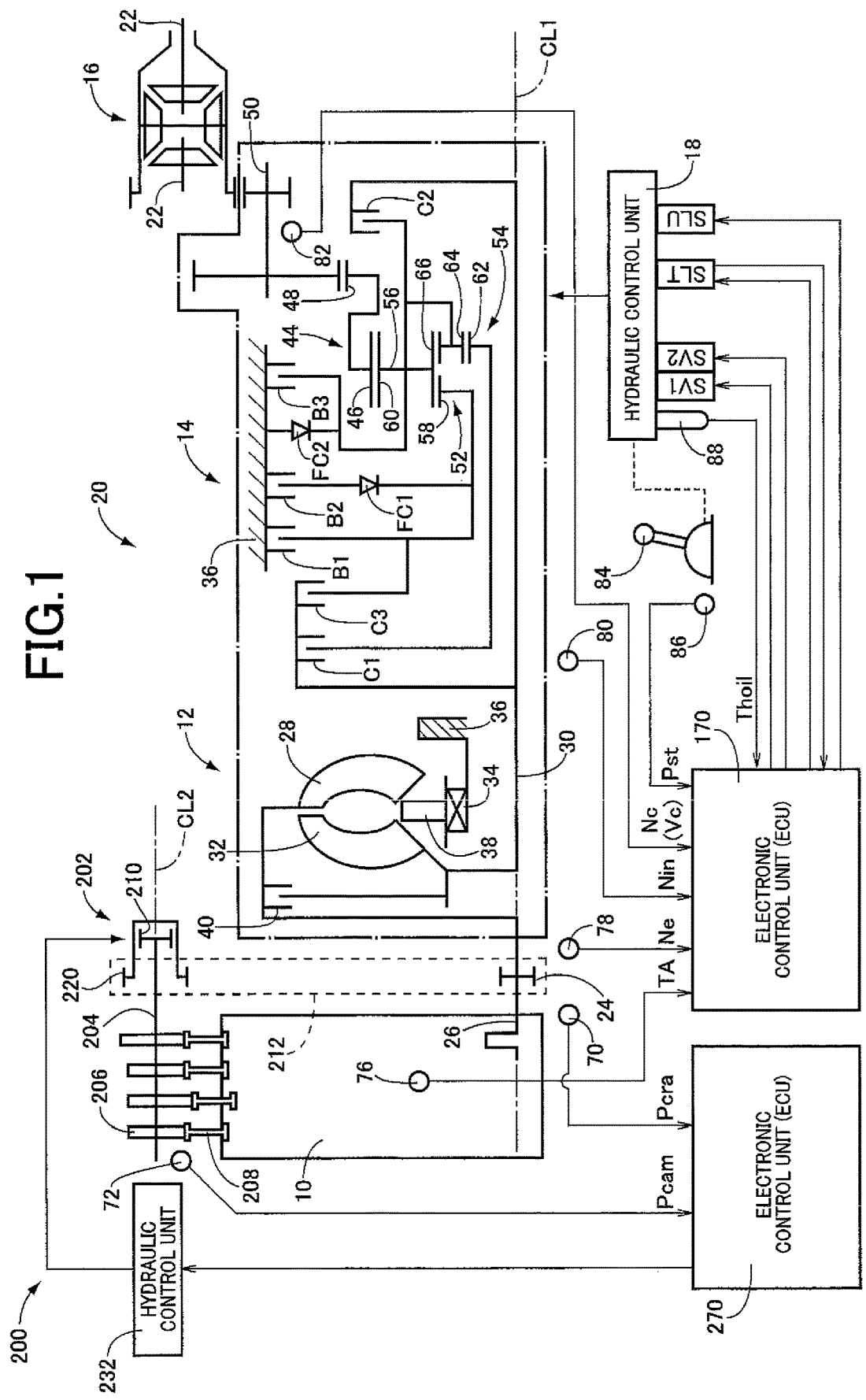
FIG. 1 is a view schematically showing a construction of a vehicle drive-force transmitting apparatus including an electronic control unit to which the present invention is applied.

FIG. 1 is a view schematically showing a construction of a vehicle drive-force transmitting apparatus 20 which is to be provided in a vehicle and which includes an electronic control unit 170 according to an embodiment of the invention. FIG. 1 shows also a construction of a hydraulic variable valve-timing apparatus 200 including an electronic control unit 270 according to another embodiment of the invention. The drive-force transmitting apparatus 20 includes a torque converter 12 connected to a vehicle engine 10, a vehicle automatic transmission 14, a differential gear device 16 and a hydraulic control unit 18 configured to control shifting actions of the automatic transmission 14, in addition to the electronic control unit 170 configured to control the hydraulic control unit 18. A drive force outputted from the engine 10 is transmitted to drive wheels (not shown) of the vehicle via, for example, the torque converter 12, the automatic transmission 14, the differential gear device 16 and right and left axles 22.

The torque converter 12 includes a pump impeller 28 connected to a crank shaft 26 of the engine 10, a turbine impeller 32 which is connected to an input shaft 30 of the automatic transmission 14 and to which the drive force is transmitted via a fluid under pressure, a stator impeller 38 connected through a one-way clutch 34 to a housing 36 as a non-rotary member, and a lock-up clutch 40 configured to directly connect the pump impeller 28 and the turbine impeller 32 through a damper (not shown).

The automatic transmission 14 is a multi-speed transmission configured to establish four forward gear positions and one reverse gear position. The automatic transmission 14 includes, in addition to the input shaft 30, a planetary gear unit 44 of Ravignawx type, a ring gear 48 that is to be rotated together with a ring gear 46 of the planetary gear unit 44, and a counter shaft 50 serving as an output shaft configured to transmit the drive force between the ring gear 48 and the differential gear device 16.

The planetary gear unit 44 consists of a planetary gear device 52 of single pinion type and a planetary gear device 54 of double pinion type, wherein a carrier 56 and the ring gear 46 are rotary elements common to the planetary gear devices 52, 54. The planetary gear device 52 includes rotary elements in the form of a sun gear 58, planetary gears 60 attached to the carrier 56, and the ring gear 46. The planetary gear device 54 includes rotary elements in the form of a sun gear 62 and first and second pinions 64 66, such that the first and second pinions 64, 66 are connected integrally to each other and are rotatably held by the carrier 56.

Some of the rotary elements of the planetary gear devices 52, 54 are connected integrally to each other, some of the rotary elements are selectively connected to each other through three clutches C1, C2, C3, some of the rotary elements are selectively connected to the housing 36 through three brakes B1, B2, B3, and some of the rotary elements are engaged to the housing 36 through two one-way clutches FC1, FC2 depending on their rotation directions. It is noted that the vehicle drive-force transmitting apparatus 20 is constructed substantially symmetrically about the axis CL1 (corresponding to an axis of the input shaft 30), except the torque converter 12 and the counter shaft 50 of the automatic transmission 14, so that a lower side of the axis CL1 is not shown in FIG. 1.

Each of the clutches C1, C2, C3 and the brakes B1, B2, B3 as the hydraulic friction engagement devices is constituted by, for example, a multiple-disc clutch or a band brake including one band or two bands that wound in respective opposite directions. Each of the clutches C1, C2, C3 and the brakes B1, B2, B3 is controlled by the hydraulic control unit 18 that is operated in accordance with commands supplied from the electronic control unit 170, so as to be placed in its engaged state, slipping state or released state, whereby the automatic transmission 14 can establish four forward gear positions and one rear gear position that are different in a gear ratio γ (=rotational speed of input shaft 30/rotational speed of counter shaft 50), as shown in FIG. 2 in which "1ST", "2ND", "3RD", "4TH" represent the respective four forward gears positions, i.e., first, second, third and fourth gear positions, respectively. The gear ratio γ decreases in a direction from the first gear position toward the four gear position. Further, in FIG. 2, "P", "R", "N", "D", "2", "L" represent a parking range, a reverse range, a neutral range, a drive range, a second range and a low range, respectively, which are selectively selected by a manual operation of the shift lever 84. Each of the parking range and the neutral range is a non-driving range that is to be selected when the vehicle is not driven to run. The reverse range is a driving range that is to be selected when the vehicle is driven to run in reverse direction. Each of the drive range, the second range and the low range is a driving range that is to be selected when the vehicle is driven to run in forward direction.

FIG. 2 is a table explaining a combination of each of gear positions of the automatic transmission 14 shown in FIG. 1 and a corresponding one or ones of the hydraulic friction engagement devices of the automatic transmission 14, which are to be engaged to establish the each of the gear positions in the automatic transmission 14. In the table of FIG. 2, "O" indicates an operated or engaged state of the engagement devices, and blank indicates a non-operated or released state of the engagement devices. For example, a shift-up action from the second gear position to the third gear position in the drive range is executed by causing the clutch C2 to be placed in the engaged state and maintaining the engaged state of the clutch C1. Further, a shift-down action from the fourth gear position to the third gear position is executed by causing the clutch C1 to be placed in the engaged state and causing the brake B1 to be placed in the released state, such that the engaging action of the clutch C1 and the releasing action of the brake B1 are executed by a so-called "clutch-to-clutch shifting", namely, executed in an overlap state or an underlap state.

The hydraulic control unit 18 includes first and second electromagnetic opening/closing valves SV1, SV2 that are to be controlled to establish the gear positions in the automatic transmission 14, two linear solenoid valves SLT, SLU and an oil temperature sensor 88. The linear solenoid valve SLT is configured to generate a control hydraulic pressure PS[MPa] whose magnitude corresponds to an engine load, i.e., a throttle opening degree TA[%] detected by a throttle opening-degree sensor 76. The linear solenoid valve SLU is configured to generate a hydraulic pressure for controlling, for example, an operation state of the lock-up clutch 40, namely, for establishing a frictional engagement of the clutch 40, releasing the frictional engagement and controlling a slipping amount of the clutch 40. The oil temperature sensor 88 serves as a working-fluid temperature detecting device configured to detect a working-fluid temperature Thoil[° C.] in the hydraulic control unit 18. It is noted that the control hydraulic pressure PS corresponds to "signal pressure" recited in the appended claims.

The electronic control unit (ECU) 170 includes a so-called microcomputer incorporating a CPU, a ROM, a RAM and an input-output interface (not shown). The electronic control unit 170 is configured to control the hydraulic friction engagement devices (such as the clutches C1, C2, C3 and the brakes B1, B2, B3) and the lock-up clutch 40 that are included in the drive-force transmitting apparatus 20, by causing the CPU to process various input signals, according to control programs stored in the ROM, while utilizing a temporary data-storage function of the RAM. The electronic control unit 170 corresponds to "control apparatus" recited in the appended claims.

The electronic control unit 170 receives various input signals from various sensors provided in the vehicle, such as: an output signal of the above-described throttle opening-degree sensor 76 configured to detect the throttle opening degree TA in an intake pipe (not shown) of the engine 10; an output signal of an engine speed sensor 78 configured to detect an engine rotational speed Ne[rpm]; an output signal of an input-shaft speed sensor 80 configured to detect an input-shaft rotational speed Nin[rpm]; an output signal of a running speed sensor 82 configured to detect a counter-shaft rotational speed Nc[rpm], i.e., a vehicle running speed Vc[km/h]; an output signal of a shift position sensor 86 configured to detect an operation position Pst of the above-described shift lever 84, namely, detect in which one of the parking range, the reverse range, the neutral range, the drive range, the second speed range and the low speed range the shift lever 84 is placed; an output signal of the above-described oil temperature sensor 88 configured to detect the temperature Thoil of a working fluid (working oil) in the hydraulic control unit 18.

Figure 3:
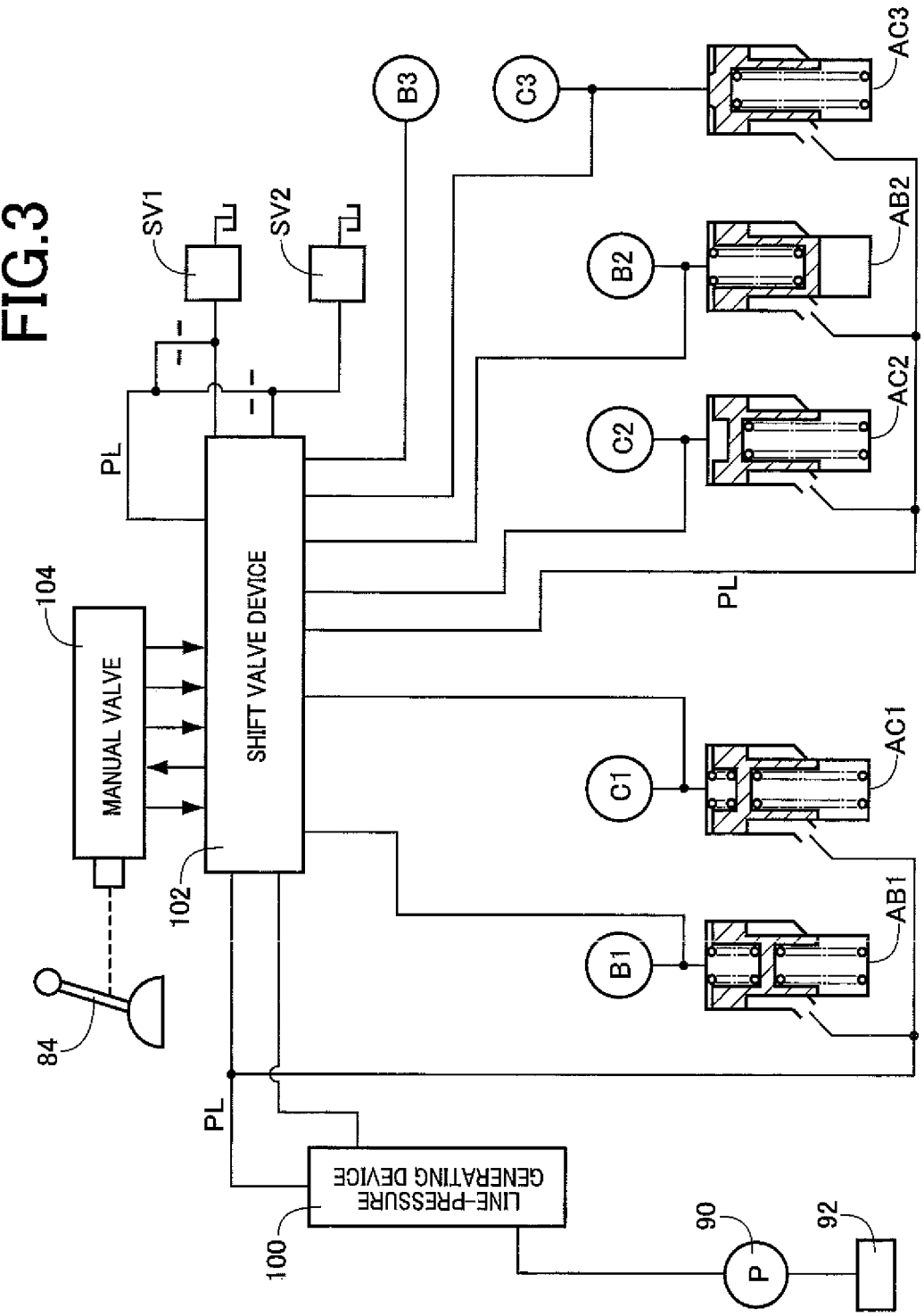
FIG. 3 a block diagram schematically showing a main construction of a hydraulic control unit configured to control the automatic transmission shown in FIG. 1.

FIG. 3 a block diagram schematically showing a main construction of the hydraulic control unit 18 configured to control the automatic transmission 14 shown in FIG. 1. A hydraulic pump 90 is to be driven or operated by the engine 10 so as to suck the working fluid returned trough a strainer 92 and to supply the working fluid to a line-pressure generating device 100. The line-pressure generating device 100 regulates the working fluid supplied from the hydraulic pump 90, to a line pressure PL[MPa] that corresponds to the engine load, and then outputs the regulated line pressure PL as an original pressure of each of the hydraulic friction engagement devices in the form of the clutches C1, C2, C3 and the brakes B1, B2, B3, to a shift valve device 102. A manual valve 104 is mechanically connected to the shift lever 104, and selects a destination to which the line pressure PL is to be supplied, such that the selected destination is dependent on the operation position Pst of the shift lever 84. By the selection, the hydraulic pressure corresponding to the operation position Pst of the shift lever 84, e.g., a reverse-range pressure, a drive-range pressure, a second-range pressure or a low-range pressure is outputted to the shift valve device 102. Each of the first electromagnetic opening/closing valve SV1 and the second electromagnetic opening/closing valve SV2 outputs an output pressure that is controlled by the electronic control unit 170 to select one of the gear positions, and the output pressure is supplied to the shift valve device 102.

The shift valve device 102 includes a 1-2 shift valve, a 2-3 shift valve and a 3-4 shift valve (not shown) that are to be switched for a shifting action, based on the hydraulic pressure corresponding to the operation position Pst of the shift lever 84 and supplied from the manual valve 104 and also the output pressure supplied from each of the first and second electromagnetic opening/closing valve SV1, SV2. The shift valve device 102 supplies an engaging pressure to each of a corresponding one or ones of the hydraulic friction engagement devices in the form of the clutches C1, C2, C3 and the brakes B1, B2, B3, in accordance with the corresponding combination indicated in FIG. 2. The clutches C1, C2, C3 and the brakes B1, B2 are connected to a C1 accumulator AC1, a C2 accumulator AC2, a C3 accumulator AC3, a B1 accumulator AB1 and a B2 accumulator AB2, respectively, such that an increase of the supplied engaging pressure, i.e., an engaging torque in each of these hydraulic friction engagement devices is alleviated.

Figure 4:
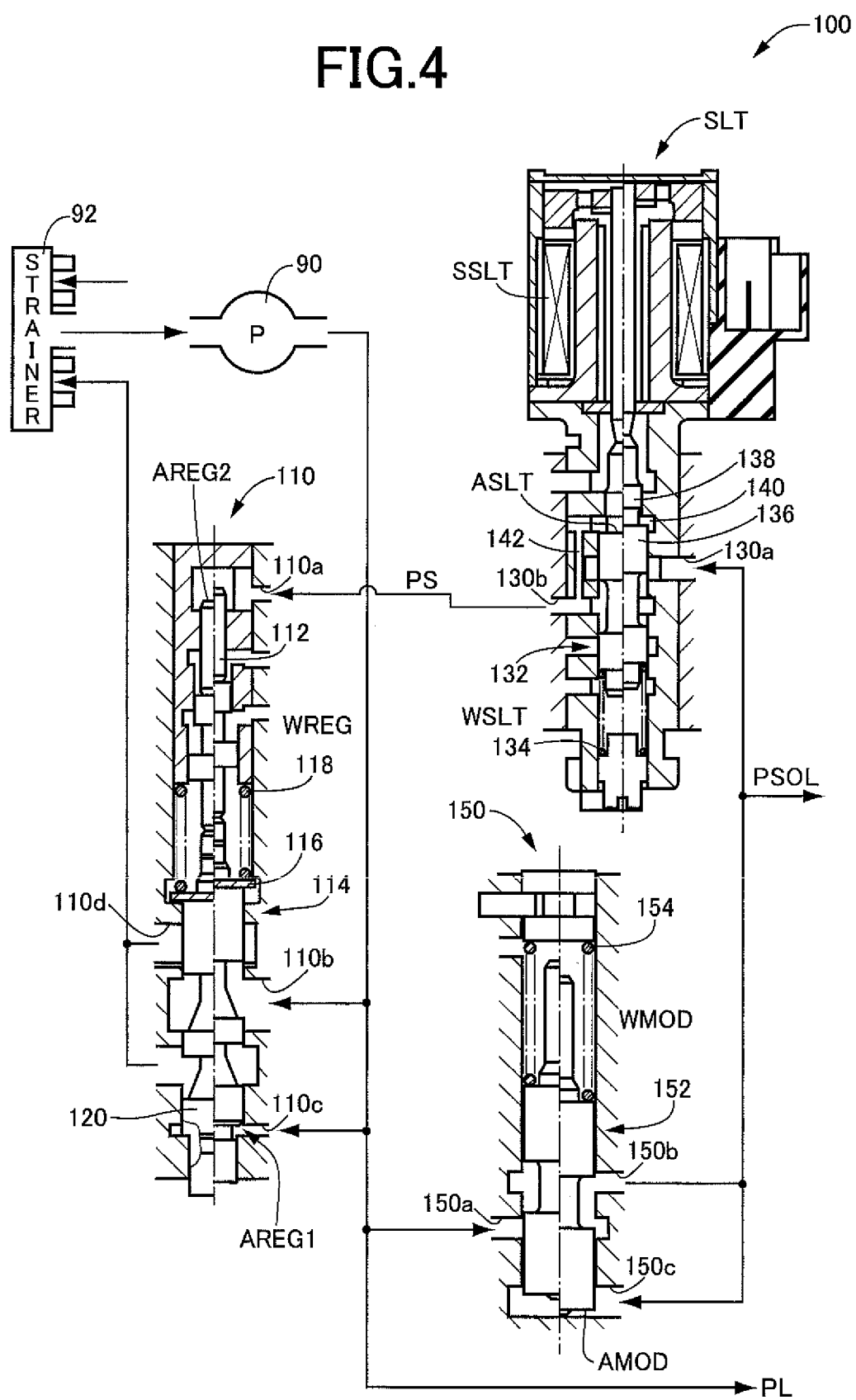
FIG. 4 is a hydraulic circuit diagram showing a line-pressure generating device shown in FIG. 3.

FIG. 4 is a hydraulic circuit diagram showing the line-pressure generating device 100 shown in FIG. 3. A line-pressure regulator valve 110 includes: a plunger 112; a spool valve body 114 which is in contact with the plunger 112 and which is axially movable so as to selectively allow and inhibit communication between an input port 110b and an output port 110d; and a spring 118 that constantly forces or biases the spool valve body 114 through a spring receiver plate 116 in a connection inhibiting direction that causes the spool valve body 114 to inhibit the communication between the input port 110b and the output port 110d. The line-pressure regulator valve 110 regulates the working fluid supplied from the hydraulic pump 90 through the input port 110b, based on the control hydraulic pressure PS supplied from the linear solenoid valve SLT through an input port 110a, such that the working fluid is regulated to the line pressure PL that corresponds to a load of the engine 10. Through an input port 110c, the hydraulic pressure, which is supplied through the input port 110b, is supplied as a feedback hydraulic pressure. The line pressure PL is expressed by equation (7) given below, wherein "WREG [N]" represents a biasing force of the spring 118, "AREG1 [mm$^2$]" represents a annular-shaped pressure-receiving area of a land 120 of the spool valve body 114, and "AREG2 [mm$^2$]" represents a pressure receiving area of the plunger 112 on which the hydraulic pressure forcing the spool valve body 114 in the above-described connection inhibiting direction acts. The equation (7) indicates that the line pressure PL is generated in proportion with the control hydraulic pressure PS. Thus, since the magnitude of the control hydraulic pressure PS is made correspond to the engine load, the line pressure PL is regulated to have a magnitude corresponding to the engine load.

$$PL=(AREG2*PS+WREG)/AREG1 \tag{7}$$

The linear solenoid valve SLT includes: a spool valve body 132 configured to selectively allow and inhibit communication between an input port 130a and an output port 130b; and a spring 134 that constantly forces or biases the spool valve body 132 in a connection allowing direction that causes the spool valve body 132 to allow the communication between the input port 130a and the output port 130b. To the linear solenoid valve SLT, a constant hydraulic pressure PSOL[MPa] is supplied through the input port 130a, and the supplied constant hydraulic pressure PSOL is regulated to the control hydraulic pressure PS corresponding to a driving current i(t)[A] of the linear solenoid SSLT which is controlled by the electronic control unit 170, so that the regulated control hydraulic pressure PS is outputted through the output port 130b. The control hydraulic pressure PS (or a change characteristic with respect to a thrust FI) is expressed by equation (8) given below, wherein "FI[N]" represents a thrust, as a driving signal SD1 corresponding to the driving current i(t) of the linear solenoid SSLT, which forces the spool valve body 132 in a connection inhibiting direction that causes the spool valve body 132 to inhibit the communication between the input port 130a and the output port 130b, "WSLT[N]" represents a biasing force of the spring 134, and "ASLT[mm$^2$]" represents an annular-shaped pressure-receiving area of a land 136 of the spool valve body 132. A feedback fluid chamber 140 defined between the land 136 and a land 138 is in communication with the output port 130b via a fluid passage 142, so that a hydraulic pressure acting on the annular-shaped pressure-receiving area of the land 136 corresponds to the control hydraulic pressure PS. The thrust FI has a magnitude that is proportional with the driving current i(t) of the linear solenoid SSLT.

$$PS=WSLT/ASLT-FI/ASLT \tag{8}$$

A pressure reducing valve 150 includes a spool valve body 152 configured to selectively allow and inhibit communication between an input port 150a and an output port 150b; and a spring 154 that constantly forces or biases the spool valve body 152 in a connection allowing direction that causes the spool valve body 152 to allow the communication between the input port 150a and the output port 150b. The pressure reducing valve 150 regulates the line pressure PL supplied thereto through the input port 150a, to the constant hydraulic pressure PSOL, and outputs the constant hydraulic pressure PSOL through the output port 150b. The constant hydraulic pressure PSOL outputted through the output port 150b is supplied to the linear solenoid valve SLT and the linear solenoid valve SLU. To an input port 150c of the pressure reducing valve 150, the hydraulic pressure outputted through the output port 150b is supplied as the feedback hydraulic pressure. The constant hydraulic pressure PSOL is expressed by equation (9) given below, wherein "AMOD [mm²]" represents an area of a pressure-receiving portion of the spool valve body 152, which is in communication with the input port 150c, and "WMOD[N]" represents a biasing force of the spring 154.

$$PSOL = WMOD/AMOD \quad (9)$$

Figure 5:
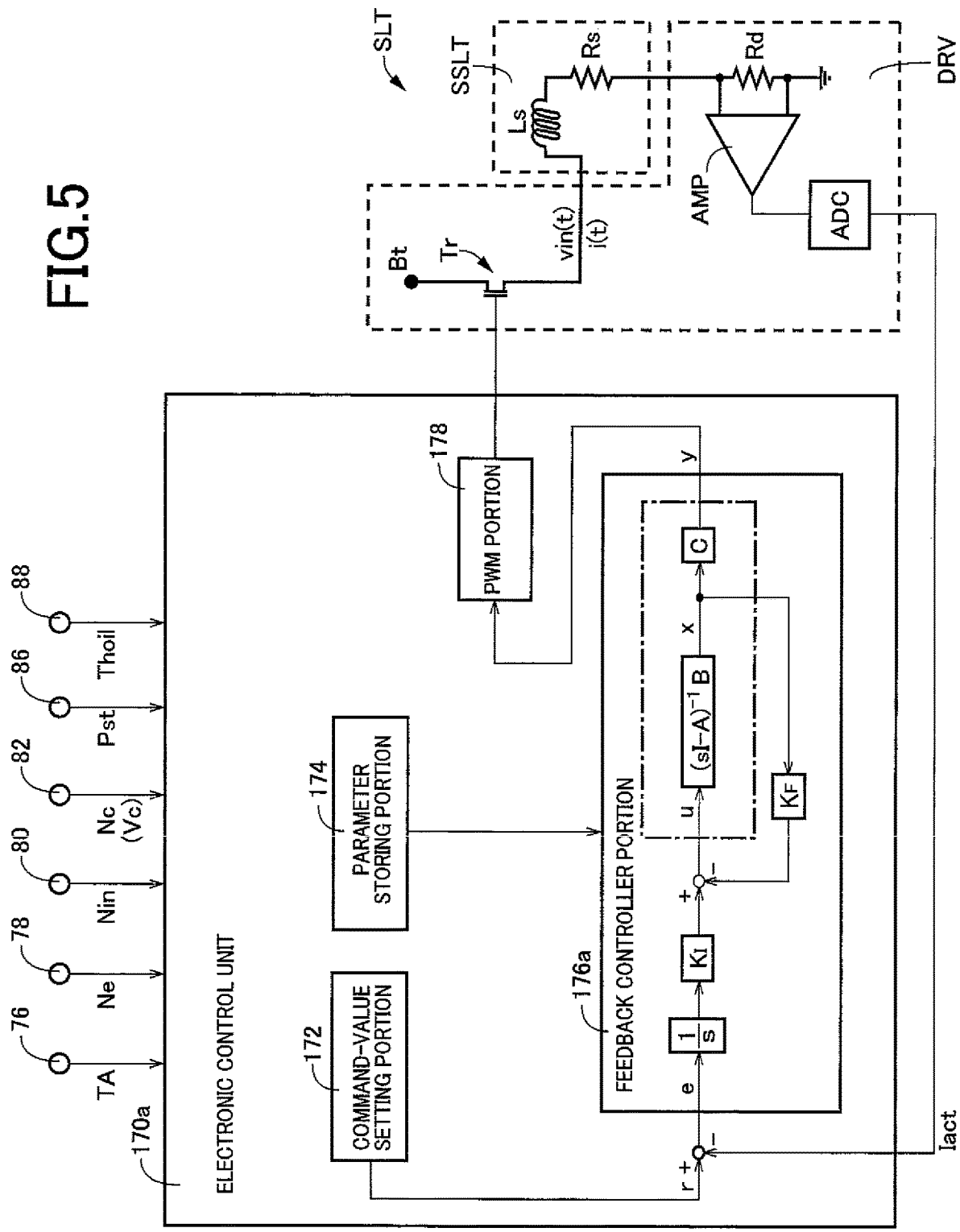
FIG. 5 is a functional block diagram showing, by way of examples, an equivalent circuit of a linear solenoid SSLT shown in FIG. 4, a drive circuit DRV of the linear solenoid SSLT and the electronic control unit for the linear solenoid SSLT, wherein the electronic control unit is designed in accordance with an ILQ design method according to an embodiment of the invention.
Figure 6:
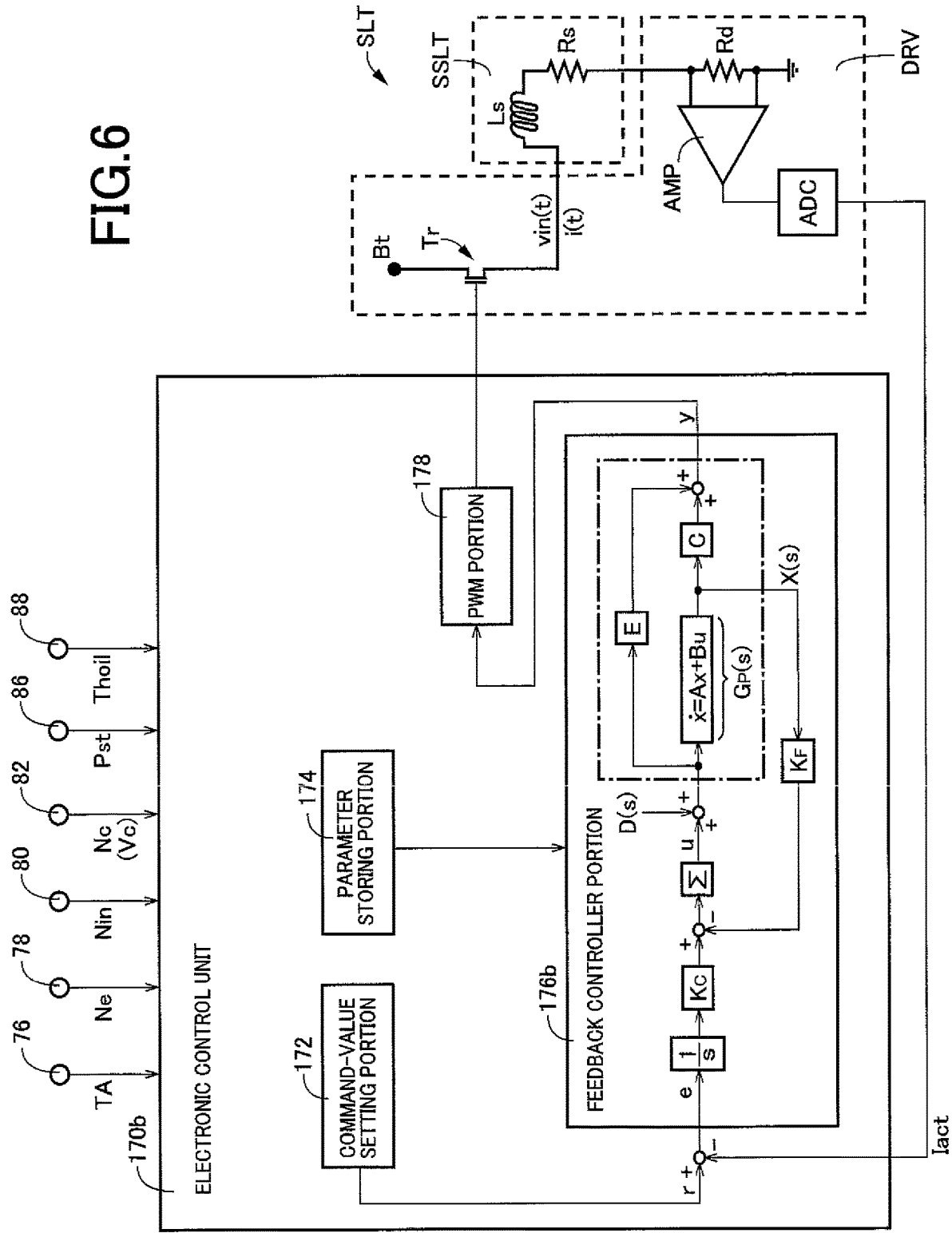
FIG. 6 is a functional block diagram showing, by way of other examples, an equivalent circuit of the linear solenoid SSLT shown in FIG. 4, a drive circuit DRV of the linear solenoid SSLT and the electronic control unit for the linear solenoid SSLT, wherein the electronic control unit is designed in accordance with the ILQ design method according to the embodiment of the invention.

FIG. 5 is a functional block diagram showing an equivalent circuit of the linear solenoid SSLT shown in FIG. 4, a drive circuit DRV of the linear solenoid SSLT and the electronic control unit 170a for the linear solenoid SSLT, which is constructed according to an arrangement of the embodiment of the invention. In FIG. 5, a portion of a feedback controller portion 176a, which is to be subjected to a control, is surrounded by one-dot chain line, and the portion subjected to the control has a construction without a feedthrough term. FIG. 6 is a functional block diagram showing the equivalent circuit of the linear solenoid SSLT shown in FIG. 4, the drive circuit DRV of the linear solenoid SSLT and the electronic control unit 170b for the linear solenoid SSLT, which is constructed according to another arrangement of the embodiment of the invention. In FIG. 6, a portion of a feedback controller portion 176b, which is to be subjected to a control, is surrounded by one-dot chain line, and the portion subjected to the control has a construction with a feedthrough term. The functional block diagrams shown in FIGS. 5 and 6 are identical with each other except the feedback controller portion 176a shown in FIG. 5 and the feedback controller portion 176b shown in FIG. 6 that are different from each other. It is noted that the electronic control unit 170a and the electronic control unit 170b are examples of the electronic control unit 170, and the feedback control system of the electronic control unit 170 is designed in accordance with ILQ design method. The term "feedback control system" is interpreted to mean a construction configured to execute an automatic control by a feedback control, and is represented by, for example, a control block diagram shown in the feedback controller portion 176a in FIG. 5 and a control block diagram shown in the feedback controller portion 176b in FIG. 6.

There will be described functions of the electronic control unit 170, with reference to FIG. 6 that shows the electronic control unit 170b. The linear solenoid SSLT has electrical characteristics that are represented by a RL series circuit of an equivalent inductance Ls[H] and an equivalent resistance Rs[Ω]. It is noted that an ON resistance of a drive transistor Tr (described below) is included in the equivalent resistance Rs. The drive circuit DRV for the linear solenoid SSLT includes: a terminal Bt through which a battery voltage Pb[V] is supplied as a power supply voltage; a drive transistor Tr; a detection resistance Rd[Ω]; an operational amplifier AMP and an A/D converter ADC. With the drive transistor Tr being ON, the driving current i(t) is caused to flow through the linear solenoid SSLT by the battery voltage Pb. The detection resistance Rd[Ω] is connected in series with the linear solenoid SSLT, so that the driving current i(t) flowing through the linear solenoid SSLT is taken as a voltage difference between opposite ends of the detection resistance Rd. The taken voltage difference is amplified by the operational amplifier AMP, and is then converted into a digitized signal in the form of a current signal Iact representing the actual driving current i(t). The current signal Iact is inputted to the electronic control unit 170b.

The electronic control unit 170b includes, in addition to the feedback controller portion 176b, a command-value setting portion 172, a parameter storing portion 174 and a PWM portion 178.

The command-value setting portion 172 sets a current command value r(t) representing a control target value in the form of an average value of the driving current i(t) of the linear solenoid SSLT, in accordance with a predetermined running map, based on the signal indicative of the throttle opening degree TA, the signal indicative of the engine rotational speed Ne, the signal indicative of the input-shaft rotational speed Nin, the signal indicative of the counter-shaft rotational speed Nc, i.e., the vehicle running speed Vc and the signal indicative of the operation position Pst of the shift lever 84. The command-value setting portion 172 outputs the current command value r(t) that is supplied to the feedback controller portion 176b.

Parameters, which are applied to the feedback control system as described below, are stored in the parameter storing portion 174 in a stage of production of the parameter storing portion 174.

The feedback controller portion 176b causes the current command value r(t) supplied from the command-value setting portion 172, to be subjected to the feedback control using the current signal Iact representing the actual driving current i(t), and outputs, as an output y, the current command value r(t) subjected to the feedback control. The output y is outputted to the PWM portion 178. The output y is a signal representing a duty ratio dependent on an average driving current i(nτ) as a controlled variable that is described below.

The PWM portion 178 generates a PWM (pulse width modulation) signal based on the output y supplied from the feedback controller portion 176b. The PWM portion 178 outputs the generated PWM signal to a gate electrode of the drive transistor Tr, and executes the ON-OFF control of the drive transistor Tr. An input voltage vin(t)[V] inputted to the linear solenoid SSLT through a side of the drive transistor Tr is controlled by the duty ratio of the ON-OFF control of the drive transistor Tr, whereby the driving current i (t) of the linear solenoid SLT is controlled.

Regarding specification values of various elements in the present embodiment, for example, characteristic values of the resistances and inductance are represented by the equivalent resistance Rs=5.3[Ω], the detection resistance Rd=0.5 [Ω] and the equivalent inductance Ls=20*10⁻³[H] in nominal values. The nominal value is an average value of each of the characteristic values of the resistances and inductance. The actual characteristic value (hereinafter referred to as an actual value) varies depending on production variation and temperature change. Further, the battery voltage Pb is 15 [V], and a drive frequency $f_d$ of the PWM signal is 1/3.324*10³ [Hz]. Therefore, each driving period τ is 1/3*10⁻² [s] (=1/$f_d$).

Figure 7A:
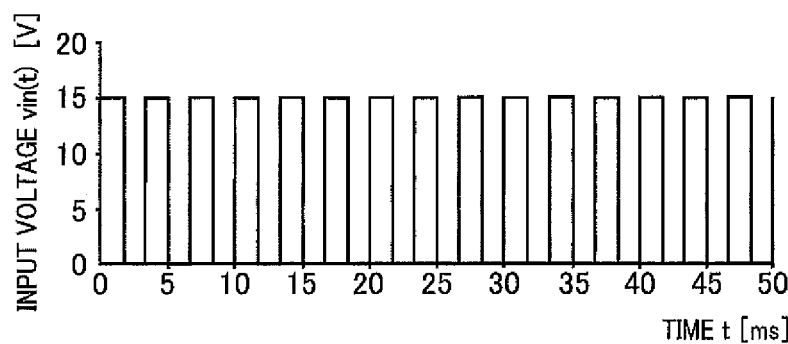
FIGS. 7A and 7B are views explaining change of an instantaneous value of a driving current where a drive transistor shown in FIG. 6 is subjected to an ON-OFF control with supply of PWM signal, and also change of an average of the instantaneous value of the driving current in each driving period.
Figure 7B:
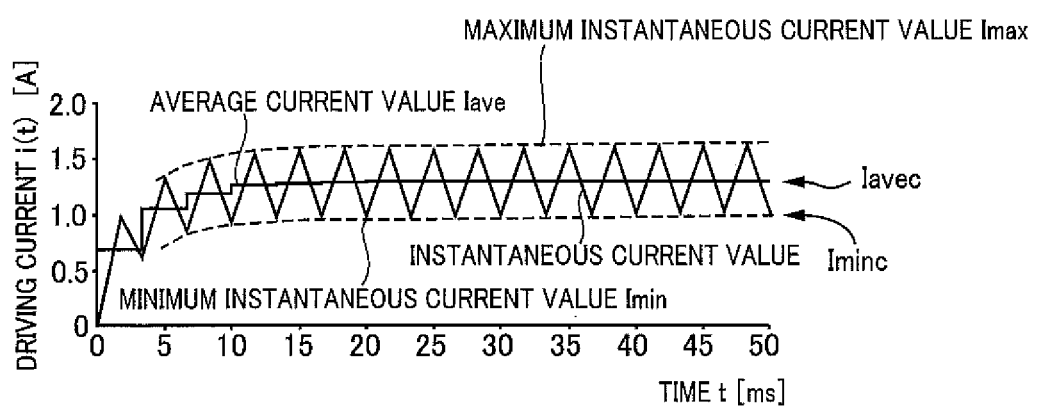

FIGS. 7A and 7B are views explaining change of an instantaneous value of the driving current i(t) where the drive transistor Tr shown in FIG. 6 is subjected to the ON-OFF control with supply of the PWM signal, and also change of an average Iave of the instantaneous value of the driving current i(t) in each driving period τ. FIGS. 7A and 7B show a case in which the PWM signal whose duty ratio is 50% starts to be inputted to the drive transistor Tr at a point 0 [s] of time. The drive transistor Tr is ON in a first half (50%) of each driving period τ, and is OFF in a second half (50%) of each driving period τ. FIG. 7A shows change of the input voltage vin(t) with respect to time, while FIG. 7B shows change of the driving current i(t) with respect to time. As shown in FIG. 7A, the input of 15 [V] and the input of 0 [V] are alternately made to the linear solenoid SSLT as the input voltage vin(t) in every half (about 1.67 [ms]) of each driving period τ. In FIG. 7B, one of two broken lines is a line that connects minimum instantaneous current values Imin appearing in the respective driving periods τ, and the other of the two broken lines is a line that connects maximum instantaneous current values Imax appearing in the respective driving periods τ. As shown in FIG. 7B, the instantaneous value of the driving current i(t), which flows through the linear solenoid SSLT, is fluctuated between the minimum instantaneous current value Imin and the maximum instantaneous current value Imax in each driving period τ, and is gradually increased with each of the minimum instantaneous current value Imin and the maximum instantaneous current value Imax being converged to a constant value after a certain length of time elapses. The average Iave of the instantaneous value of the driving current i(t) is also gradually increased with the increases of each of the minimum instantaneous current value Imin and the maximum instantaneous current value Imax, and is converged to a constant value after a certain length of time elapses. The average Iavec is an average of the instantaneous value of the driving current i(t) in the converged state. The minimum instantaneous current values Imin is a minimum of the instantaneous value of the driving current i(t) in the converged state. It is noted that the "converged state" is interpreted to mean a state in which the minimum instantaneous current value Imin and the average Iave of the instantaneous value of the driving current i(t) become constant or substantially constant without change or substantial change.

Figure 8:
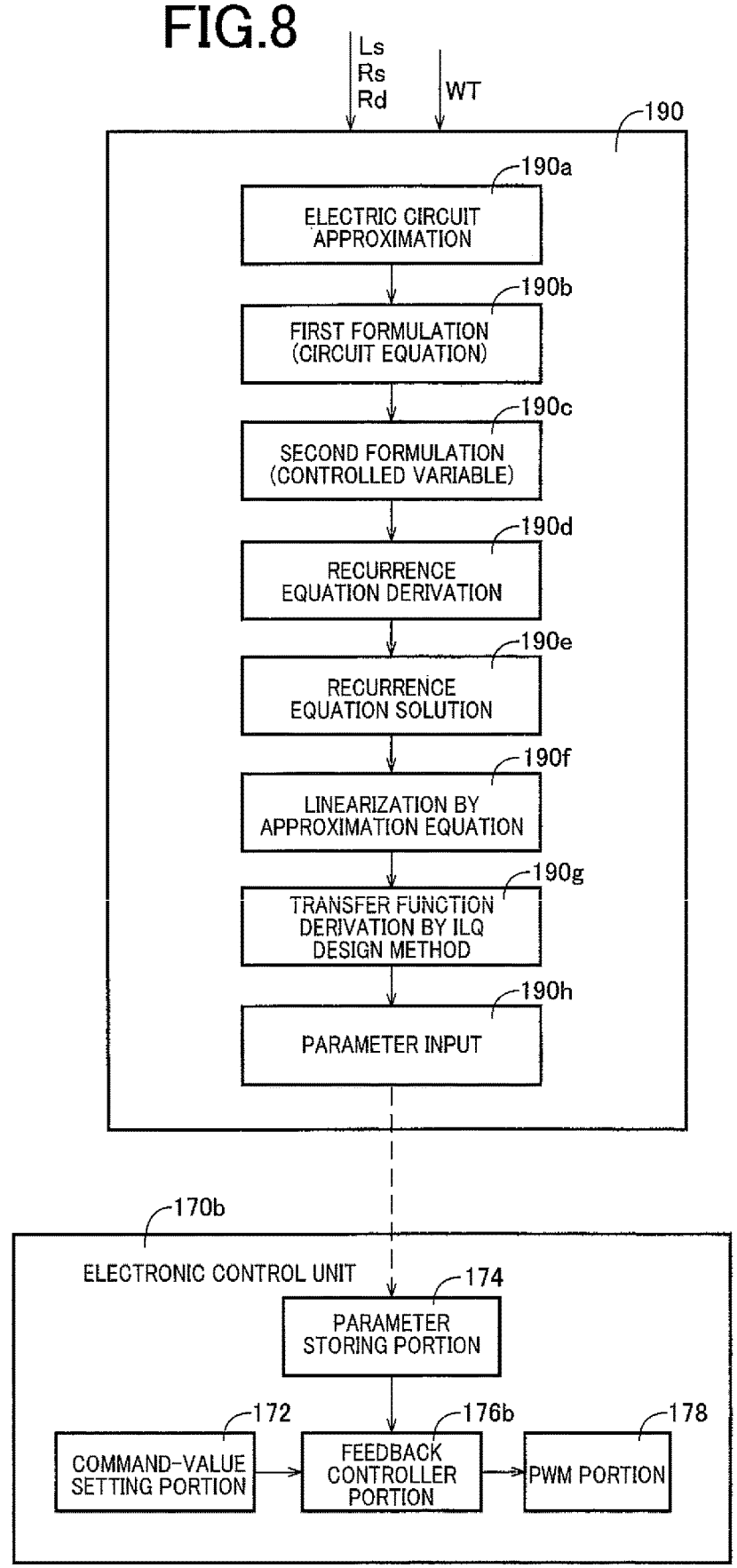
FIG. 8 is a functional block diagram showing a design process of the feedback control system in the electronic control unit shown in FIG. 6.

FIG. 8 is a functional block diagram showing a design process 190 of the feedback control system in the electronic control unit shown 170b shown in FIG. 6. As shown in FIG. 8, the design process 190 includes steps of "electric circuit approximation 190a", "first formulation 190b", "second formulation 190c", "recurrence equation derivation 190d", "recurrence equation solution 190e", "linearization by approximation equation 190f", "transfer function derivation by ILQ design method 190g" and "parameter input 190h". Each of these steps may be implemented by either a human operator or an electronic computer such as AI (Artificial Intelligence). Where the steps are implemented by the electronic computer, the electronic computer constitutes portions configured to implement the respective steps. It is noted that the electronic control unit shown 170b may be interpreted to include an electric circuit approximating portion 190a, a first formulating portion 190b, a second formulating portion 190c, a recurrence-equation deriving portion 190d, a recurrence-equation solving portion 190e, a linearizing portion 190f, a transfer-function deriving portion 190g and a parameter inputting portion 190h, which are configured to implement the respective steps.

The step of the "electric circuit approximation 190a", which is implemented first, is a step of approximating a series circuit including a resistance Rz[Ω] and an inductance L[H], to the electric circuit of the linear solenoid SSLT through which the driving current i(t) flows, wherein the resistance Rz is a sum of the equivalent resistance Rs of the linear solenoid SSLT and the detection resistance Rd, and the inductance L is synonymous with the equivalent inductance Ls of the linear solenoid SSLT. The step of the "first formulation 190b", which is implemented next, is a step of formulating a circuit equation related to the instantaneous value of the driving current i(t) that flows in the approximated series circuit. The step of the "second formulation 190c", which is implemented next, is a step of formulating an equation related to the controlled variable in control of the driving current i(t). The step of the "recurrence equation derivation 190d", which is implemented next, is a step of deriving a recurrence equation from the equation related to the controlled variable. The step of the "recurrence equation solution 190e", which is implemented next, is a step of obtaining a solution of the recurrence equation, by solving the recurrence equation. The step of "linearization by approximation equation 190f", which is implemented next, is a step of linearizing the solved recurrence equation by an approximation equation. The step of "transfer function derivation by ILQ design method 190g", which is implemented next, is a step of deriving a transfer function by using the recurrence equation that has been linearized and solved. The "parameter input 190h", which is implemented next, is a step of writing or inputting parameters, which are to be applied to the derived transfer function, into the parameter storing portion 174 of the electronic control unit 170. Specific contents of these steps will be described below.

Figure 9:
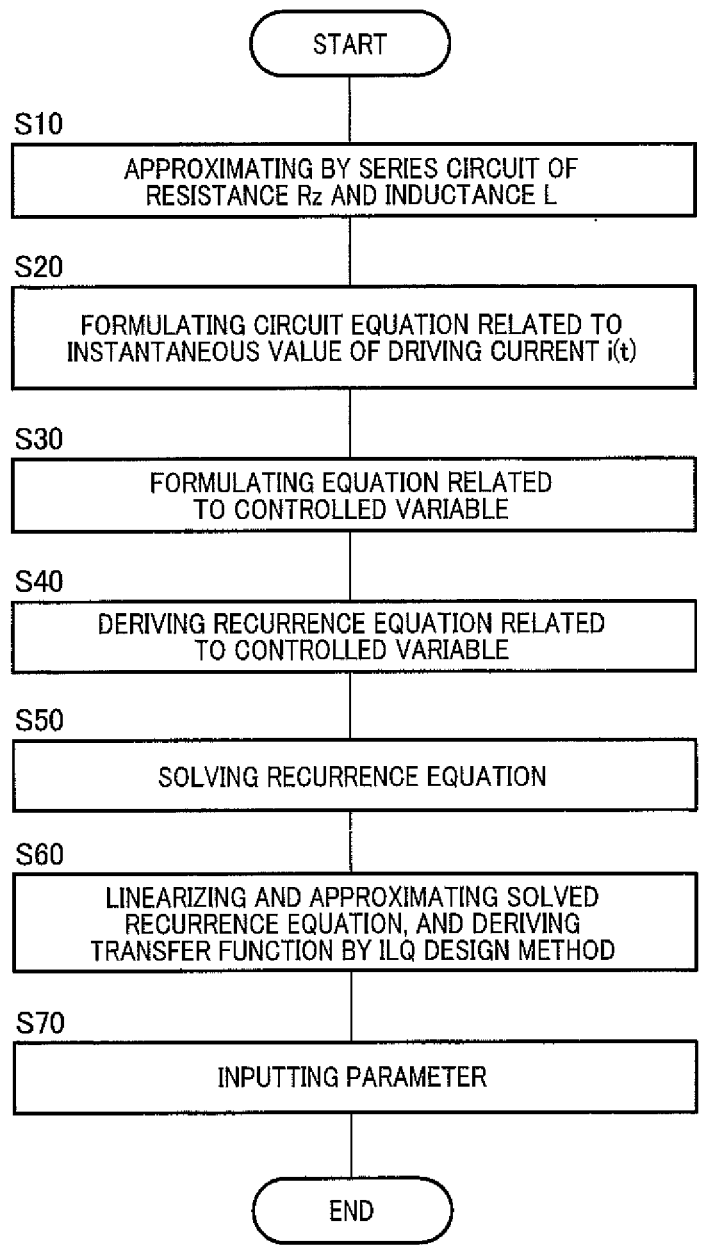
FIG. 9 is a flow chart showing the design process of the feedback control system in the electronic control unit shown in FIG. 6 and also determination of a controlled variable in the designed feedback control system.

FIG. 9 is a flow chart showing the design process of the feedback control system in the electronic control unit 170b shown in FIG. 6. Among steps of the design process, each of the steps except step S70 is started to be implemented and is implemented once in a stage of design process. Step S70 is implemented once when the parameters are stored into the electronic control unit 170b provided in the drive-force transmitting apparatus 20 of each of vehicles.

At step S10 corresponding to the step of the "electric circuit approximation 190a", the electric circuit of the linear solenoid SSLT, through which the driving current i(t) flows, is approximated by the series circuit of the resistance Rz and the inductance Ls. Step S10 is followed by step S20.

At step S20 corresponding to the step of the "first formulation 190b", equation (10) in the form of a differential equation is formulated as the circuit equation related to the electric circuit which is constituted by the linear solenoid SSLT and the drive circuit DRV and though which the driving current i(t) flows, wherein the input voltage inputted to the linear solenoid SSLT through the side of the drive transistor Tr is represented by "vin(t)". It is noted that equation (10) is identical with the above-described equation (1). Step S20 is followed by step S30.

At step S30 corresponding to the step of the "second formulation 190c", equation (11) is formulated as the equation related to the controlled variable, which is constituted by an average driving current i(nτ) that is the average of the instantaneous value of the driving current i(t) in the n-th period (n: natural number), when the driving current i(t) is to be controlled. It is noted that the equation (11) is identical with the above-described equation (2). Step S30 is followed by step S40.

[Formulas 3]

$$\frac{di(t)}{dt}L + Rz \cdot i(t) = vin(t) \qquad (10)$$

$$\bar{i}(n\tau) = \frac{\int_{(n-1)\tau}^{n\tau} i(t)dt}{\tau} \qquad (11)$$

At step S40 corresponding to the step of the "recurrence equation derivation 190d", an equation related to the average driving current i(nτ) as the controlled variable is derived as the recurrence equation. Equation (12) is obtained by applying Laplace transform to both sides of the above-described equation (10), and is transformed into equation (13). Further, the transfer function $G_p(s)$, which is of primary delay, is represented by equation (14).

[Formulas 4]

$$\mathcal{L}\left[\frac{di(t)}{dt}L\right] + \mathcal{L}[Rz \cdot i(t)] = \mathcal{L}[vin(t)] \tag{12}$$

$$(s \cdot L + Rz)I(s) = Vin(s) \tag{13}$$

$$Gp(s) = \frac{I(s)}{Vin(s)} = \frac{\frac{1}{Rz}}{\frac{L}{Rz}s + 1} \tag{14}$$

Equation (15) related to the driving current i(t) is established by obtaining a step response of the driving current i(t) in response to a step input of the input voltage vin(t) at a point 0 [s] of time in the above transfer function $G_p(s)$, wherein "Pb" represents the battery voltage as described above.

[Formula 5]

$$i(t) = \mathcal{L}^{-1}\left[Gp(s) \cdot \frac{Pb}{s}\right] \tag{15}$$

$$= \mathcal{L}^{-1}\left[\frac{\frac{1}{Rz}}{\frac{L}{Rz}s + 1} \cdot \frac{Pb}{s}\right]$$

$$= \frac{Pb}{Rz}\left(1 - e^{-\frac{Rz}{L}t}\right)$$

Equation (16) related to the average driving current i(τ) in the first period is established in accordance with superposition principle, wherein $\tau_1/\tau*100[\%]$ corresponds to the duty ratio. Equation (17) related to the average driving current i(τ) is obtained by transforming the equation (16). It is noted that an ON time $\tau_1$ [s] represents a length of time for which the drive transistor Tr is controlled to be ON, and an OFF time $\tau_2$ [s] represents a length of time for which the drive transistor Tr is controlled to be OFF. The OFF time $\tau_2$ is obtained by subtracting the ON time $\tau_1$ from the driving period τ.

[Formulas 6]

$$\begin{aligned}
\bar{i}(\tau) \times \frac{\tau}{Pb} &= \int_0^\tau \frac{1}{Rz}\left(1 - e^{-\frac{Rz}{L}t}\right)dt - \int_{\tau_1}^\tau \frac{1}{Rz}\left(1 - e^{-\frac{Rz}{L}(t-\tau_1)}\right)dt \\
&= \int_0^\tau \frac{1}{Rz}\left(1 - e^{-\frac{Rz}{L}t}\right)dt - \int_0^{\tau-\tau_1} \frac{1}{Rz}\left(1 - e^{-\frac{Rz}{L}t}\right)dt \\
&= \left[\frac{t}{Rz} + \frac{L}{Rz^2}e^{-\frac{Rz}{L}t}\right]_0^\tau - \left[\frac{t}{Rz} + \frac{L}{Rz^2}e^{-\frac{Rz}{L}t}\right]_0^{\tau-\tau_1} \\
&= \frac{\tau}{Rz} + \frac{L}{Rz^2}e^{-\frac{Rz}{L}\tau} - \frac{L}{Rz^2} - \left[\frac{\tau-\tau_1}{Rz} + \frac{L}{Rz^2}e^{-\frac{R}{L}(\tau-\tau_1)} - \left\{\frac{L}{Rz^2}\right\}\right] \\
&= \frac{\tau}{Rz} + \frac{L}{Rz^2}e^{-\frac{Rz}{L}\tau} - \frac{L}{Rz^2} + \left\{\frac{L}{Rz^2}\right\} - \left[\frac{\tau-\tau_1}{Rz} + \frac{L}{Rz^2}e^{-\frac{Rz}{L}(\tau-\tau_1)}\right] \\
&= \frac{\tau}{Rz} + \frac{L}{Rz^2}e^{-\frac{Rz}{L}\tau} - \left[\frac{\tau-\tau_1}{Rz} + \frac{L}{Rz^2}e^{-\frac{Rz}{L}(\tau-\tau_1)}\right] \\
&= \frac{\tau}{Rz} + \frac{L}{Rz^2}e^{-\frac{Rz}{L}\tau} - \frac{\tau-\tau_1}{Rz} - \frac{L}{Rz^2}e^{-\frac{Rz}{L}(\tau-\tau_1)} \\
&= \frac{\tau}{Rz} - \frac{\tau-\tau_1}{Rz} + \frac{L}{Rz^2}e^{-\frac{Rz}{L}\tau} - \frac{L}{Rz^2}e^{-\frac{Rz}{L}(\tau-\tau_1)} \\
&= \frac{\tau_1}{Rz} + \frac{L}{Rz^2}e^{-\frac{Rz}{L}\tau} - \frac{L}{Rz^2}e^{-\frac{Rz}{L}(\tau-\tau_1)} \\
&= \frac{\tau_1}{Rz} + \frac{L}{Rz^2} \cdot e^{-\frac{Rz}{L}\tau}\left(1 - e^{\frac{Rz}{L}\tau_1}\right)
\end{aligned} \tag{16}$$

$$\bar{i}(\tau) = \frac{Pb}{\tau}\left\{\frac{\tau_1}{Rz} + \frac{L}{Rz^2} \cdot e^{-\frac{Rz}{L}\tau}\left(1 - e^{\frac{Rz}{L}\tau_1}\right)\right\} \tag{17}$$

Similarly, equation (18) related to the average driving current i(2τ) in the second period is established. Since equation (19) is established, equation (20) related to the average driving current i(2τ) is established. Further, by substantially the same equation transform as the derivation of the average driving current i(τ) and average driving current i(2τ), equation (21) in the form of a recurrence equation is derived. It is noted that the equation (21) is identical with the above-described equation (3). Step S40 is followed by step S50.

[Formula 7]

$$\bar{i}(2\tau) \times \frac{\tau}{Pb} = \begin{aligned}&\int_\tau^{2\tau}\frac{1}{Rz}\left(1-e^{-\frac{Rz}{L}t}\right)dt - \int_\tau^{2\tau}\frac{1}{Rz}\left(1-e^{-\frac{Rz}{L}(t-\tau_1)}\right)dt + \\ &\int_\tau^{2\tau}\frac{1}{Rz}\left(1-e^{-\frac{Rz}{L}(t-\tau)}\right)dt - \int_{\tau+\tau_1}^{2\tau}\frac{1}{Rz}\left(1-e^{-\frac{Rz}{L}(t-\tau-\tau_1)}\right)dt\end{aligned} \quad (18)$$

$$= \begin{aligned}&\int_\tau^{2\tau}\frac{1}{Rz}\left(1-e^{-\frac{Rz}{L}t}\right)dt - \int_{\tau-\tau_1}^{2\tau-\tau_1}\frac{1}{Rz}\left(1-e^{-\frac{Rz}{L}t}\right)dt + \\ &\int_0^\tau\frac{1}{Rz}\left(1-e^{-\frac{Rz}{L}t}\right)dt - \int_0^{\tau-\tau_1}\frac{1}{Rz}\left(1-e^{-\frac{Rz}{L}t}\right)dt\end{aligned}$$

$$= \int_\tau^{2\tau}\frac{1}{Rz}\left(1-e^{-\frac{Rz}{L}t}\right)dt - \int_{\tau-\tau_1}^{2\tau-\tau_1}\frac{1}{Rz}\left(1-e^{-\frac{Rz}{L}t}\right)dt + \bar{i}(\tau)\times\frac{\tau}{Pb}$$

[Formula 8]

$$\int_\tau^{2\tau}\frac{1}{Rz}\left(1-e^{-\frac{Rz}{L}t}\right)dt - \int_{\tau-\tau_1}^{2\tau-\tau_1}\frac{1}{Rz}\left(1-e^{-\frac{Rz}{L}t}\right)dt \quad (19)$$

$$= \left[\frac{t}{Rz}+\frac{L}{Rz^2}e^{-\frac{Rz}{L}t}\right]_\tau^{2\tau} - \left[\frac{t}{Rz}+\frac{L}{Rz^2}e^{-\frac{Rz}{L}t}\right]_{\tau-\tau_1}^{2\tau-\tau_1}$$

$$= \left(\frac{2\tau}{Rz}+\frac{L}{Rz^2}e^{-\frac{Rz}{L}2\tau}\right) - \left(\frac{\tau}{Rz}+\frac{L}{Rz^2}e^{-\frac{Rz}{L}\tau}\right) - \left(\frac{2\tau-\tau_1}{Rz}+\frac{L}{Rz^2}e^{-\frac{Rz}{L}(2\tau-\tau_1)}\right) + \left(\frac{\tau-\tau_1}{Rz}+\frac{L}{Rz^2}e^{-\frac{Rz}{L}(\tau-\tau_1)}\right)$$

$$= \frac{\tau}{Rz}+\frac{L}{Rz^2}e^{-\frac{Rz}{L}2\tau}-\frac{L}{Rz^2}e^{-\frac{Rz}{L}\tau} - \frac{\tau}{Rz}+\frac{L}{Rz^2}e^{-\frac{Rz}{L}(\tau-\tau_1)}-\frac{L}{Rz^2}e^{-\frac{Rz}{L}(2\tau-\tau_1)}$$

$$= \frac{L}{Rz^2}e^{-\frac{Rz}{L}2\tau}-\frac{L}{Rz^2}e^{-\frac{Rz}{L}\tau}+\frac{L}{Rz^2}e^{-\frac{Rz}{L}(\tau-\tau_1)}-\frac{L}{Rz^2}e^{-\frac{Rz}{L}(2\tau-\tau_1)}$$

$$= \frac{L}{Rz^2}\left(e^{-\frac{Rz}{L}2\tau}-e^{-\frac{Rz}{L}(2\tau-\tau_1)}-e^{-\frac{Rz}{L}\tau}+e^{-\frac{Rz}{L}(\tau-\tau_1)}\right)$$

$$= \frac{L}{Rz^2}\left\{e^{-\frac{Rz}{L}2\tau}\left(1-e^{\frac{Rz}{L}\tau_1}\right)-e^{-\frac{Rz}{L}\tau}\left(1-e^{\frac{Rz}{L}\tau_1}\right)\right\}$$

$$= \frac{L}{Rz^2}\left\{\left(1-e^{\frac{Rz}{L}\tau_1}\right)\left(e^{-\frac{Rz}{L}2\tau}-e^{-\frac{Rz}{L}\tau}\right)\right\}$$

$$= \frac{L}{Rz^2}\left\{\left(1-e^{\frac{Rz}{L}\tau_1}\right)\left(1-e^{\frac{Rz}{L}\tau}\right)\right\}e^{-\frac{Rz}{L}2\tau}$$

$$= \frac{L}{Rz^2}\left\{\left(1-e^{\frac{Rz}{L}\tau_1}\right)\left(1-e^{\frac{Rz}{L}\tau}\right)\right\}\left(e^{-\frac{Rz}{L}\tau}\right)^2$$

-continued

[Formulas 9]

$$\bar{i}(2\tau) = \frac{Pb}{\tau}\left\{\frac{L}{Rz^2}\left(1-e^{\frac{Rz}{L}\tau_1}\right)\left(1-e^{\frac{Rz}{L}\tau}\right)\right\}\left(e^{-\frac{Rz}{L}\tau}\right)^2 + \bar{i}(\tau) \quad (20)$$

$$\bar{i}(n\tau) = \frac{Pb}{\tau}\left\{\frac{L}{Rz^2}\left(1-e^{\frac{Rz}{L}\tau_1}\right)\left(1-e^{\frac{Rz}{L}\tau}\right)\right\}\left(e^{-\frac{Rz}{L}\tau}\right)^n + \bar{i}((n-1)\tau) \quad (21)$$

At step S50 corresponding to the step of the "recurrence equation solution 190e", the recurrence equation is solved so that the solution related to the controlled variable is obtained.

Where the average driving current $a_n$ and variables α, β are defined as respective equations (22), (23), (24), the above-described equation (21) is rewritten into equation (25). Therefore, the average driving current $a_n$ is expressed by equation (26) using a calculation related to a sum of geometric series.

[Formulas 10]

$$a_n = \bar{i}(n\tau) \quad (22)$$

$$\alpha = \frac{Pb}{\tau}\left\{\frac{L}{Rz^2}\left(1-e^{\frac{Rz}{L}\tau_1}\right)\left(1-e^{\frac{Rz}{L}\tau}\right)\right\} \quad (23)$$

$$\beta = \left(e^{-\frac{Rz}{L}\tau}\right) \quad (24)$$

$$a_n = \alpha\cdot\beta^n + a_{n-1} \quad (25)$$

$$\begin{aligned}a_n &= \alpha\beta^n + \alpha\cdot\beta^{n-1} + \alpha\cdot\beta^{n-2} + \ldots + \alpha\cdot\beta^2 + a_1 \\ &= \alpha(\beta^n+\beta^{n-1}+\beta^{n-2}+\ldots+\beta^2)+a_1 \\ &= \alpha(\beta^n+\beta^{n-1}+\beta^{n-2}+\ldots+\beta^2+\beta-\beta)+a_1 \\ &= \alpha\left(\frac{1-\beta^n}{1-\beta}\beta-\beta\right)+a_1 \\ &= \alpha\cdot\beta\left(\frac{1-\beta^n}{1-\beta}-1\right)+a_1 \\ &= \alpha\cdot\beta\left(\frac{\beta-\beta^n}{1-\beta}\right)+a_1, (n=1,2,3,\ldots)\end{aligned} \quad (26)$$

Since the variables α, β are defined by the respective equations (23), (24), equation (27) related to α, β is established. Further, since the average driving current $a_1$ is calculated as the average driving current i(τ) in the above-described equation (17), the above-described equation (26) is rewritten to equation (28). Thus, the solution related to the controlled variable in the form of the average driving current $a_n$ (=average driving current i(nτ)) is obtained through the equation (28).

[Formula 11]

$$\begin{aligned}\alpha\cdot\beta &= \frac{Pb}{\tau}\left\{\frac{L}{Rz^2}\left(1-e^{\frac{Rz}{L}\tau_1}\right)\left(1-e^{\frac{Rz}{L}\tau}\right)\right\}\left(e^{-\frac{Rz}{L}\tau}\right) \\ &= \frac{Pb}{\tau}\left\{\frac{L}{Rz^2}\left(1-e^{\frac{Rz}{L}\tau_1}\right)\left(e^{-\frac{Rz}{L}\tau}-1\right)\right\}\end{aligned} \quad (27)$$

[Formula 12]

$$a_n = \frac{Pb}{\tau}\left\{\frac{L}{Rz^2}\left(1-e^{\frac{Rz}{L}\tau_1}\right)\left(e^{-\frac{Rz}{L}\tau}-1\right)\right\}\frac{e^{-\frac{Rz}{L}\tau}-e^{-\frac{Rz}{L}n\tau}}{1-e^{-\frac{Rz}{L}\tau}}+a_1 \quad (28)$$

$$= \frac{Pb}{\tau}\left\{\frac{L}{Rz^2}\left(1-e^{\frac{Rz}{L}\tau_1}\right)\left(e^{-\frac{Rz}{L}\tau}-1\right)\right\}\frac{e^{-\frac{Rz}{L}n\tau}-e^{-\frac{Rz}{L}\tau}}{e^{-\frac{Rz}{L}\tau}-1}+a_1$$

$$= \frac{Pb}{\tau}\cdot\frac{L}{Rz^2}\left(1-e^{\frac{Rz}{L}\tau_1}\right)\left(e^{-\frac{Rz}{L}n\tau}-e^{-\frac{Rz}{L}\tau}\right)+a_1$$

$$= \frac{\frac{Pb}{\tau}\cdot\frac{L}{Rz^2}\left(1-e^{\frac{Rz}{L}\tau_1}\right)\left(e^{-\frac{Rz}{L}n\tau}-e^{-\frac{Rz}{L}\tau}\right)+}{\frac{Pb}{\tau}\left\{\frac{\tau_1}{Rz}+\frac{L}{Rz^2}\cdot e^{-\frac{Rz}{L}\tau}\left(1-e^{\frac{Rz}{L}\tau_1}\right)\right\}}$$

$$= \frac{\tau_1}{\tau}\cdot\frac{Pb}{Rz}+\frac{Pb}{\tau}\cdot\frac{L}{Rz^2}\left\{\left(e^{\frac{Rz}{L}\tau_1}-1\right)\left(e^{-\frac{Rz}{L}\tau}-e^{-\frac{Rz}{L}n\tau}\right)-e^{-\frac{Rz}{L}\tau}\left(e^{\frac{Rz}{L}\tau_1}-1\right)\right\}$$

$$= \frac{\tau_1}{\tau}\cdot\frac{Pb}{Rz}+\frac{Pb}{\tau}\cdot\frac{L}{Rz^2}\left\{\left(e^{\frac{Rz}{L}\tau_1}-1\right)\left(e^{-\frac{Rz}{L}\tau}-e^{-\frac{Rz}{L}n\tau}-e^{-\frac{Rz}{L}\tau}\right)\right\}$$

$$= \frac{\tau_1}{\tau}\cdot\frac{Pb}{Rz}+\frac{Pb}{\tau}\cdot\frac{L}{Rz^2}\left\{\left(e^{\frac{Rz}{L}\tau_1}-1\right)\left(-e^{-\frac{Rz}{L}n\tau}\right)\right\}$$

$$= \frac{\tau_1}{\tau}\cdot\frac{Pb}{Rz}-\frac{Pb}{\tau}\cdot\frac{L}{Rz^2}\left(e^{\frac{Rz}{L}\tau_1}-1\right)\left(e^{-\frac{Rz}{L}\tau}\right)^n,\ (n=1,2,3,\ldots)$$

Figure 10:
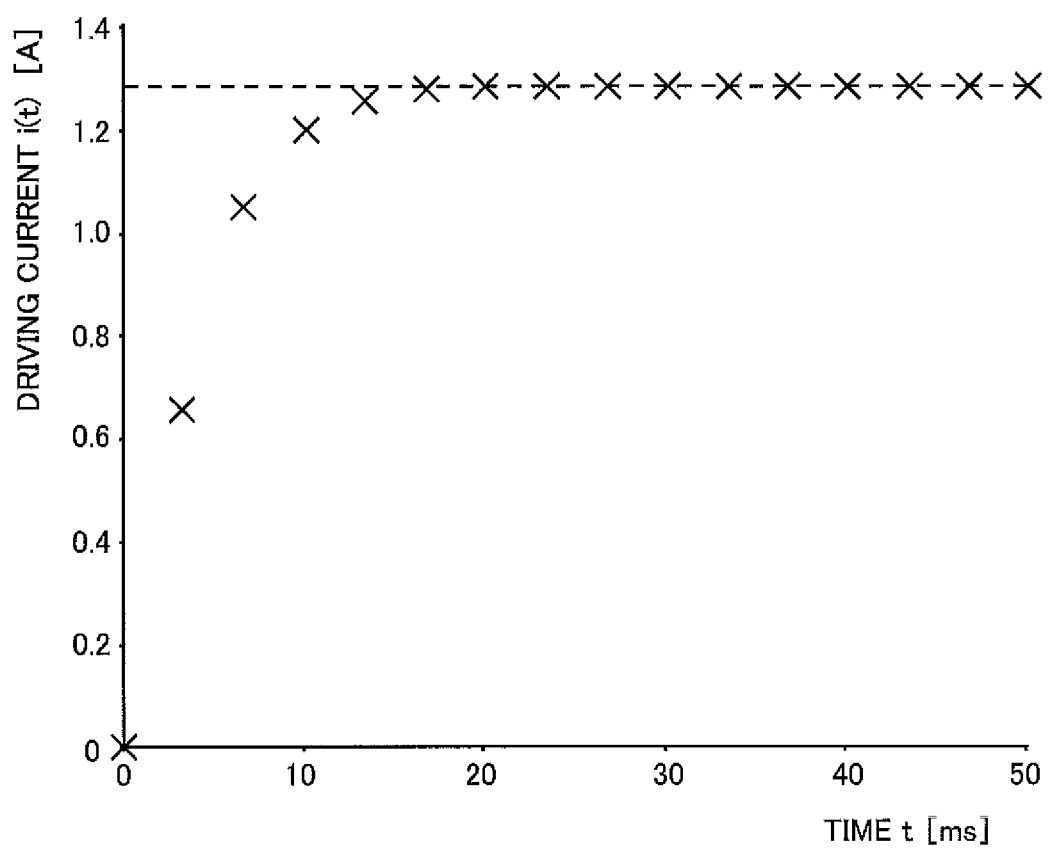
FIG. 10 is a result of simulation in which a duty ratio is changed from 0% to 50% at a point 0 [s] of time, and shows time response as the result of the simulation.

FIG. 10 is a result of simulation in which the duty ratio is changed from 0% to 50% at a point 0 [s] of time, and shows time response as the result of the simulation, which is in accordance with the equation (28). In FIG. 10, X marks indicate the time response of the driving current i(t) which is in accordance with the equation (28), and broken line indicates a converged value of the driving current i(t). The converged value after a sufficient length of time has elapsed, namely, the converged driving current $a_\infty$ with n→∞ in the equation (28) is represented as in equation (29). Thus, since the variable β defined in the above-described equation (24) is β<1, equation (30) related to the converged driving current $a_\infty$ is established.

[Formulas 13]

$$a\infty = \frac{\tau_1}{\tau}\cdot\frac{Pb}{Rz}-\frac{Pb}{\tau}\cdot\frac{L}{Rz^2}\left(e^{\frac{Rz}{L}\tau_1}-1\right)\left(e^{-\frac{Rz}{L}\tau}\right)^\infty \quad (29)$$

$$= \frac{\tau_1}{\tau}\cdot\frac{Pb}{Rz}-\frac{Pb}{\tau}\cdot\frac{L}{Rz^2}\left(e^{\frac{Rz}{L}\tau_1}-1\right)\beta^\infty$$

$$a\infty = \frac{\tau_1}{\tau}\cdot\frac{Pb}{Rz} \quad (30)$$

Thus, the converged driving current $a_\infty$ after the sufficient length of time has elapsed corresponds to "duty ratio battery voltage Pb/resistance Rz", as indicated in the above-described equation (30), so that it is understood that the converged driving current $a_\infty$ has a linear relationship with respect to the duty ratio. Step S50 is followed by step S60.

At step S60 corresponding to steps of the "linearization by approximation equation 190f" and "transfer function derivation by ILQ design method 190g", the solved recurrence equation is linearized by the approximation equation, and the transfer function is derived.

Figure 11:
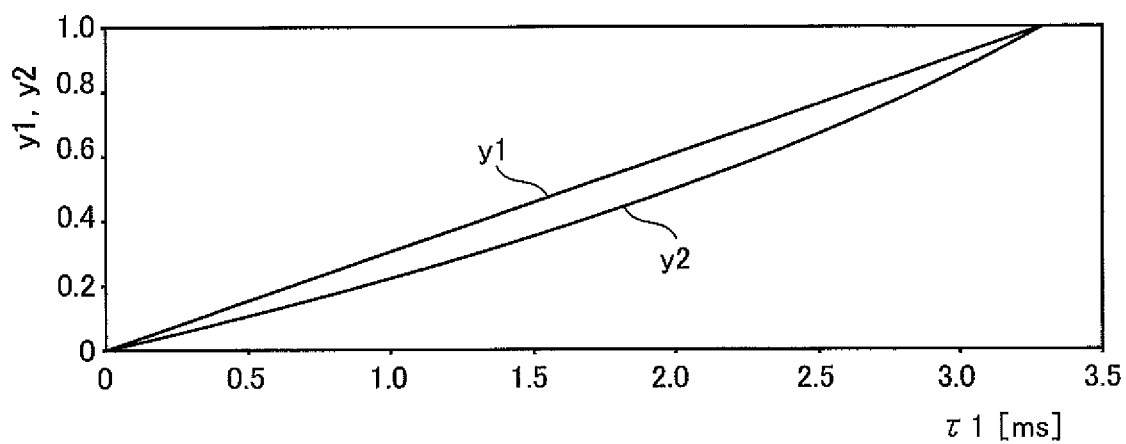
FIG. 11 is a view showing a relationship between an output y1 and ON time $\tau_1$ and a relationship between an output y2 and the ON time $\tau_1$, wherein the output y1 has a linear relationship with respect to possible values of the ON time $\tau_1$ while the output y2 has a non-linear relationship with respect to the possible values of the ON time $\tau_1$.

In the above-described equation (28), the average driving current $a_n$ the controlled variable has a non-linear relationship with respect to the duty ratio. Thus, the recurrence equation is linearized for facilitating designing of the feedback controller portion 176b. Outputs y1, y2 are defined by equations (31), (32), respectively. FIG. 11 is a view showing a relationship between the output y1 and ON time $\tau_1$ and a relationship between the output y2 and the ON time $\tau_1$, wherein the output y1 has a linear relationship with respect to possible values of the ON time $\tau_1$ while the output y2 has a non-linear relationship with respect to the possible values of the ON time $\tau_1$. From the result shown in FIG. 11, it is possible to regard that the outputs y1, y2 are substantially equal to each other, so that it is possible to regard that a left side of equation (33), which has a non-linear relationship with respect to the ON time $\tau_1$ is substantially equal to a right side of the equation (33), which has a linear relationship with respect to the ON time $\tau_1$. Thus, by applying the equation (33) to the equation (28), the average driving current $a_n$ the controlled variable is represented by equation (34) that is linearized by the approximation equation, so as to have a linear relationship with respect to the duty ratio. That is, the equation (33) is the approximation equation by which the equation (28) related to the controlled variable is linearized. It is noted that the equation (33) is identical with the above-described equation (4).

[Formulas 14]

$$y1 = \frac{\tau_1}{\tau} \quad (31)$$

$$y2 = \frac{\left(e^{\frac{Rz}{L}\tau_1}-1\right)}{\tau}\cdot\frac{\tau}{\left(e^{\frac{Rz}{L}\tau}-1\right)} \quad (32)$$

$$\frac{\left(e^{\frac{Rz}{L}\tau_1}-1\right)}{\tau}\stackrel{\cdot}{=}\frac{\tau_1}{\tau^2}\left(e^{\frac{Rz}{L}\tau}-1\right) \quad (33)$$

$$a_n\stackrel{\cdot}{=}\frac{\tau_1}{\tau}\cdot\frac{Pb}{Rz}-\frac{\tau_1}{\tau^2}\cdot\frac{Pb}{Rz}\cdot\frac{L}{Rz}\left(e^{\frac{Rz}{L}\tau}-1\right)\left(e^{-\frac{Rz}{L}\tau}\right)^n \quad (34)$$

$$= \frac{\tau_1}{\tau}\cdot\frac{Pb}{Rz}\left\{1-\frac{\left(e^{\frac{Rz}{L}\tau}-1\right)\cdot\frac{L}{Rz}}{\tau}\left(e^{-\frac{Rz}{L}\tau}\right)^n\right\},\ (n=1,2,3,\ldots)$$

Figure 12:
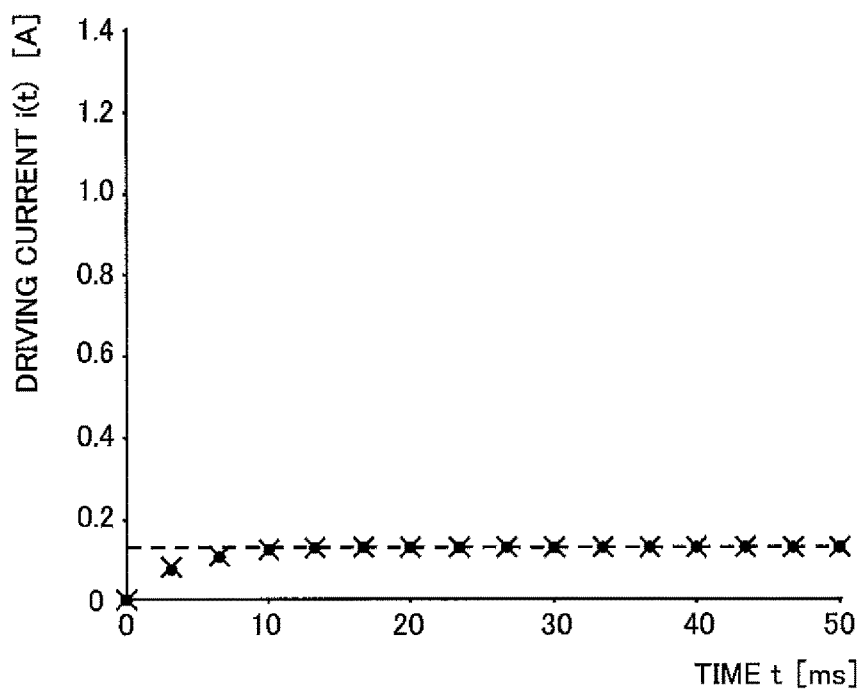
FIG. 12 is a result of simulation in which the duty ratio is set to 5%, and shows the step response as the result of the simulation in case of the non-linear model equation and also in case of the linear model equation.
Figure 13:
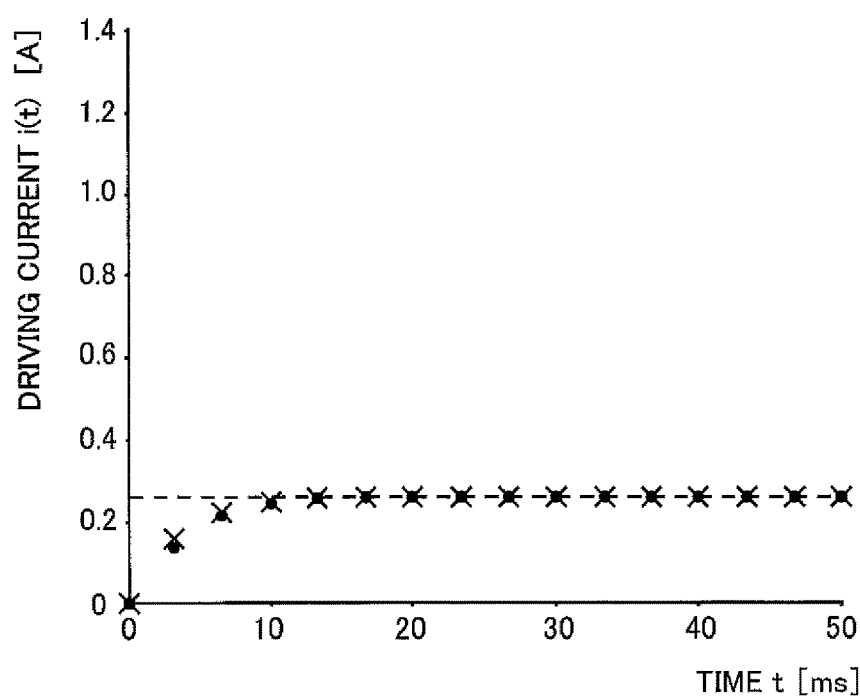
FIG. 13 is a result of simulation in which the duty ratio is set to 10%, and shows the step response as the result of the simulation in case of the non-linear model equation and also in case of the linear model equation.
Figure 14:
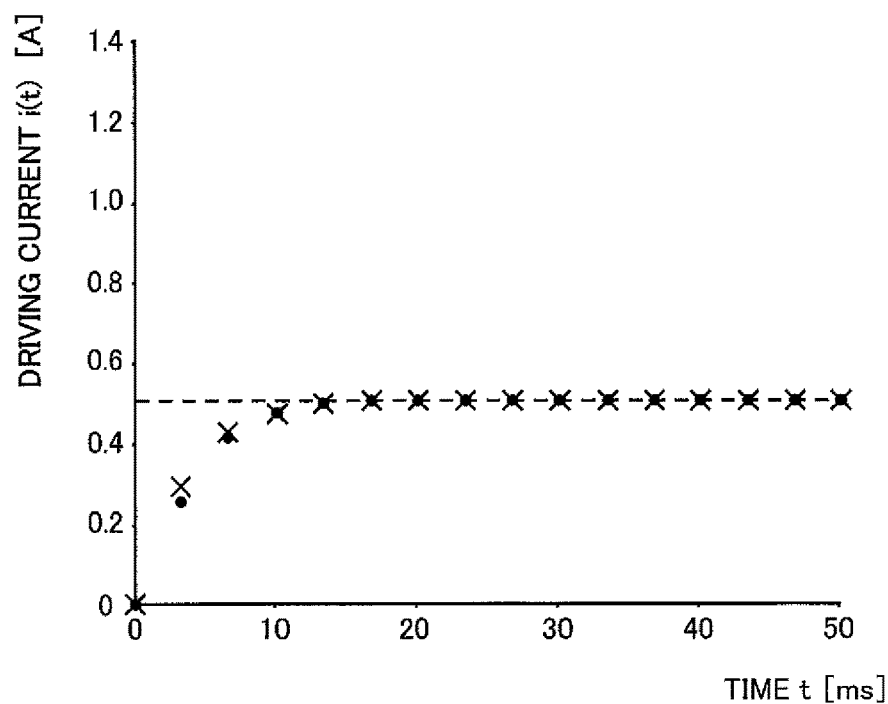
FIG. 14 is a result of simulation in which the duty ratio is set to 20%, and shows the step response as the result of the simulation in case of the non-linear model equation and also in case of the linear model equation.
Figure 15:
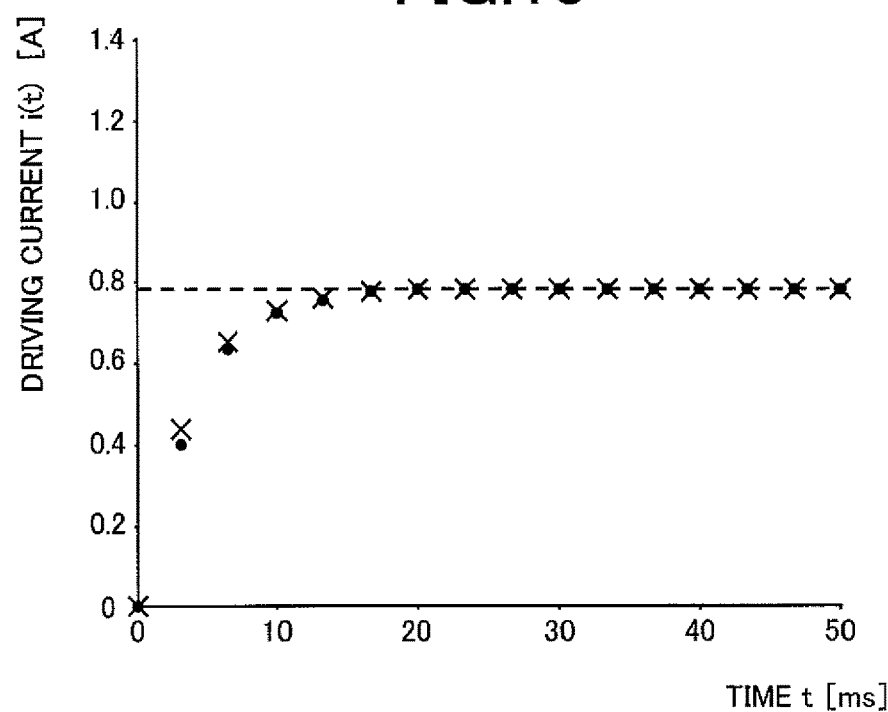
FIG. 15 is a result of simulation in which the duty ratio is set to 30%, and shows the step response as the result of the simulation in case of the non-linear model equation and also in case of the linear model equation.
Figure 16:
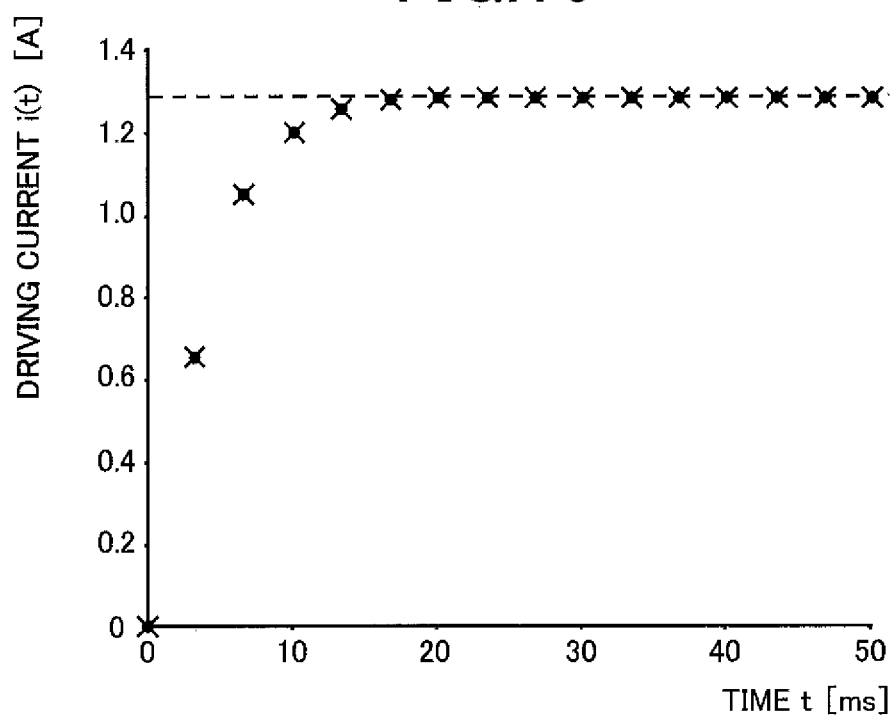
FIG. 16 is a result of simulation in which the duty ratio is set to 50%, and shows the step response as the result of the simulation in case of the non-linear model equation and also in case of the linear model equation.

There will be described influence to the time response of the average driving current $a_n$ as the controlled variable where the average driving current $a_n$ is given a linear relationship with respect to the duty ratio as represented by equation (34). The step response of the average driving current $a_n$ in response to the step input of the input voltage vin(t) at the point 0 [s] is shown in FIGS. 12-16 in which X marks indicate the average driving current $a_n$ in accordance with the equation (28) that is a non-linear model equation, black circle marks indicate the average driving current $a_n$ in accordance with the equation (34) that is a linear model equation, and broken line indicates converged value of the average driving current $a_n$. FIG. 12 is a result of simulation in which the duty ratio is set to 5%, and shows the step response as the result of the simulation in case of the non-linear model equation and also in case of the linear model equation. FIG. 13 is a result of simulation in which the duty ratio is set to 10%, and shows the step response as the result of the simulation in case of the non-linear model equation and also in case of the linear model equation. FIG. 14 is a result of simulation in which the duty ratio is set to 20%, and shows the step response as the result of the simulation in case of the non-linear model equation and also in case of the linear model equation. FIG. 15 is a result of simulation in which the duty ratio is set to 30%, and shows the step response as the result of the simulation in case of the non-linear model equation and also in case of the linear model equation. FIG. 16 is a result of simulation in which the duty ratio is set to 50%, and shows the step response as the result of the simulation in case of the non-linear model equation and also in case of the linear model equation. As is obvious from FIGS. 12-16, the equation (33) as the approximation equation provides a satisfactory approximation also in the step response.

From the equation (34), a transfer function G(s) (continuous time model) of the system is obtained. There will be described a transfer function $G_1(s)$ of the system in which a time function of the step response is represented by equation (35). Equation (36) is obtained by applying Laplace transform to both sides of the equation (35). Thus, the transfer function $G_1(s)$ is represented by equation (37).

[Formulas 15]

$$y(t) = A - B \cdot e^{-\frac{t}{T}} \qquad (35)$$

$$\mathcal{L}[y(t)] = Y(s) = \frac{A}{s} - B \frac{T}{T \cdot s + 1} \qquad (36)$$
$$= \frac{A(T \cdot s + 1) - B \cdot T \cdot s}{s(T \cdot s + 1)}$$
$$= \frac{(A - B)T \cdot s + A}{T \cdot s + 1} \cdot \frac{1}{s}$$

$$G_1(s) = \frac{(A - B)T \cdot s + A}{T \cdot s + 1} \qquad (37)$$

By comparing coefficients in the equations (34), (35), equations (38), (39), (40) are established. A coefficient "(A−B)T" of "s" constituting a numerator of a right side of the equation (37) corresponds to equation (41), so that the transfer function G(s) is represented by equation (42). The transfer function G(s) is represented by equation (43), which is obtained by applying the above-described specification values into the equation (42).

[Formulas 16]

$$A = \frac{\tau_1}{\tau} \cdot \frac{Pb}{Rz} \qquad (38)$$

$$B = \frac{\tau_1}{\tau^2} \cdot \frac{Pb}{Rz}\left(e^{\frac{Rz}{L}\tau} - 1\right) \cdot \frac{L}{Rz} \qquad (39)$$

$$T = \frac{L}{Rz} \qquad (40)$$

$$(A - B)T = \frac{\tau_1}{\tau} \cdot \frac{Pb}{Rz}\left(1 - \frac{\left(e^{\frac{Rz}{L}\tau} - 1\right) \cdot \frac{L}{Rz}}{\tau}\right)\frac{L}{Rz} \qquad (41)$$

$$G(s) = \frac{\tau_1}{\tau} \cdot \frac{Pb}{Rz} \cdot \frac{\left(1 - \frac{\left(e^{\frac{Rz}{L}\tau} - 1\right) \cdot \frac{L}{Rz}}{\tau}\right) \cdot T \cdot s + 1}{T \cdot s + 1} \qquad (42)$$
$$= \frac{\tau_1}{\tau} \cdot \frac{Pb}{Rz} \cdot \left[\frac{\frac{e^{\frac{Rz}{L}\tau} - 1}{\tau}}{T \cdot s + 1} \cdot T + \left\{1 - \left(\frac{e^{\frac{Rz}{L}\tau} - 1}{\tau}\right) \cdot T\right\}\right]$$

$$G(s) = \frac{-0.0009837 \cdot s + 1}{0.003448 \cdot s + 1} \cdot \frac{Pb}{Rz} \cdot \frac{\tau_1}{\tau} \qquad (43)$$
$$= \left(\frac{1.6838}{0.003448 \cdot s + 1} - 0.6838\right) \cdot \frac{Pb}{Rz} \cdot \frac{\tau_1}{\tau}$$

Figure 17:
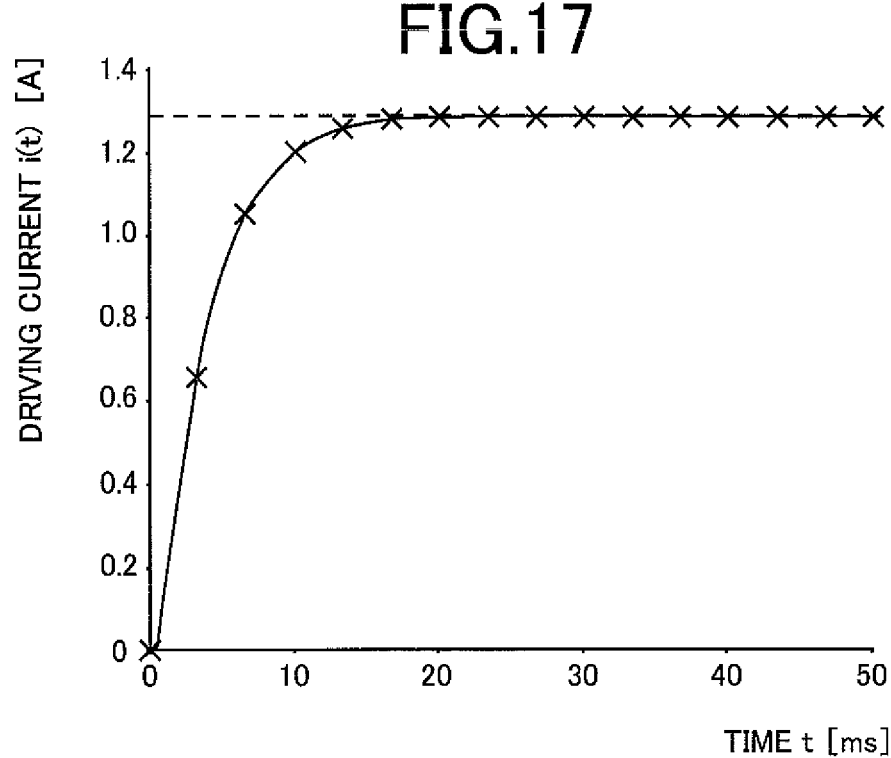
FIG. 17 is a result of simulation in which the duty ratio is set to 50%, and shows the step response as the result of the simulation in case of a continuous model equation and also in case of a discrete model equation.

FIG. 17 is a result of simulation in which the duty ratio is set to 50%, and shows the step response as the result of the simulation in case of the equation (42) as a continuous model equation and also in case of the equation (28) as a discrete model equation. In FIG. 17, solid line indicates the driving current i(t) in accordance with from the continuous model equation, X marks indicate the driving current i(t) in accordance with the discrete model equation, and broken line indicates the converged value of the driving current i(t). The values calculated by the equation (28) as the discrete model equation are the same as those sampled from the step response calculated by the equation (42) as the continuous model equation in the respective driving periods τ.

Figure 18A:
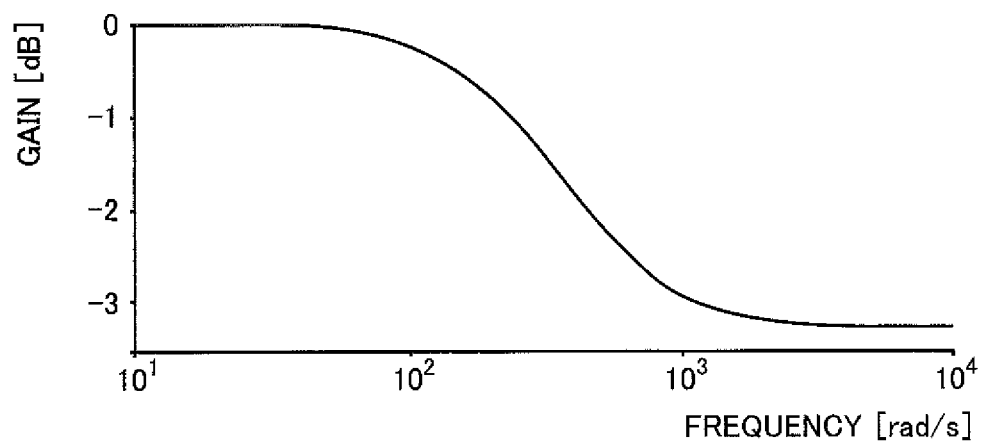
FIGS. 18A and 18B show Bode diagram of a transfer function of a continuous model equation.
Figure 18B:
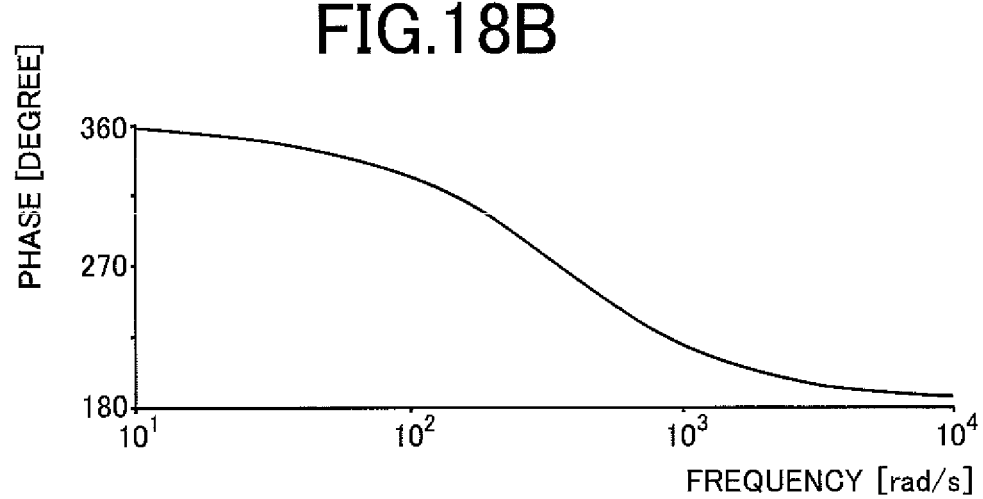

FIGS. 18A and 18B show Bode diagram of the transfer function G(s) of the continuous model equation. FIG. 18A shows frequency characteristic of a gain of the transfer function G(s). FIG. 18B shows frequency characteristic of a phase of the transfer function G(s). From a transmission representation of the transfer function G(s) of the equation (42), it is understood that the transfer function G(s) is formed by a parallel combination of a primary delay block and a gain block that has no dynamics.

There will be described a derivation of a state-space representation model.

The transfer function G(s), which is equation (45), is represented by a state space representation (controllability canonical form) in the form of equations (44). With a steady-state gain of the input and output being taken into consideration, equations (46), (47) using a state variable x1 are established.

[Formulas 17]

$$\left.\begin{array}{c} A = [-290.0] \\ B = [1] \\ C = [372.72647400525] \\ E = [-0.285263703450086] \end{array}\right\} \qquad (44)$$

$$G(s) = C(s \cdot I - A)^{-1} B \cdot \frac{Pb}{Rz} \cdot \frac{\tau_1}{\tau} \quad (45)$$

$$[\dot{x}1] = A[x1] + [1]u \quad (46)$$

$$y = \frac{Pb}{Rz} C[x1] + \frac{Pb}{Rz} E \cdot u \quad (47)$$

After the transfer function G(s) has been derived as described above, step S70 is implemented.

At step S70 corresponding to the step of "parameter input 190h", the parameters of the feedback control system are written or inputted into the parameter storing portion 174 of the electronic control unit 170b. The input of the parameters into the parameter storing portion 174 is made in process of production of each vehicle. The process of determining the parameters of the feedback control system will be described below. Thus, the control target value of the driving current i(t) of the linear solenoid SSLT is determined by using the transfer function that can be represented by a mathematical expression. The process shown in the flow chart of FIG. 9 is completed with the implementation of step S70.

Figure 19:
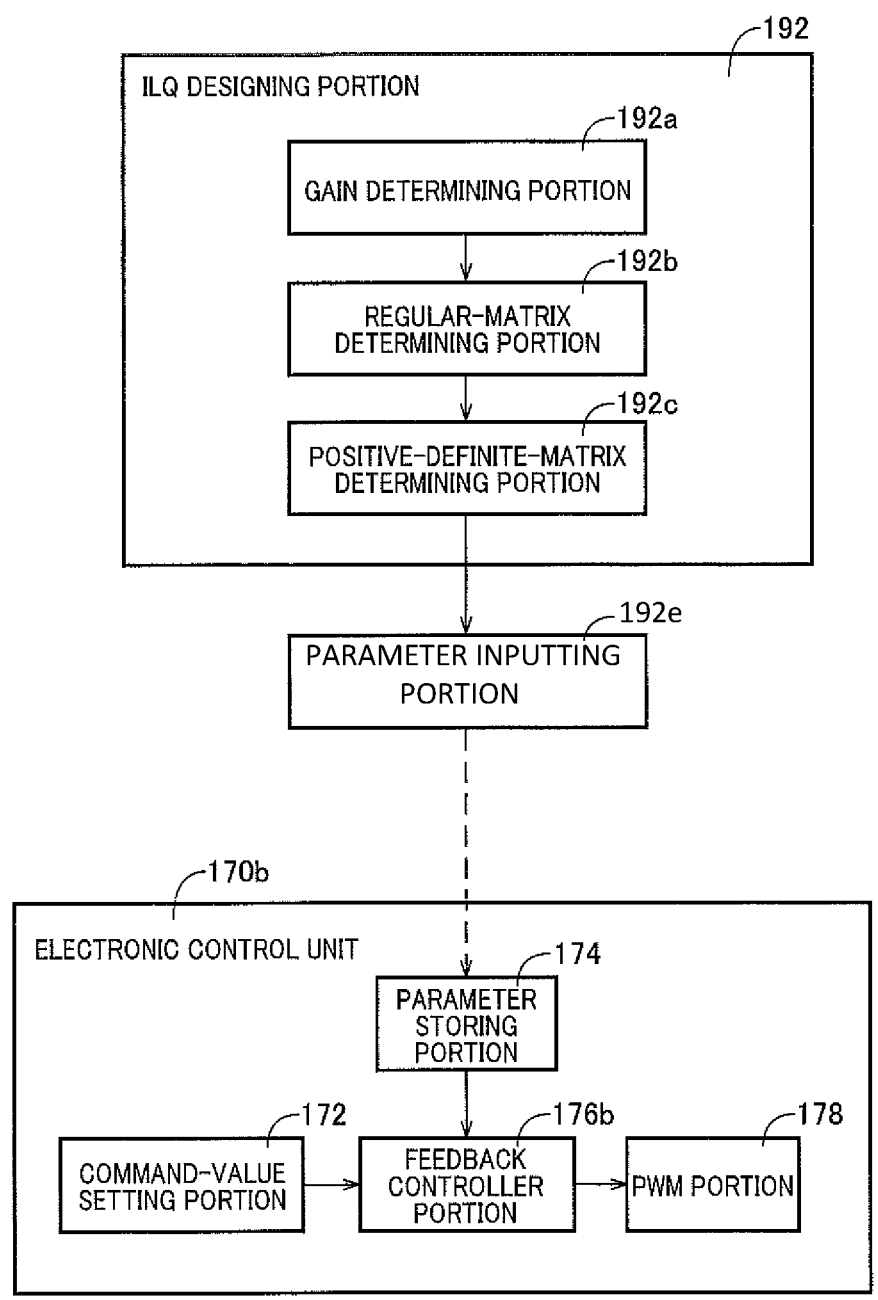
FIG. 19 is a functional block diagram showing a process of determining parameters of the feedback control system in accordance with the ILQ design method in the electronic control unit shown in FIG. 6.

FIG. 19 is a functional block diagram showing a process of determining the parameters of the feedback control system in accordance with ILQ design method in the electronic control unit 170b shown in FIG. 6. An ILQ designing portion 192 is used at the step of "transfer function derivation by ILQ design method 190g" shown in FIG. 8. The ILQ designing portion 192 is a computer aided design system (CAD: Computer Aided Design) as a design tool for executing calculations in the ILQ design method (Inverse Linear Quadratic design method), and includes a gain determining portion 192a, a regular-matrix determining portion 192b, a positive-definite-matrix determining portion 192c, a parameter storing portion 192d and a parameter inputting portion 192e. The ILQ design method, which is referred also to as an inverse-linear quadratic equation optimal control system design method, is an optimal servo system design method to which a result of an inverse problem of an optimal regulator problem (LQ problem) based on a modern control theory is skillfully applied. In the ILQ design method, the solution of the LQ problem can be derived by a simple pole assignment without weighting. The ILQ design method is disclosed in details in a plurality of documents (e.g., title: Robust Control; authors: Hidenori Kimura, Takao Fujii, Takehiro Mori; published by Korona-sha in 1994; see pages 141-153).

The gain determining portion 192a determines a gain K in the feedback control system. The determination of the gain K in accordance with the ILQ design method will be described specifically below. After having determined the gain K, the gain determining portion 192a outputs a command signal to the regular-matrix determining portion 192b. It is noted that the gain K corresponds to one of "parameters" recited in the appended claims.

When receiving the command signal supplied from the gain determining portion 192a, the regular-matrix determining portion 192b determines a regular matrix V in the feedback control system. The determination of the regular matrix V in accordance with the ILQ design method will be specifically described below. After having determined the regular matrix V, the regular-matrix determining portion 192b outputs a command signal to the positive-definite-matrix determining portion 192c.

When receiving the command signal supplied from the regular-matrix determining portion 192b, the positive-definite-matrix determining portion 192c determines a positive definite matrix $\Sigma$ in the feedback control system. The determination of the positive definite matrix $\Sigma$ in accordance with the ILQ design method will be de described specifically below. After having determined the positive definite matrix $\Sigma$, the positive-definite-matrix determining portion 192c outputs the parameters such as the gain K, regular matrix V and positive definite matrix $\Sigma$, to the step of "parameter input 190h" shown in FIG. 8. It is noted that the positive definite matrix $\Sigma$ corresponds to one of "parameters" recited in the appended claims.

As described above, at the step of "parameter input 190h", the parameters such as the gain K, regular matrix V and positive definite matrix $\Sigma$ are written or inputted into the parameter storing portion 174 of the electronic control unit 170b.

There will be described in detail a process of the determination of the parameters of the feedback control system in accordance with the ILQ design method. In the ILQ design method, when a state feedback gain K is given, necessary and sufficient conditions required to minimize an evaluation function for some weighting matrixes Q, R and the parameterization are necessarily given. That is, in a gain structure that is assuredly optimal for the weighting matrixes Q, R as a consequence, a pole assignment of a closed-loop system and a control rule establishing a frequency characteristic of a transfer function are required.

There will be first described the necessary and sufficient conditions of the control rule that is optimum for some weighting matrixes Q, R. The following description will be made by using system matrixes converted as equations (49), (50), which are obtained by applying a base conversion to system matrixes A, B that satisfy a condition of equation (48), without loss of generality, for the purpose of improving prospects of calculation. In the equation (48), "$R^{n \times n}$" represents a set of real number matrixes of n×n order, and "$R^{n \times m}$" represents a set of real number matrixes of n×m order. In the equation (49), "$R^{(n-m) \times (n-m)}$" represents a set of real number matrixes of (n−m)×(n−m) order, "$R^{(n-m) \times m}$" represents a set of real number matrixes of (n−m)×m order and "$R^{m \times (n-m)}$" represents a set of real number matrixes of m×(n−m) order. In the equation (50), "$R^{m \times m}$" represents a set of real number matrixes of m×m order.

[Formulas 18]

$$A \in R^{n \times n}, B \in R^{n \times m} \quad (48)$$

$$\left. \begin{array}{l} A = \begin{bmatrix} A_{11} & A_{12} \\ A_{21} & A_{22} \end{bmatrix} \\ A_{11} \in R^{(n-m) \times (n-m)}, A_{12} \in R^{(n-m) \times m} \\ A_{21} \in R^{m \times (n-m)}, A_{22} \in R^{(n-m) \times (n-m)} \end{array} \right\} \quad (49)$$

$$\left. \begin{array}{l} B = \begin{bmatrix} 0 \\ I \end{bmatrix} \\ I \in R^{m \times m} \end{array} \right\} \quad (50)$$

An optimal regulator gain K is parameterized as equation (51). Further, a weighting matrix R is represented by equation (52). It is noted that "V" represents a regular matrix and "$\Sigma$" represents a positive definite matrix.

$$K = V^{-1} \Sigma V[F_1 I] \quad (51)$$

$$R = V^T \Sigma^{-1} V \quad (52)$$

First, a matrix $F_1$ is determined. From a point of view of a target responsiveness, a vector $g_i$ is set such that $t_i$ is mutually independent with respect to assigned poles $s_1 \ldots s_{n-m}$ in equation (53). Then, a matrix $F_1$ is obtained in equation (54).

[Formulas 19]

$$t_i = (s_i I - A_{11})^{-1} A_{12} g_i \tag{53}$$

$$\left. \begin{array}{l} F_1 = -G_1 T_1^{-1} \\ \text{where } G_1 = [g_1 \ \ldots \ g_{n-m}] \\ \phantom{\text{where }} T_1 = [t_1 \ \ldots \ t_{n-m}] \end{array} \right\} \tag{54}$$

Next, the regular matrix V is determined. For simplification, for example, the regular matrix V is constituted by an identity matrix, since the regular matrix V is not particularly restricted as long as it is a regular matrix.

Next, the positive definite matrix $\Sigma$ is determined based on equation (55) that is a linear matrix inequality. Specifically, a matrix, which is not smaller than $\Sigma_{min}$, is selected as the positive definite matrix $\Sigma$, wherein $\Sigma_{min}$ is a minimum positive definite matrix that makes a positive definite matrix $Y_1$ (>0) feasible in the equation (55).

[Formula 20]

$$\left. \begin{array}{l} \begin{vmatrix} Y_1 \overline{A}_{11} + \overline{A}_{11}^T Y_1 & Y_1 \overline{A}_{12} + \overline{A}_{21}^T \\ \overline{A}_{12}^T Y_1 + \overline{A}_{21} & \overline{A}_{22} + \overline{A}_{22}^T - \sum_{min} \end{vmatrix} < 0 \\ \text{where} \quad \overline{A}_{11} = A_{11} - A_{12} F_1 \\ \phantom{\text{where}} \quad \overline{A}_{12} = A_{12} V^{-1} \\ \phantom{\text{where}} \quad \overline{A}_{21} = V[F_1 \overline{A}_{11} + (A_{21} - A_{22} F_1)] \\ \phantom{\text{where}} \quad \overline{A}_{22} = V(A_{22} + F_1 A_{12}) V^{-1} \end{array} \right\} \tag{55}$$

There will be next described a design problem of an optimal servo system that enables an output y(t) of n-dimensional m-input m-output linear system, which is represented by equations (56), (57) and which is controllable and observable, to follow a current command value r(t) that is changed in steps. The term "controllable" means capable of moving a controlled object desirably by a current input. The term "observable" means capable of estimating a value of a state variable in a system through only an input and an output of a currently installed sensor. A state Xe is expressed by equation (58) wherein "r" represents a current command value, "x" represents a state after input of the current command value r, "u" represents an input, "x (with overline)" represents a steady state value of the state x, and "u (with overline)" represents a steady state value of the input u. Equation (61) represents an extended deviation system of an input v expressed by equation (59) and an output $y_e$ expressed by equation (60), while an evaluation function J is expressed by equation (62). The above-described design problem results in the optimal regulator problem that minimizes the evaluation function J. The optimal servo system is expressed by using equation (64) based on the solution $v = -K_e^* x_e$ and equation (63). The control block diagram is realized by a structure of the feedback controller portion 176a shown in FIG. 5 described above.

[Formula 21]

$$\dot{x} = Ax + Bu \tag{56}$$

$$y = Cx \tag{57}$$

$$x_e = [\ (x - \overline{x})^T \ \ (u - \overline{u})^T\ ]^T \tag{58}$$

$$v = \dot{u} \tag{59}$$

$$y_e = y - r \tag{60}$$

$$\left. \begin{array}{l} \dot{x}_e = A_e x_e + B_e v \\ y_e = C_e x_e \\ A_e = \begin{bmatrix} A & B \\ 0 & 0 \end{bmatrix} \\ B_e = \begin{bmatrix} 0 \\ I \end{bmatrix}, C_e = [\ C \ \ 0\ ] \end{array} \right\} \tag{61}$$

$$J = \int_0^\infty (x_e^T Q x_e + v^T R v) dt \tag{62}$$

$$K_e = [\ K_1 \ \ K_2\ ] \tag{63}$$

$$[K_F \ \ K_I] = [K_1 \ \ K_2] \begin{bmatrix} A & B \\ C & 0 \end{bmatrix}^{-1} \tag{64}$$

In the design of the optimal servo system in accordance with the ILQ design method, the results from the above-described equations (48)-(55) can be applied substantially directly to an extended system constituted by $A_e$, $B_e$, $C_e$. Therefore, the optimal control rule $K_e$ for the extended system is parameterized as equation (65). With the equation (65) being applied to the equation (64), the optimal control rule $K_e$ is expressed by equation (66). The control block diagram corresponds to a structure of the feedback controller portion 176b shown in FIG. 6 described above. However, the calculation is simplified since each system matrix of the extended system has a partial zero matrix.

$$K_e = V^{-1} \Sigma V [KI] \tag{65}$$

$$K_e = V^{-1} \Sigma V [K_F^0 K_I^0] \tag{66}$$

There will be described a process of determining parameters of the equation (65).

First, a gain K is determined. From a point of view of a target responsiveness, a vector $g_i$ is set such that $t_i$ is mutually independent with respect to assigned poles $s_1 \ldots s_{n-m}$ in equation (67). Then, the gain K is obtained in equation (68).

[Formulas 22]

$$t_i = (s_i I - A)^{-1} B g_i \tag{67}$$

$$\left. \begin{array}{l} K = -G_1 T_1^{-1} \\ \text{where } G_1 = [g_1 \ \ldots \ g_{n-m}] \\ \phantom{\text{where }} T_1 = [t_1 \ \ldots \ t_{n-m}] \end{array} \right\} \tag{68}$$

Next, the regular matrix V is determined. As described above, the regular matrix V is constituted by an identity matrix, for example, for simplification.

Next, the positive definite matrix $\Sigma$ is determined based on equation (69) that is a linear matrix inequality. Specifically, a matrix, which is not smaller than $\Sigma_{min}$, is selected as the positive definite matrix $\Sigma$, wherein $\Sigma_{min}$ is a minimum positive definite matrix that makes a positive definite matrix Y (>0) feasible in the equation (69).

[Formula 23]

$$\left. \begin{array}{l} \left| \begin{array}{cc} YA_k + A_k^T Y & YB_v + (K_v A_k)^T \\ B_v^T Y + K_v A_k & (K_v B_v) + (K_v B_v)^T - \sum_{min} \end{array} \right| < 0 \\ \text{where} \quad A_k = A - BK \\ \quad\quad\quad B_v = BV^{-1} \\ \quad\quad\quad K_v = VK \end{array} \right\} \quad (69)$$

There will be described a calculation of the optimal control rule $K_e$ with respect to the extended system ($A_e$, $B_e$, $C_e$) expressed in equation (70). In the calculation, equation transform is made in a simplified manner in view of equation (71).

[Formulas 24]

$$K_e = V^{-1}\Sigma V[K1] = [K_1 K_2] = [\sigma K\sigma] \quad (70)$$

$$V, \Sigma, K_2 \in R^{1\times 1}, K, K_1 \in R^{1\times 1} \quad (71)$$

The gain K is obtained by pole assignment, and a positive definite matrix $\Sigma(\sigma)$ is set to a positive-definite diagonal matrix that is larger than a certain lower limit. In the present embodiment, a assigned pole when $\sigma \to \infty$ is set to $-1/0.0282*3$, for the purpose of causing the control target value to follow a value dulled or moderated by a time constant Tf of 28.2 [ms]. Further, the gains $K_F$, $K_I$ (see FIG. 5), which are equivalently transformed to an integral-type servo system, are obtained in equation (72). It is noted that $A_e$, $B_e$, $C_e$ are expressed by equations (73).

[Formulas 25]

$$[K_F \ K_I] = [K_1 \ K_2] \begin{bmatrix} A & B \\ C & 0 \end{bmatrix}^{-1} = \sigma[K \ 1]\begin{bmatrix} -290.0 & 1 \\ 372.7265 & 0 \end{bmatrix}^{-1} \quad (72)$$

$$= \sigma[K_F^0 \ K_I^0]$$

$$= \sigma[1.1046 \ 0.36684]$$

$$\left. \begin{array}{l} A_e = \begin{bmatrix} A & B \\ 0 & 0 \end{bmatrix} \\ B_e = \begin{bmatrix} 0 \\ 1 \end{bmatrix} \\ C_e = [C \ 0] \end{array} \right\} \quad (73)$$

An optimality-assuring lower-limit $\Sigma_{min}$ is obtained as a minimum positive definite matrix $\Sigma_{min}$ (>0) that makes a positive definite matrix $Y_1$ (>0) feasible in the equation (75) in which "Ak", "By", "Kv" are expressed by equations (74), and the optimality-assuring lower-limit $\Sigma_{min}$ is expressed by equation (76).

[Formulas 26]

$$\left. \begin{array}{l} A_k = A - BK \\ B_v = BV^{-1} = BI^{-1} = B = \begin{bmatrix} 0 \\ 1 \end{bmatrix} \\ K_v = VK = IK = K \end{array} \right\} \quad (74)$$

-continued $$\left| \begin{array}{cc} YA_k + A_k^T Y & YB_v + (K_v A_k)^T \\ B_v^T Y + K_v A_k & (K_v B_v) + (K_v B_v)^T - \sum_{min} \end{array} \right| < 0 \quad (75)$$

$$\sum_{min} = 1 \quad (76)$$

Equations (77), (78) are established as is understood from FIG. 6 that shows the control block diagram of the feedback controller portion 176b that is designed in accordance with ILQ design method in the present embodiment. Equation (79) is obtained by applying the equation (78) to the equation (77). However, the equation (78) is transformed to equations (81) in view of equation (80). Equation (82) is obtained by applying the equations (81) to the equation (79).

[Formulas 27]

$$Y(s) = \left\{ \left(-\frac{K_C}{s} \cdot Y(s) - K_F \cdot X(s)\right)\sigma + D(s) \right\} \times E + C \cdot X(s) \quad (77)$$

$$X(s) = \left\{ \left(-\frac{K_C}{s} \cdot Y(s) - K_F \cdot X(s)\right)\sigma + D(s) \right\} \times G_P(s) \quad (78)$$

$$Y(s) = \frac{X(s)}{G_P(s)} \times E + C \cdot X(s) = \left(\frac{1}{G_P(s)} \times E + C\right)X(s) \quad (79)$$

$$G_P(s) = \dot{x} = Ax + Bu \quad (80)$$

$$\left. \begin{array}{l} \left(-\frac{K_C}{s} \cdot \sigma \cdot Y(s) - K_F \cdot \sigma \cdot X(s) + D(s)\right)G_P(s) = X(s) \\ \left(-\frac{K_C}{s} \cdot \sigma \cdot Y(s) + D(s)\right)G_P(s) = (1 + K_F \cdot \sigma \cdot G_P(s))X(s) \\ X(s) = \dfrac{D(s)G_P(s) - \dfrac{K_C}{s} \cdot \sigma \cdot G_P(s) \cdot Y(s)}{1 + G_P(s) \cdot K_F \cdot \sigma} \end{array} \right\} \quad (81)$$

$$Y(s) = \left(\frac{1}{G_P(s)} \cdot E + C\right)\frac{D(s)G_P(s) - \dfrac{K_C}{s} \cdot \sigma \cdot G_P(s) \cdot Y(s)}{1 + G_P(s) \cdot K_F \cdot \sigma} \quad (82)$$

The equation (82) is transformed to equation (83), by solving "Y(s)". Thus, the transfer function $G_{yd}(s)$ of the feedback controller portion 176b according to the present embodiment, which is shown in FIG. 6, is expressed by equation (84).

[Formulas 28]

$$Y(s) = \left(\frac{1}{G_P(s)} \cdot E + C\right)\left\{\frac{D(s)G_P(s)}{1 + G_P(s) \cdot K_F \cdot \sigma} - \frac{\dfrac{K_C}{s} \cdot \sigma \cdot G_P(s) \cdot Y(s)}{1 + G_P(s) \cdot K_F \cdot \sigma}\right\}$$

$$Y(s) + Y(s) = \left(\frac{1}{G_P(s)} \cdot E + C\right)\frac{\dfrac{K_C}{s} \cdot \sigma \cdot G_P(s)}{1 + G_P(s) \cdot K_F \cdot \sigma} =$$

$$\left(\frac{1}{G_P(s)} \cdot E + C\right)\left(\frac{D(s)G_P(s)}{1 + G_P(s) \cdot K_F \cdot \sigma}\right)$$

$$Y(s) = \left\{1 + \left(\frac{1}{G_P(s)} \cdot E + C\right)\frac{\dfrac{K_C}{s} \cdot \sigma \cdot G_P(s)}{1 + G_P(s) \cdot K_F \cdot \sigma}\right\} =$$

$$\left(\frac{1}{G_P(s)} \cdot E + C\right)\left(\frac{G_P(s)}{1 + G_P(s) \cdot K_F \cdot \sigma}\right)D(s)$$

-continued $$Y(s) = \frac{\left(\frac{1}{G_P(s)} \cdot E + C\right)\left(\frac{G_P(s)}{1 + G_P(s) \cdot K_F \cdot \sigma}\right)}{1 + \left(\frac{1}{G_P(s)} \cdot E + C\right)\frac{\frac{K_C}{s} \cdot \sigma \cdot G_P(s)}{1 + G_P(s) \cdot K_F \cdot \sigma}} \cdot D(s) \quad (83)$$

$$\frac{Y(s)}{D(s)} = \frac{\left(\frac{1}{G_P(s)} \cdot E + C\right)\left(\frac{G_P(s)}{1 + G_P(s) \cdot K_F \cdot \sigma}\right)}{1 + \left(\frac{1}{G_P(s)} \cdot E + C\right)\frac{\frac{K_C}{s} \cdot \sigma \cdot G_P(s)}{1 + G_P(s) \cdot K_F \cdot \sigma}} \quad (84)$$

Figure 20:
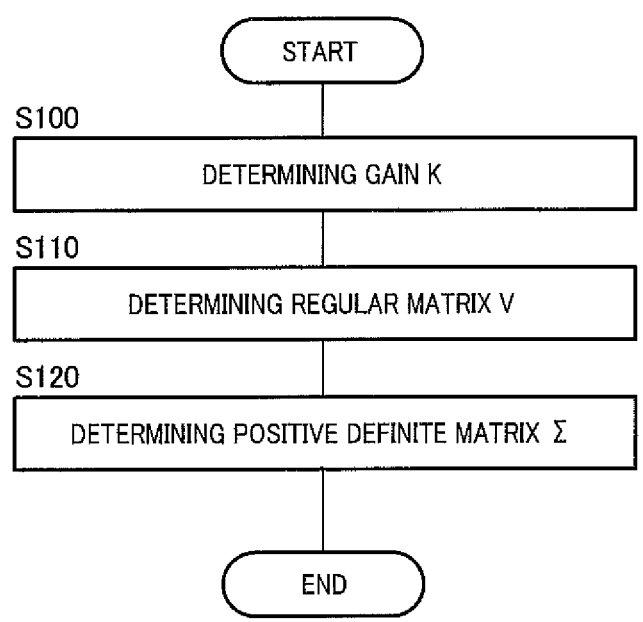
FIG. 20 is a flow chart showing a process of determining the parameters of the feedback control system in accordance with the ILQ design method in the electronic control unit shown in FIG. 6.

FIG. 20 is a flow chart showing a process of determining the parameters of the feedback control system in the electronic control unit 170*b* shown in FIG. 6, in accordance with the ILQ design method. The process shown by the flow chart in FIG. 20 is started to be executed and is executed once in a stage of design process of the feedback control system.

First, at step S100 corresponding to function of the gain determining portion 192*a*, the gain K is calculated and determined. Then, step S100 is followed by step S110.

At step S110 corresponding to function of the regular-matrix determining portion 192*b*, the regular matrix V is calculated and determined. Then, step S110 is followed by step S120.

At step S120 corresponding to function of the positive-definite-matrix determining portion 192*c*, the positive definite matrix Σ is calculated and determined. The process shown in the flow chart of FIG. 20 is completed with the implementation of step S120.

The feedback controller portion 176*b* calculates the output y, by applying a value obtained by subtracting the current signal Iact (that is supplied from the A/D converter ADC) from the current command value r(t) (that is supplied from the command-value setting portion 172), into the feedback control system in which the parameters such as the gain K and the positive definite matrix Σ, which are stored in the parameter storing portion 174, are applied. Then, the feedback controller portion 176*b* outputs the calculated output y to the PWM portion 178.

Figure 21:
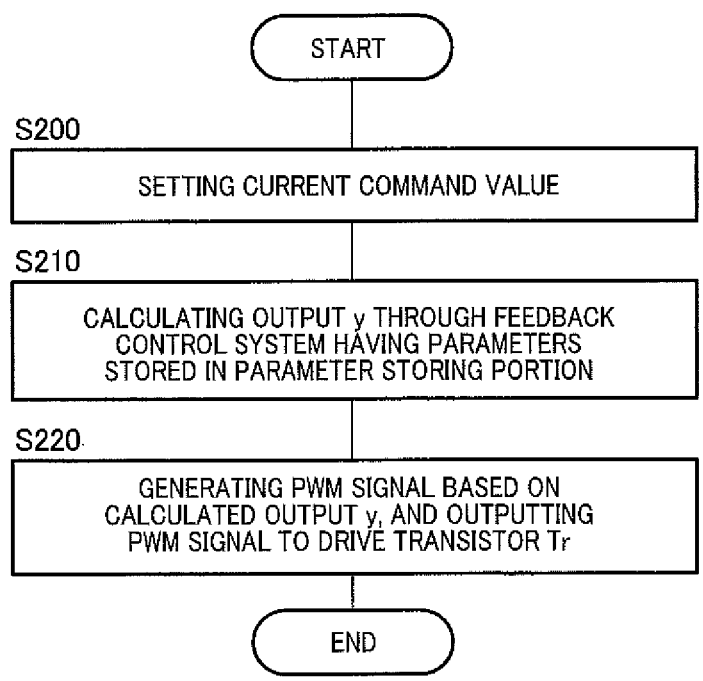
FIG. 21 is a flow chart showing a process of determining the controlled variable in the feedback control system in the electronic control unit.

FIG. 21 is a flow chart showing a process of determining the controlled variable in the feedback control system in the electronic control unit 170. For example, a change of an operation state of the vehicle triggers a start of the process shown in the flow chart of FIG. 21.

First, at step S200 corresponding to function of the command-value setting portion 172, the current command value r(t) representing the control target value in the form of the average value of the driving current i(t) of the linear solenoid SSLT is set. Then, step S200 is followed by step S210.

At step S210 corresponding to functions of the parameter storing portion 174 and the feedback controller portion 176*b*, a deviation e of the current signal Iact of the current signal Iact as an observed value of the output y is subjected to a calculation made by the feedback control system represented by the control block diagram described in the feedback controller portion 176*b* shown in FIG. 6, whereby the output y is calculated. Then, step S210 is followed by step S220.

At step S220 corresponding to function of the PWM portion 178, the PWM signal is generated based on the output y, and is outputted to the gate electrode of the drive transistor Tr. The process shown in the flow chart of FIG. 21 is completed with the implementation of step S220.

Comparative Example

Figure 22:
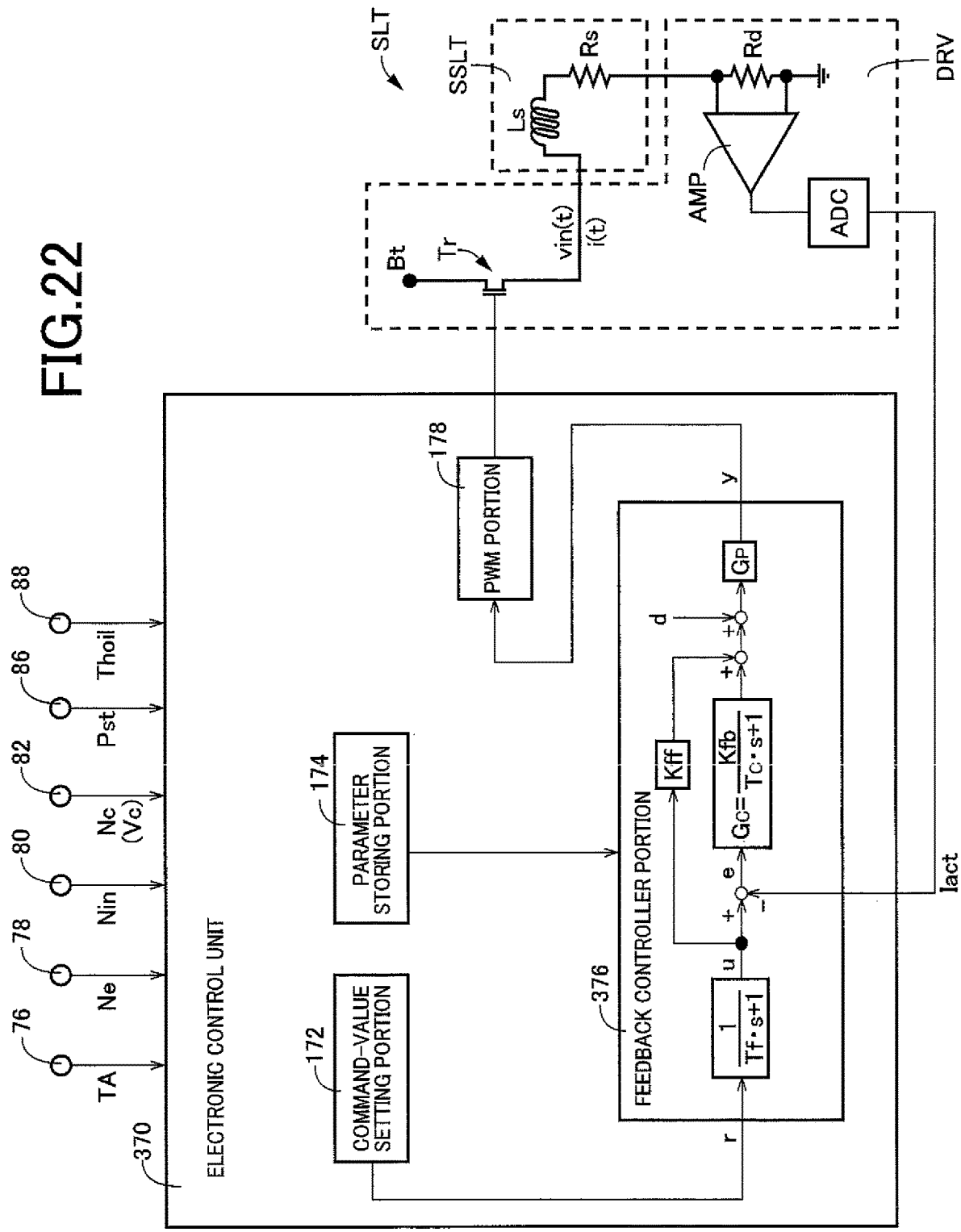
FIG. 22 is a functional block diagram showing the equivalent circuit of the linear solenoid and the drive circuit of the linear solenoid, which are shown in FIG. 4 and also an electronic control unit of the linear solenoid designed by a two-degree-of-freedom control system according to a comparative example.

FIG. 22 is a functional block diagram showing the equivalent circuit of the linear solenoid SSLT, the drive circuit DRV of the linear solenoid SSLT and an electronic control unit 370 of the linear solenoid SSLT. The electronic control unit 370, which is according to a conventional example, is designed by a two-degree-of-freedom control system. The electronic control unit 370 according to the comparative example is substantially the same as the electronic control unit 170 according to the above-described first embodiment. However, the electronic control unit 370 and the electronic control unit 170 are different from each other in that its feedback controller portion 376 is designed by the two-degree-of-freedom control system in the comparative example while each of the feedback controller portions 170*a*, 170*b* has a construction designed by the ILQ design method in the first embodiment. Therefore, the differences will be mainly described, and the same reference signs as used in the above-described first embodiment will be used to identify the functionally corresponding elements, with descriptions thereof being omitted as needed.

The electronic control unit 370 includes the above-described command-value setting portion 172, parameter storing portion 174, PWM portion 178 and feedback controller portion 376.

In the parameter storing portion 174, parameters, which are applied to the feedback control system as described above, are stored in a stage of production of the parameter storing portion 174. It is noted that "the feedback control system" according to the comparative example is represented by a control block diagram described in the feedback controller portion 376 shown in FIG. 22.

The feedback controller portion 376 causes the current command value r(t) supplied from the command-value setting portion 172 to be subjected to the feedback control using the current signal Iact representing the actual driving current i(t), and outputs, as the output y, the current command value r(t) subjected to the feedback control. The output y is outputted to the PWM portion 178. The output y is a signal representing the duty ratio dependent on the average driving current i(nτ) as a controlled variable that is described below.

As described above, the feedback controller portion 376 shown in FIG. 22 has a construction of the feedback control that is constituted by the two-degree-of-freedom control system. Specifically, the feedback controller portion 376 is constituted by a feedforward portion and a feedback portion. The feedforward portion multiplies a manipulated variable u by a transformation coefficient (feedforward gain $K_{ff}$=50) for converting the manipulated variable u into the target duty ratio, wherein the manipulated variable u is obtained by applying a primary low-pass filter of a time constant Tf=28.2 [ms] to the current command value r(t). The feedback portion applies a deviation e of the current signal Iact (that is an observed value of the output y) from the manipulated variable u, to the transfer function $G_C(s)=K_{fb}/(T_C^* s+1)$. A value that is a sum of the manipulated variables calculated by the respective feedforward and feedback portions constitutes a final manipulated variable (parameter $K_{fb}$=60, parameter $T_C$=0.150). The final manipulated variable is subjected to a calculation of the transfer function $G_p(s)$, whereby the average driving current i(nτ) as the output y, i.e., the controlled variable is determined.

By the way, in FIG. 22, "d" represents a disturbance caused when the spool valve body 132 is moved by a hydraulic vibration or the like. The disturbance d is constituted by, for example, a counter electromotive force that is generated in the linear solenoid SSLT by movement of an iron core within a coil as the linear solenoid SSLT, which is made by movement of the spool valve body 132. Further, although the feedforward gain $K_{ff}$ is set to 50, it is preferable that the feedforward gain $K_{ff}$ is set based on the battery voltage Pb and the resistance Rz (that is a sum of the equivalent resistance Rs and the detection resistance Rd), for example, such that the feedforward gain $K_{ff}$ is set to [1/{(Pb)/(Rs+Rd)}], which is derived from the above-described equation (30). It is considered that, in the feedback controller portion 376, there could be caused coupled vibration of the vibration of the spool valve body 132 (that is caused by the hydraulic vibration) and vibration of the driving current i(t). It is understood that the coupled vibration is likely to be generated, by analyzing characteristic of the transfer function $G_{yd}(s)$ that represents a ratio of the output y to the disturbance d in FIG. 22. It is noted that the coupled vibration is complicated vibration caused by two or more vibration systems that act or influence on each other. In coupled vibration, movement of vibrational state between a vibration system and another vibration system is seen. The coupled vibration could be a factor worsening convergence and responsiveness in controlling the vibration system to a certain control target value.

The transfer function $G_{yd}(s)$ of the feedback controller portion 376 shown in FIG. 22 is expressed by equation (85). Where the values of the above-described transfer function $G_p(s)$ are used, a specific numerical solution of the transfer function $G_{yd}(s)$ is expressed by equation (86).

[Formulas 29]

$$Gyd(s) = \frac{G_P(s)}{1 + G_c(s)G_p(s)} \quad (85)$$

$$Gyd(s) = \frac{-0.0001476s^2 + 0.149s + 1}{0.0005172s^2 + 0.09443s + 61} \quad (86)$$

Figure 23A:
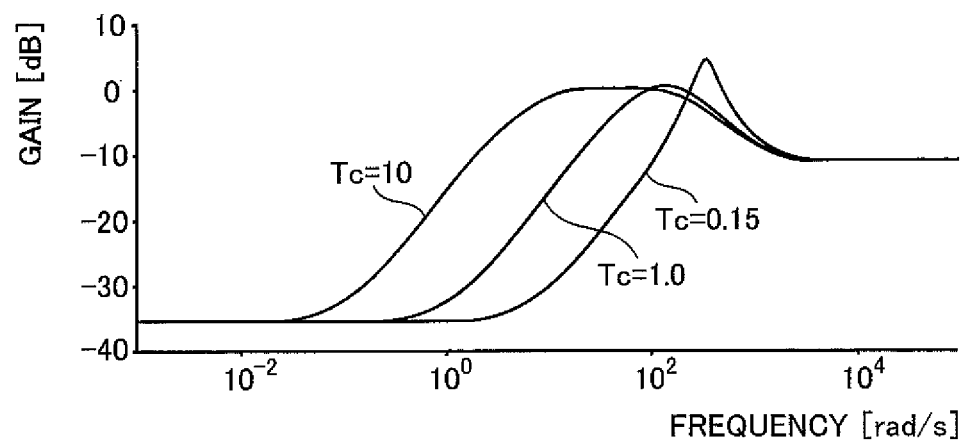
FIGS. 23A and 23B show Bode diagram of the transfer function representing a ratio of an output y to a disturbance d in a feedback controller portion shown in FIG. 22, and a result of a simulation in which a parameter $T_c$ is changed.
Figure 23B:
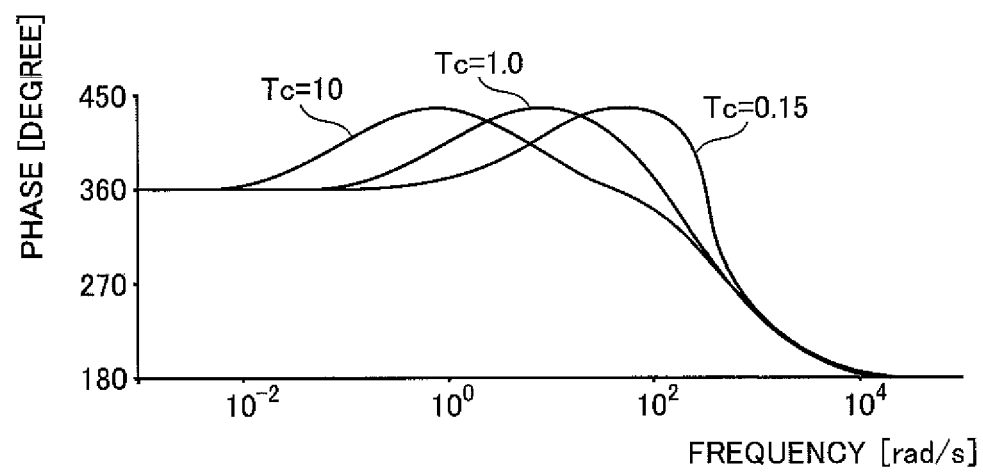
Figure 24A:
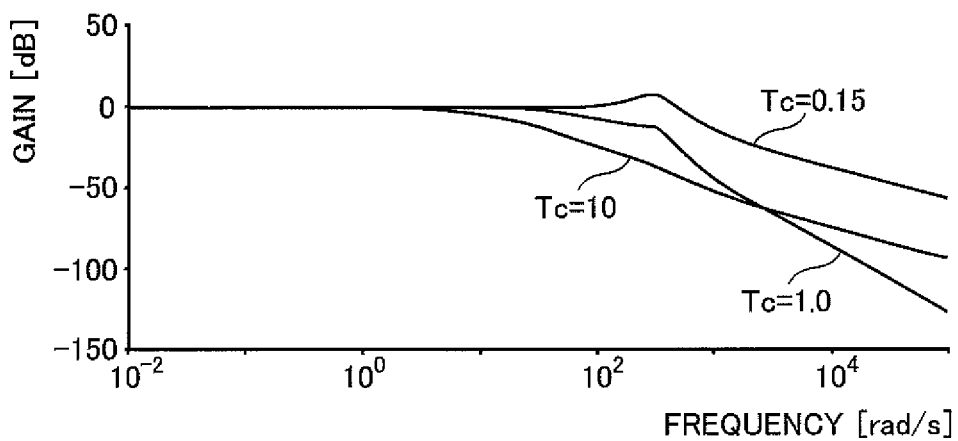
FIGS. 24A and 24B show Bode diagram of the transfer function representing a ratio of the output y to a manipulated variable u in the feedback controller portion shown in FIG. 22, and a result of a simulation in which the parameter $T_c$ is changed.
Figure 24B:
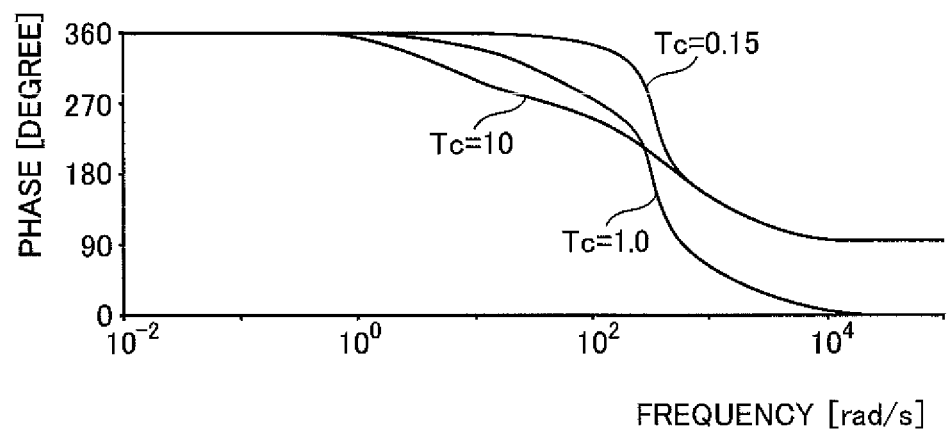

The parameters of the feedback controller portion 376 and characteristic change of the system will be described. The transfer function $G_{yu}(s)$ representing a ratio of the output y to the manipulated variable u is expressed by equation (87). The numerical solution of the transfer function $G_{yu}(s)$ is obtained by using specification values, and the transfer function $G_{yu}(s)$ is expressed by equation (88). The numerical solution after a sufficient time has elapsed to the step input is expressed by equation (89). Therefore, since a static current accuracy is influenced by change of the parameter $K_{fb}$ (=60) of the feedback controller portion 376, another parameter $T_c$ of the feedback controller portion 376 is changed. FIGS. 23A and 23B show Bode diagram of the transfer function $G_{yd}(s)$ representing a ratio of the output y to the disturbance d in the feedback controller portion 376 shown in FIG. 22, and a result of a simulation in which the parameter $T_c$ is changed. FIGS. 24A and 24B show Bode diagram of the transfer function $G_{yu}(s)$ representing a ratio of the output y to the manipulated variable u in the feedback controller portion 376 shown in FIG. 22, and a result of a simulation in which the parameter $T_c$ is changed. Thus, when the coupled vibration of hydraulic pressure is problematic, the responsiveness is worsened, but resonance can be avoided without the static current accuracy being sacrificed, by adjustment of the parameter $T_c$.

[Formula 30]

$$Gyu(s) = \frac{G_c(s)G_p(s)}{1 + G_c(s)G_p(s)} \quad (87)$$

$$Gyu(s) = \frac{-0.008853s^2 + 8.911s + 60}{7.759 \times 10^5 s^3 + 0.01468s^2 + 9.244s + 61} \quad (88)$$

$$\lim_{s \to \infty} Gyu(s)\frac{1}{s} \cdot s = \frac{60}{61} = 0.9836 \quad (89)$$

Hereinafter, the feedback controller portion 176b designed in accordance with the ILQ design method according to the present embodiment and the feedback controller portion 376 designed by the two-degree-of-freedom control system according to the comparative example are compared in terms of characteristics.

Figure 25A:
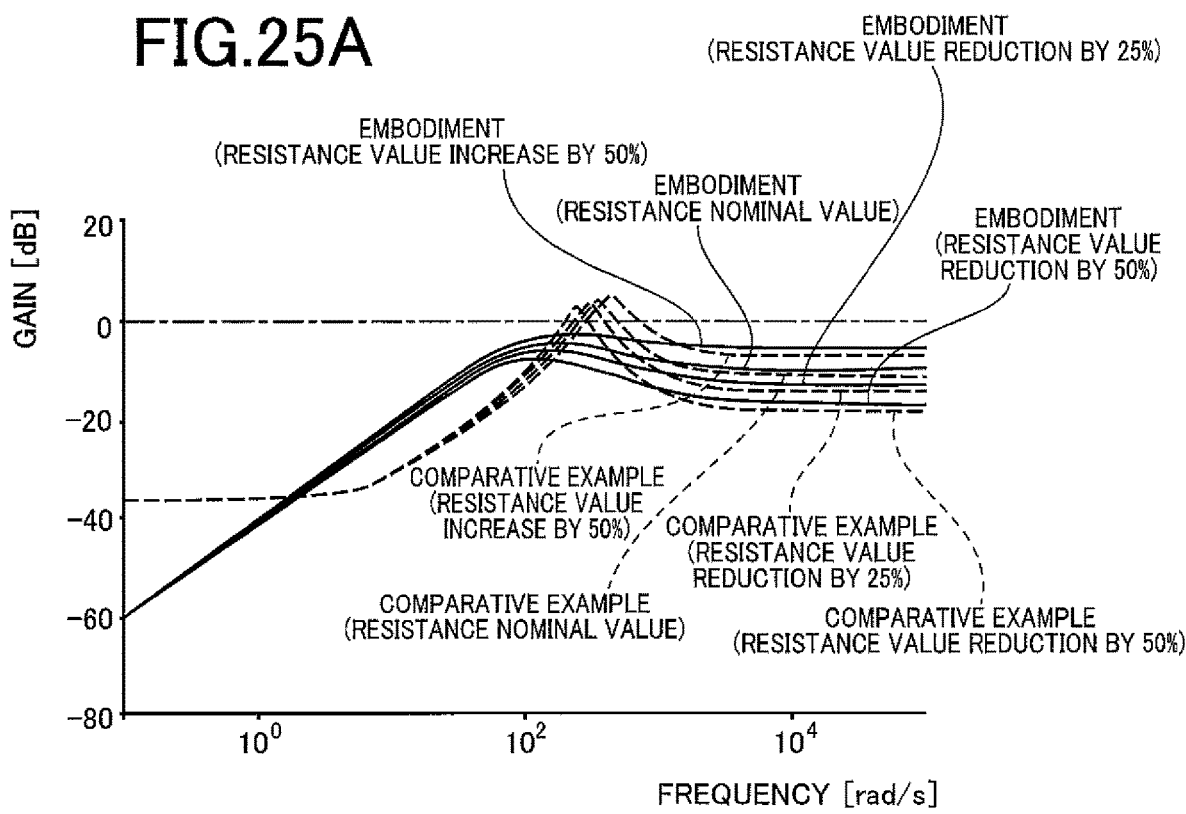
FIGS. 25A and 25B show Bode diagram of the transfer function $G_{yd}(s)$ in the feedback controller portion shown in FIG. 6 and a simulation result.
Figure 25B:
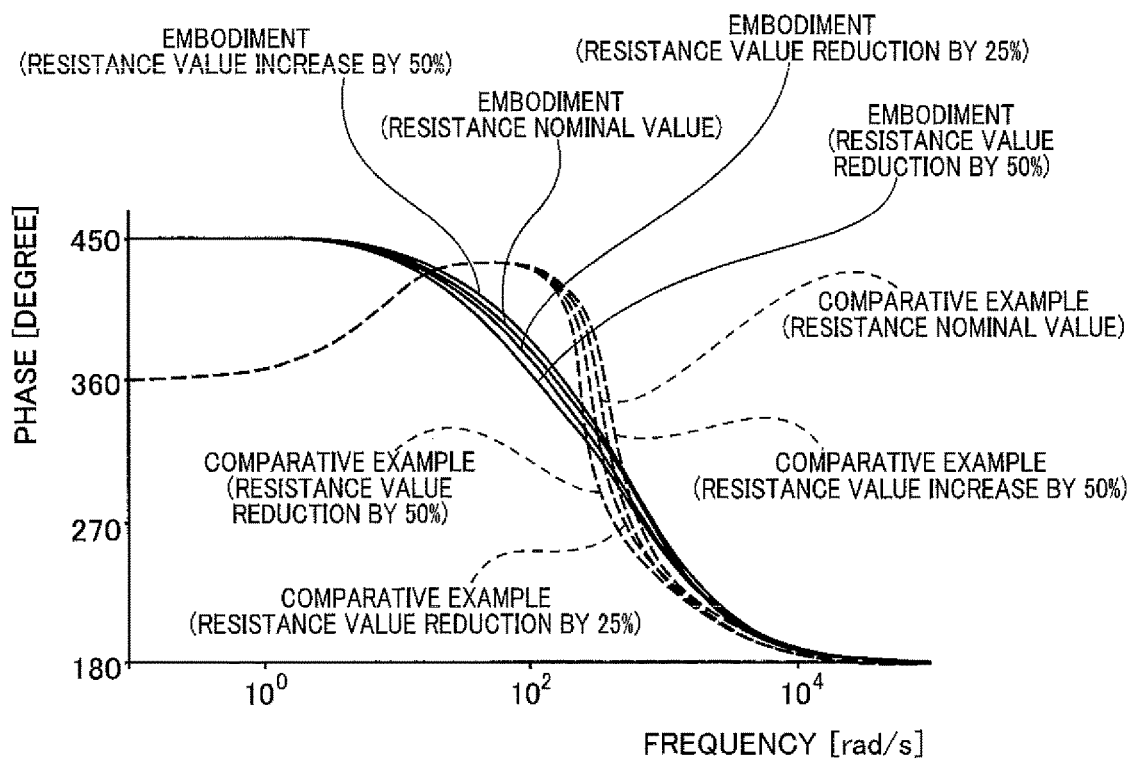

FIGS. 25A and 25B show Bode diagram of the transfer function $G_{yd}(s)$ and a result of a simulation in which the resistance Rz is changed, wherein solid lines represent the result in the feedback controller portion 176b expressed by equation (84) according to the present embodiment while broken lines represent the result in the feedback controller portion 376 expressed by equation (86) according to the comparative example. FIG. 25A represents the frequency characteristic of the gain of the transfer function $G_{yd}(s)$. FIG. 25B represents the frequency characteristic of a phase of the transfer function $G_{yd}(s)$.

FIG. 25A indicates, in the feedback controller portion 376 according to the comparative example, a resonance frequency range is changed with respect to change of the resistance Rz, which is caused by change of the equivalent resistance Rs that constitutes a part of the resistance Rz wherein the change of the equivalent resistance Rs is changed with change of temperature of the linear solenoid SSLT. In the feedback controller portion 376 according to the comparative example, there is a resonance frequency range with the gain exceeding 0 [dB], at about 300 [rad/s]. On the other hand, in the closed-loop system of the feedback controller portion 176b according to the present embodiment, although the gain characteristic is changed, there is no range in which the gain exceeds 0 [dB], throughout all frequency ranges, so that it is understood that the coupled vibration is unlikely to occur. Thus, as compared with the feedback controller portion 376 according to the comparative example, the feedback controller portion 176b according to the present embodiment provides a higher robustness against change of the resistance Rz.

Figure 26:
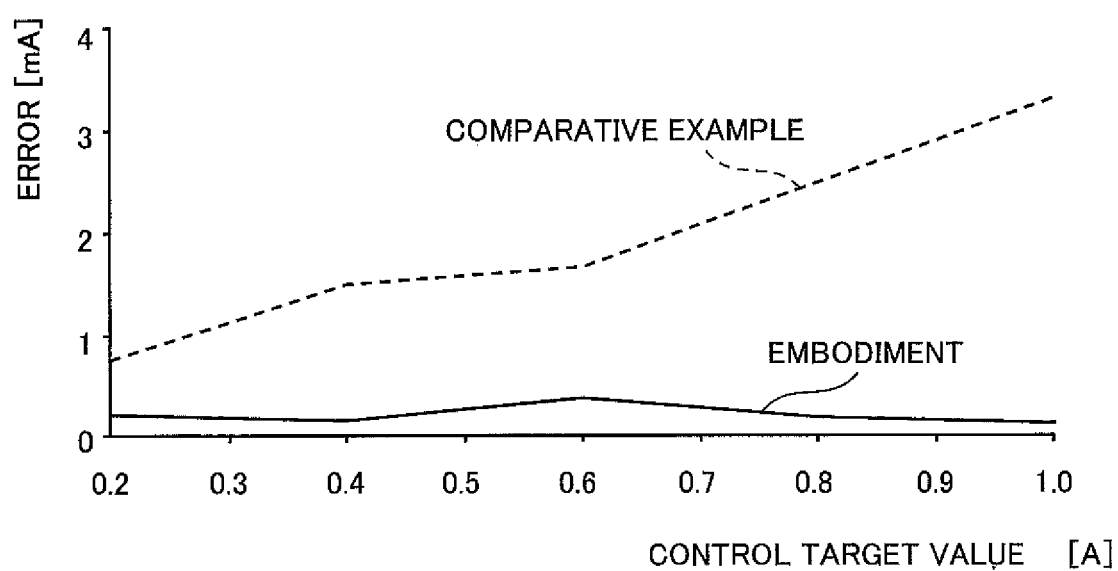
FIG. 26 shows a simulation result regarding a static current accuracy (absolute error and relative error) in the feedback controller portion shown in FIG. 6.

FIG. 26 shows a simulation result regarding the static current accuracy (absolute error and relative error) in the feedback controller portion 176b according to the present embodiment. FIG. 26 shows also a simulation result regarding the static current accuracy (absolute error and relative error) in the feedback controller portion 376 according to the comparative example, for reference. In the feedback controller portion 376 according to the comparative example, since the driving current i(t) is converged to a vicinity of the control target value by increasing the feedback gain, the error is increased (the error ratio is substantially constant) with increase of the current command value r(t) corresponding to the control target value. On the other hand, in the feedback controller portion 176b according to the present embodiment, which is a servo system of type 1, although the deviation is theoretically 0 [A], the error of about 0.1 [mA] is seen in any level of the current command value r(t)

corresponding to the control target value, due to a discretization error or the like, in the simulation.

Figure 27A:
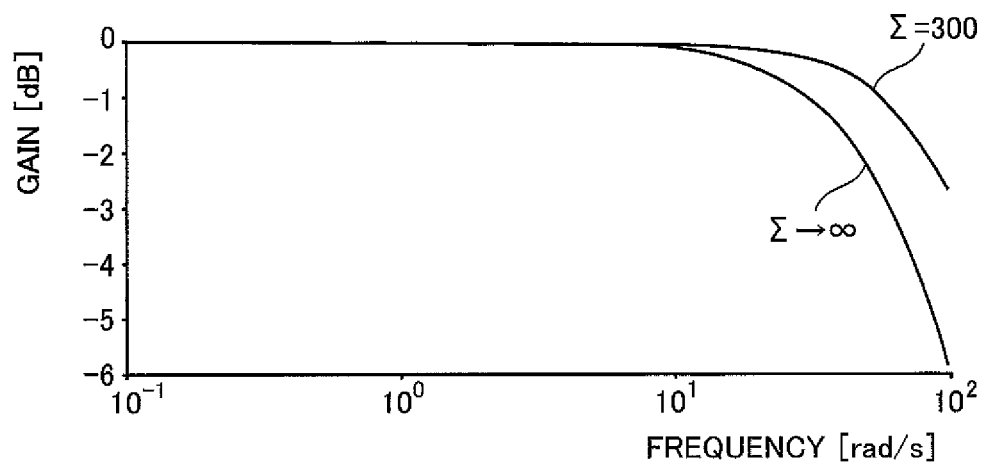
FIGS. 27A and 27B show Bode diagram of the transfer function G(s) in the feedback controller portion shown in FIG. 6 and a simulation result.
Figure 27B:
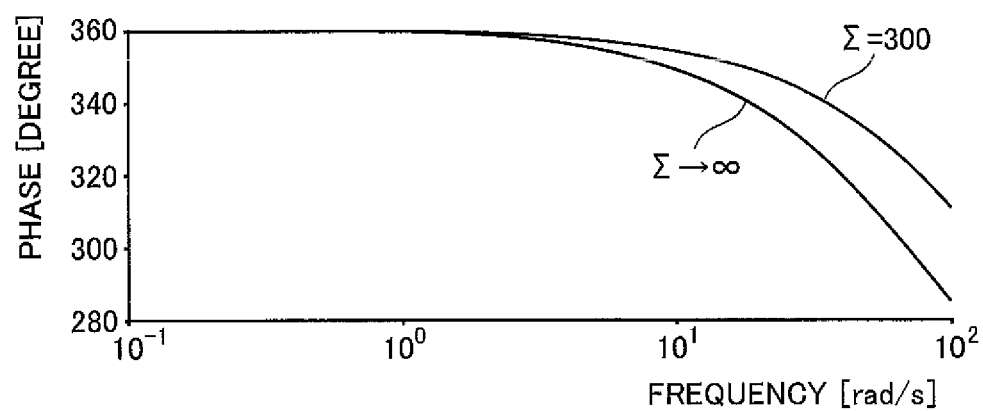

FIGS. 27A and 27B show Bode diagram of the transfer function G(s) that represents a ratio of the output y to the current command value r in the feedback controller portion 176b according to the present embodiment, and a simulation result. From the Bode diagram of FIGS. 27A and 27B, it is understood that the control system according to the present embodiment, which is designed by the ILQ design method, exhibits a gain characteristic of a monotonic decrease of a closed loop system and is constituted by a closed loop characteristic without resonance mode.

Figure 28:
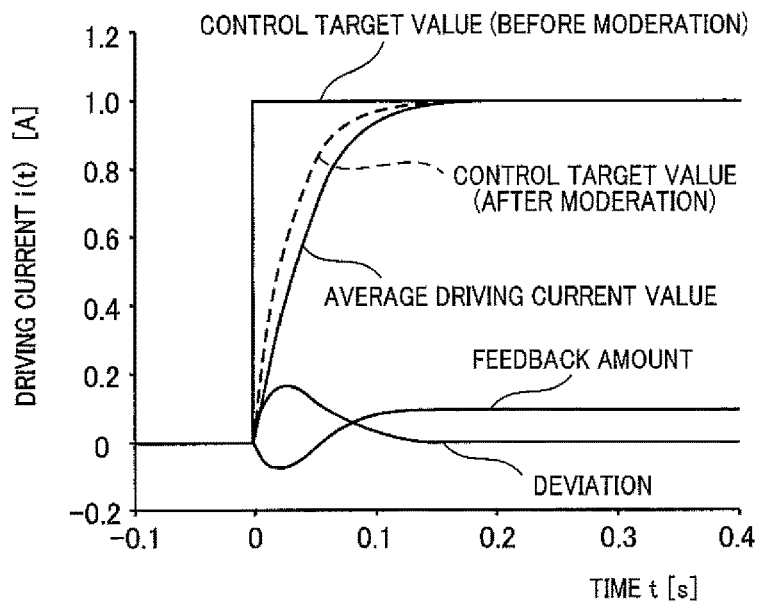
FIG. 28 is a view explaining a deviation and a feedback correction amount in step response in the feedback controller portion shown in FIG. 6.

FIG. 28 is a view explaining a deviation and a feedback correction amount in the step response in the feedback controller portion 176b according to the present embodiment. As shown in FIG. 28, the current command value r(t) corresponding to the control target value is changed in step from 0 [A] to 1.0 [A] at a point 0 [s] of time, before the current command value r(t) is dulled or moderated. On the other hand, after being moderated, the current command value r(t) corresponding to the control target value is moderated with the time constant Tf being 28.2 [ms], wherein the positive definite matrix Σ as the parameter for tuning is set to 300. As is understood from FIG. 28, a sufficiently high responsiveness to the current command value r(t) (after the moderation) is performed without overshooting.

Figure 29A:
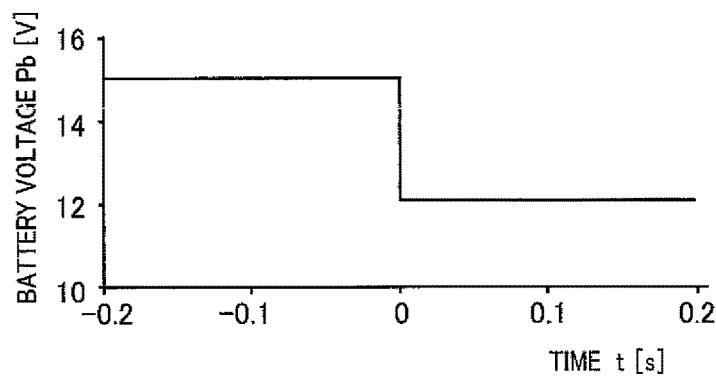
FIGS. 29A and 29B show a simulation result of a response to a step change (reduction) of the battery voltage in the feedback controller portion shown in FIG. 6.
Figure 29B:
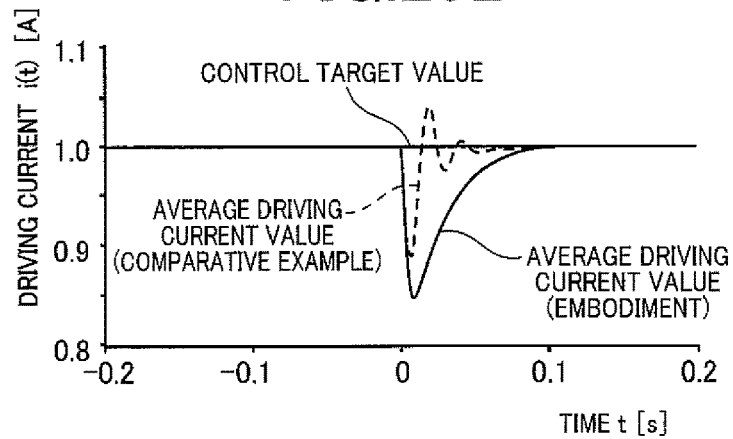
Figure 30A:
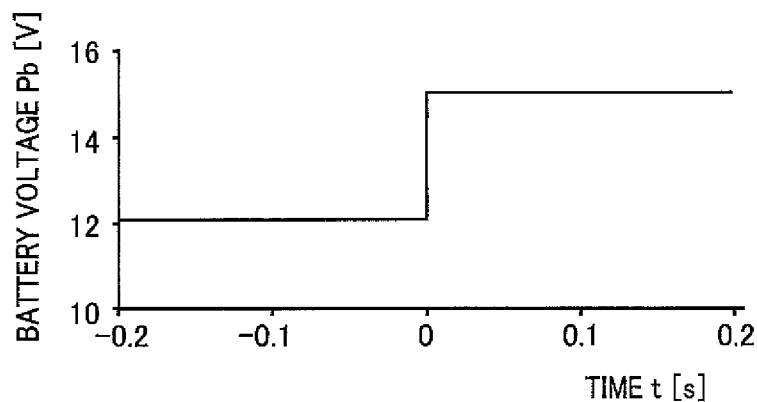
FIGS. 30A and 30B show a simulation result of a response to a step change (increase) of the battery voltage in the feedback controller portion shown in FIG. 6.
Figure 30B:
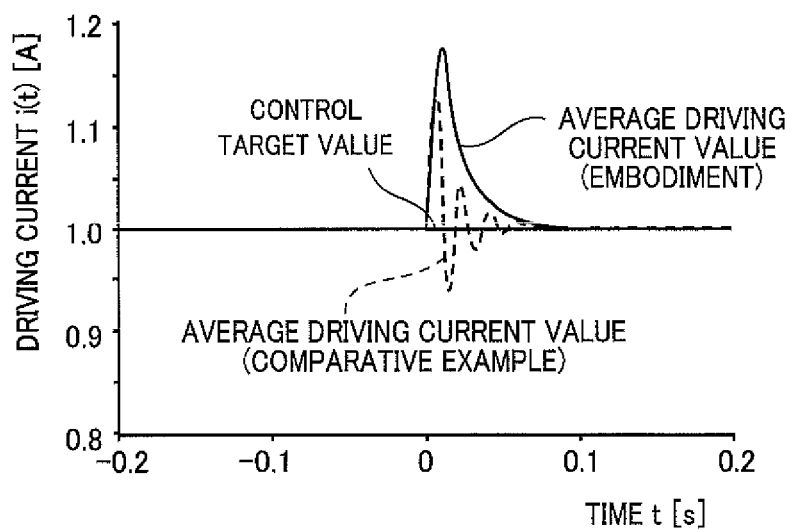

FIGS. 29A and 29B show a simulation result of a response to a step change (reduction) of the battery voltage Pb in the feedback controller portion 176b according to the present embodiment. FIGS. 29A and 29B show also a simulation result of a response to a step change (reduction) of the battery voltage Pb in the feedback controller portion 376 according to the comparative example, for reference. FIG. 29A shows change of the battery voltage Pb with respect to time. At a point 0 [s] of time, the battery voltage Pb which had been 15 [V] is reduced at step to 12 [V]. FIG. 29B shows a change of the average Iave of the driving current i(t) when the battery voltage Pb is changed at step as shown in FIG. 29A. FIGS. 30A and 30B show a simulation result of a response to a step change (increase) of the battery voltage Pb in the feedback controller portion 176b according to the present embodiment. FIGS. 30A and 30B show also a simulation result of a response to a step change (increase) of the battery voltage Pb in the feedback controller portion 376 according to the comparative example, for reference. FIG. 30A shows change of the battery voltage Pb with respect to time. At a point 0 [s] of time, the battery voltage Pb which had been 12 [V] is increased at step to 15 [V]. FIG. 30B shows a change of the average Iave of the driving current i(t) when the battery voltage Pb is changed at step as shown in FIG. 30A. The battery voltage Pb is used also as a power supply voltage for an air-conditioning equipment (such as air conditioner) and an audio equipment (such as radio), so that the battery voltage Pb could be changed in step upon switching on/off of the air-conditioning equipment and/or the audio equipment. As is estimated from the transfer function $G_{yd}(s)$ representing the ratio of the output y to the disturbance d, the driving current i(t) is converged while being fluctuated in the feedback controller portion 376 according to the comparative example, while the deviation is smoothly reduced to zero in the feedback controller portion 176b according to the present embodiment.

In the electronic control unit 170b according to the present embodiment, the feedback control is executed with the feedback control system having the parameters that are determined in accordance with the ILQ design method, wherein the gain of the transfer function $G_{yd}(s)$, which represents the ratio of the output y to the disturbance d in the feedback control system, is lower than 0 [dB] throughout all frequency ranges. With use of the feedback control system having the parameters determined in accordance with the ILQ design method, it is possible to reduce the adapting steps of adapting the parameters for each of various levels of the state value such as the power supply voltage, which is the responsiveness factor. Further, in the execution of the feedback control with the feedback control system, the driving current i(t) is controlled such that the driving current i(t) is converged to the control target value (corresponding to a control command value) at a high responsiveness with respect to step change of the control target value and step change of the battery voltage Pb of the drive circuit DRV of the linear solenoid SSLT, without causing the control system to be vibrated and without causing coupled vibration in the linear solenoid SSLT.

In the electronic control unit 170b according to the present embodiment, the linear solenoid SSLT is provided in the linear solenoid valve SLT that is configured to supply the control hydraulic pressure PS to the line-pressure regulator valve 110 for controlling the line pressure PL generated by the line-pressure regulator valve 110 in the hydraulic control unit 18 of the vehicle automatic transmission 14. Owing to this arrangement, the control hydraulic pressure PS, which is for controlling the line pressure PL generated by the line-pressure regulator valve 110 provided in the vehicle automatic transmission 14, is controlled to provide a high responsiveness without its vibration, whereby the line pressure PL generated by the line-pressure regulator valve 110 is also controlled to a high response without its vibration.

In the electronic control unit 170b according to the present embodiment, the driving current i(t) supplied to the linear solenoid SSLT is controlled by the input voltage vin(t) that is obtained by causing the battery voltage Pb to be subjected to the ON-OFF control based on the PWM signal, wherein the electric circuit of the linear solenoid SSLT, through which the driving current i(t) flows, is approximated by the series circuit of the resistance Rz and the inductance L, wherein the circuit equation related to the instantaneous value of the driving current i(t) flowing through the series circuit is formulated, wherein the equation related to the average driving current i(nτ) as the controlled variable for controlling the driving current i(t) is formulated, wherein the equation related to the average driving current i(nτ) is derived as the recurrence equation, wherein the recurrence equation is solved, and the solved recurrence equation is linearized by the approximation equation, and wherein the transfer function of the feedback control is derived from the linearized equation related to the controlled variable, and the derived transfer function is used to determine the average driving current i(nτ). Thus, the transfer function, which is accurately linearized and approximated, is derived whereby the average driving current i(nτ) as the controlled variable is determined by calculations, so that it is possible to reduce the adapting steps of adapting the parameters for each of various levels of the state value such as the power supply voltage, which is the responsiveness factor. For example, it is possible to reduce the adapting steps for adapting the parameters for change of the battery voltage Pb that corresponds to the power supply voltage of the linear solenoid SSLT and change of the control target value of the driving current i(t) of the linear solenoid SSLT.

In the electronic control unit 170b according to the present embodiment, the circuit equation is formulated as the equation (1), the equation related to the controlled variable that is the average value of the driving current i(t)

in an n-th period (n: natural number) is formulated as the equation (2), the recurrence equation is formulated as the equation (3), and the approximation equation is formulated as the equation (4), where "t[s]" represents the time, "τ[s]" represents each driving period of the PWM signal, "$τ_1$ [s]" represents the ON time that is a length of time for which the driving current (i(t)) is supplied to the linear solenoid SSLT in each driving period, "Pb[V]" represents the battery voltage, and "L(H)" represents the inductance. Thus, the transfer function, which is accurately linearized and approximated, is derived by the equations (3), (4) whereby the controlled variable is determined by calculations, so that it is possible to reduce the adapting steps.

Second Embodiment

Figure 31:
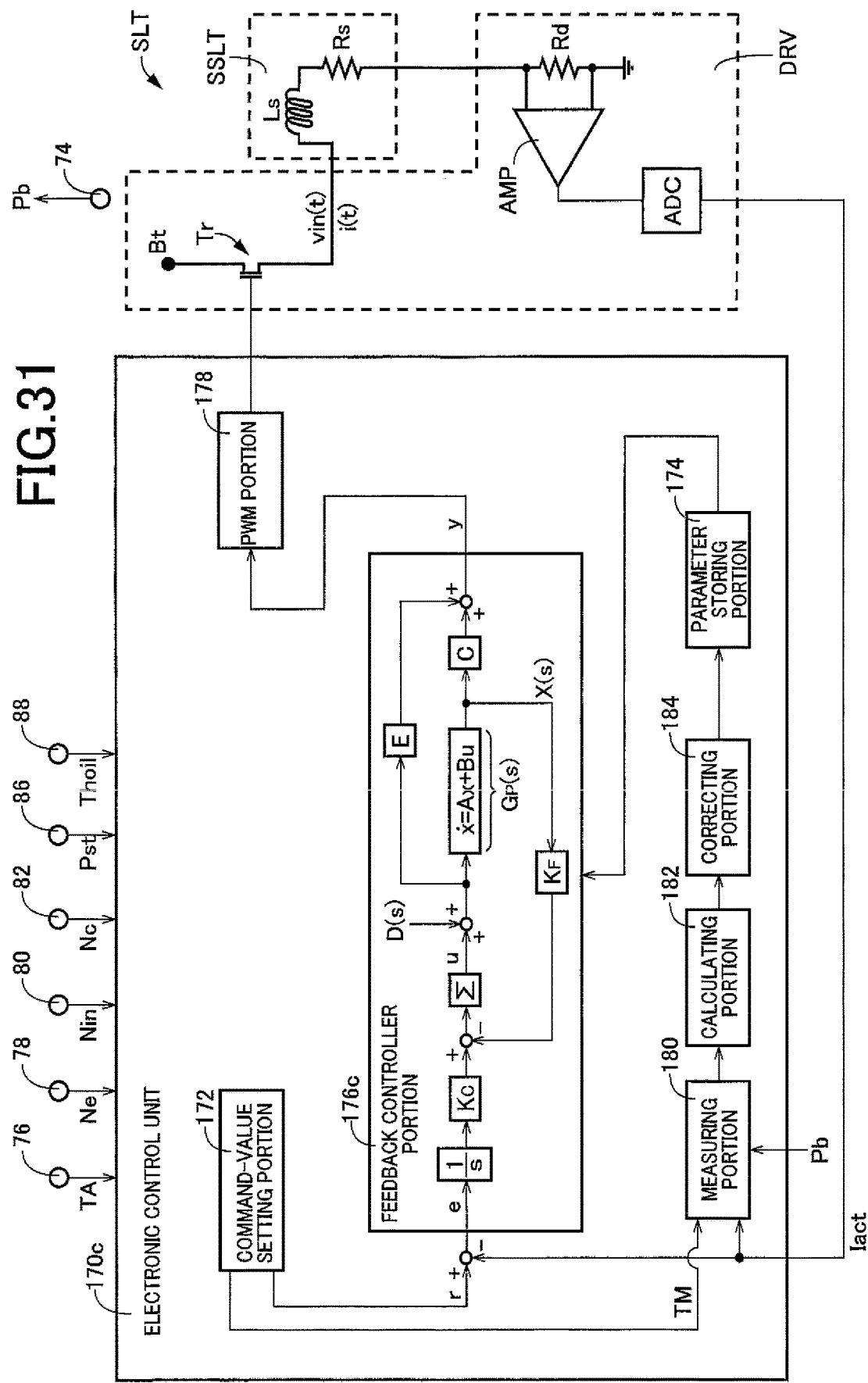
FIG. 31 is a functional block diagram showing the equivalent circuit of the linear solenoid and the drive circuit of the linear solenoid, which are shown in FIG. 4, and an electronic control unit for a linear solenoid, which is designed in accordance with the ILQ design method and is constructed according to an embodiment of the invention, for controlling parameter correction.

FIG. 31 is a functional block diagram showing the equivalent circuit of the linear solenoid SSLT and the drive circuit DRV of the linear solenoid SSLT, which are shown in FIG. 4, and an electronic control unit 170c for the linear solenoid SSLT, which is designed in accordance with the ILQ design method and is constructed according to this second embodiment of the invention, for controlling parameter correction. Although the electronic control unit 170c according to the second embodiment is substantially identical with the electronic control unit 170b according to the above-described first embodiment in terms of construction, the electronic control unit 170c is different from the electronic control unit 170b in that the parameters of the feedback control system are corrected depending on actual values of the resistance Rz and the inductance L of the electric circuit of the linear solenoid SSLT through which the driving current i(t) flows. Therefore, the differences will be mainly described, and the same reference signs as used in the above-described first embodiment will be used to identify the functionally corresponding elements, with descriptions thereof being omitted as needed. It is noted that the equivalent circuit of the linear solenoid SSLT and the drive circuit DRV of the linear solenoid SSLT, which are shown in FIG. 31, have been described with reference to FIG. 6, and descriptions thereof will not be provided.

The electronic control unit 170c includes, in addition to the above-described command-value setting portion 172, parameter storing portion 174, feedback controller portion 176c and PWM portion 178, a measuring portion 180, a calculating portion 182 and a correcting portion 184 that are provided for controlling the parameter correction. The electronic control unit 170c calculates actual values of the resistance Rz and the inductance L of the electric circuit of the linear solenoid SSLT through which the driving current i(t) flows, and corrects the parameters related to the feedback control. The electronic control unit 170c receives various input signals from various sensors provided in the vehicle, such as: the above-described output signal indicative of the throttle opening degree TA; output signal indicative of the engine rotational speed Ne; output signal indicative of the input-shaft rotational speed Nin; output signal indicative of the counter-shaft rotational speed Nc, i.e., the vehicle running speed Vc; output signal indicative of the operation position Pst of the shift lever 84; output signal indicative of the temperature Thoil of the working fluid in the hydraulic control unit 18; and an output signal which is supplied from a voltage sensor 74 configured to detect a battery voltage Pb at the terminal Bt and which is indicative of the battery voltage Pb.

The command-value setting portion 172 sets the current command value r(t) that represents the control target value in the form of the average value of the driving current i(t) of the linear solenoid SSLT, as described above. In control of correction of the parameters, the command-value setting portion 172 keeps outputting, to the feedback controller portion 176c, the current command value r(t) in the form of a certain current command value Rpd[A] for at least a given length Tpd[s] of time. It is preferable that the certain current command value Rpd is a value higher than a normal value of the current command value r(t) so that the resistance Rz and the inductance L can be accurately calculated. The command-value setting portion 172 outputs, to the measuring portion 180, a timer signal TM as an output start signal indicative of start of output of the current command value r(t). Further, when the given length Tpd[s] of time has elapsed after the start of output of the current command value Rpd, the command-value setting portion 172 outputs the timer signal TM as an output stop signal to the measuring portion 180. It is noted that the certain current command value Rpd is a value which is obtained by experimentation or determined by an appropriate design theory such that the driving current i(t) of the linear solenoid SSLT is converged when the given length Tpd of time elapses. Further, the given length Tpd of time is a length of time within which the instantaneous value of the driving current i(t) is converged in case of the certain current command value Rpd, and is obtained by experimentation or determined by an appropriate design theory, from the nominal values of the battery voltage Pb, resistance Rz, inductance L and the designed values of the driving period τ and ON time $τ_1$ of the drive transistor Tr, such that the driving current i(t) is converged within the given length Tpd of time even if actual values are changed from the above nominal value and designed values within expected ranges due to aging for years or under unusual temperature condition.

The parameter storing portion 174, feedback controller portion 176c and PWM portion 178 have the functions as described above with reference to FIG. 6.

When the output start signal in the form of the timer signal TM is supplied from the command-value setting portion 172 to the measuring portion 180, the measuring portion 180 obtains the battery voltage Pb from the voltage sensor 74, and obtains the current signal Iact from the A/D converter ADC. The measuring portion 180 measures the average Iave and minimum instantaneous current values Imin of the current signal Iact, from the obtained current signal Iact. The average Iave of the current signal Iact is measured, for example, by calculating a moving average of the current signal Iact for a length of time corresponding to the period τ[s] that represents each driving period τ of the PWM signal. The measured average Iave is updated. The minimum instantaneous current values Imin of the current signal Iact is measured, for example, by calculating a minimum value of the current signal Iact in each driving period τ of the PWM signal. The calculated minimum instantaneous current values Imin is updated. The measuring portion 180 obtains the ON time $τ_1$, OFF time $τ_2$ and driving period τ of the drive transistor Tr, for example, from the output y calculated by the feedback controller portion 176c and command values such as the PWM signal generated by the PWM portion 178. When the output stop signal in the form of the timer signal TM is supplied from the command-value setting portion 172 to the measuring portion 180, the measuring portion 180 determines the average Iave and the minimum instantaneous current values Imin, which the measuring portion 180 have measured and updated, as an average Iavec and a minimum instantaneous current value Iminc in the converged state, respectively. After having determined the average Iavec and the minimum instantaneous current value Iminc in the converged state, the measuring portion 180 outputs a command signal to the calculating portion 182.

When the command value is supplied from the measuring portion 180 to the calculating portion 182, the calculating portion 182 calculates the resistance Rz in accordance with the above-described equation (5) and calculates the inductance L in accordance with the above-described equation (6). After calculating the resistance Rz and the inductance L, the calculating portion 182 outputs a command signal to the correcting portion 184.

There will be described reasons why the resistance Rz is calculated in accordance with the equation (5) and the inductance L is calculated in accordance with the equation (6).

The converged driving current $a_\infty$, which is expressed by the above-described equation (30), is the average Iavec in the converged state, so that the equation (5) is derived by transforming the equation (30) to an equation regarding the resistance Rz.

Equation (90) regarding the minimum instantaneous current value Iminc in the converged state is established from the above-described equation (15) and a superposition principle. The equation (90) is transformed to equation (91) that is identical with the equation (6).

[Formulas 31]

$$Iminc = \frac{Pb}{Rz}(1-e^{-\frac{Rz}{L}\tau}) - \frac{Pb}{Rz}(1-e^{-\frac{Rz}{L}\tau_2}) + \\ \frac{Pb}{Rz}(1-e^{-\frac{Rz}{L}2\tau}) - \frac{Pb}{Rz}(1-e^{-\frac{Rz}{L}(\tau+\tau_2)}) + \\ \frac{Pb}{Rz}(1-e^{-\frac{Rz}{L}3\tau}) - \frac{Pb}{Rz}(1-e^{-\frac{Rz}{L}(2\tau+\tau_2)}) + \\ \frac{Pb}{Rz}(1-e^{-\frac{Rz}{L}4\tau}) - \frac{Pb}{Rz}(1-e^{-\frac{Rz}{L}(3\tau+\tau_2)}) + \\ \cdots \tag{90}$$

$$\begin{aligned} Iminc &= \frac{Pb}{Rz}\left[\left\{-\sum_{n=1}^{\infty}(e^{-\frac{Rz}{L}\tau})^n\right\} + \sum_{n=0}^{\infty}(e^{-\frac{Rz}{L}(n\tau+\tau_2)})\right] \\ &= \frac{Pb}{Rz}\left[\left\{1-\sum_{n=1}^{\infty}(e^{-\frac{Rz}{L}\tau})^{n-1}\right\} + e^{-\frac{Rz}{L}\tau_2}\cdot\sum_{n=1}^{\infty}(e^{-\frac{Rz}{L}\tau})^{n-1}\right] \\ &= \frac{Pb}{Rz}\left[1+(e^{-\frac{Rz}{L}\tau_2}-1)\cdot\sum_{n=1}^{\infty}(e^{-\frac{Rz}{L}\tau})^{n-1}\right] \\ &= \frac{Pb}{Rz}\left[1+(e^{-\frac{Rz}{L}\tau_2}-1)\cdot\frac{1-\left(e^{-\frac{Rz}{L}\tau}\right)^{\infty}}{1-e^{-\frac{Rz}{L}\tau}}\right] \\ &= \frac{Pb}{Rz}\cdot\frac{e^{-\frac{Rz}{L}\tau_2}-e^{-\frac{Rz}{L}\tau}}{1-e^{-\frac{Rz}{L}\tau}} \end{aligned} \tag{91}$$

Figure 32:
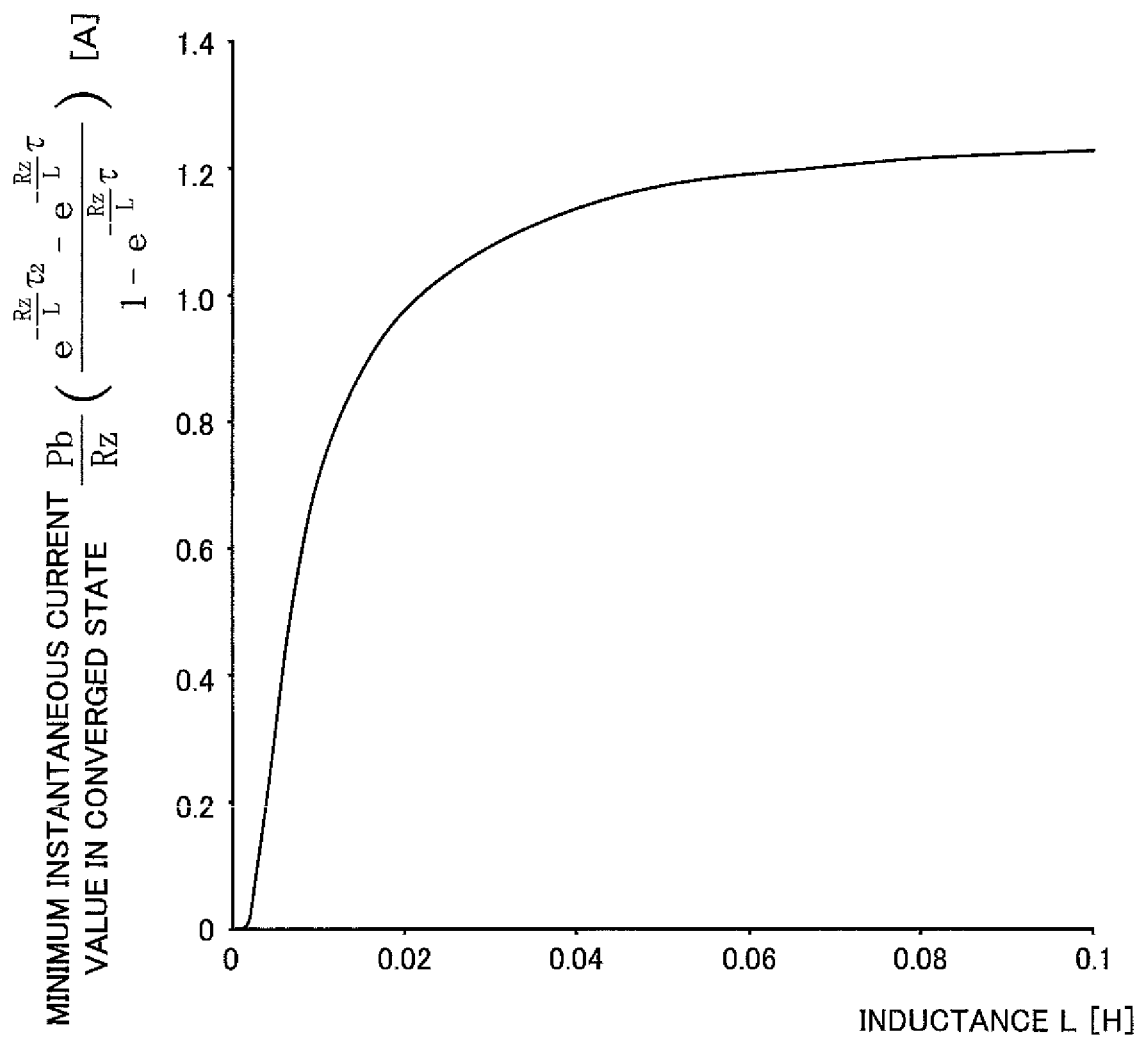
FIG. 32 is a view showing a relationship between an inductance of the electric circuit through which the driving current flows, and a minimum instantaneous current value.

By the way, the equation (6) is not formulated to an equation in which the inductance L is solved. FIG. 32 is a view showing a relationship between the inductance L of the electric circuit through which the driving current i(t) flows, and the minimum instantaneous current value Iminc in the converged state. FIG. 32 shows the relationship between the inductance L and the minimum instantaneous current value Iminc when the inductance L is in a range of 0-0.1[H], wherein the specification values are the battery voltage Pb=15 [V], the resistance Rz=5.8[Ω] {=5.3[Ω] (equivalent resistance Rs)+0.5[Ω] (detection resistance Rd)}, the driving period $\tau=1/3*10^{-2}$ [s] and the OFF time $\tau_2=\tau/2$ [s]. As is understood from FIG. 32, the minimum instantaneous current value Iminc is a monotonically increasing function of the inductance L. Therefore, the inductance L can be obtained through a convergence calculation using an iterative method such as Newton's method and binary search method.

When the output signal is supplied from the calculating portion 182 to the correcting portion 184, the correcting portion 184 corrects the parameters used in the feedback controller portion 176c, depending on the calculated resistance Rz and inductance L. The correcting portion 184 updates the parameters stored in the parameter storing portion 174, by rewriting them into the corrected ones, so that the feedback control is executed based on the corrected parameters in the feedback controller portion 176c.

Figure 33:
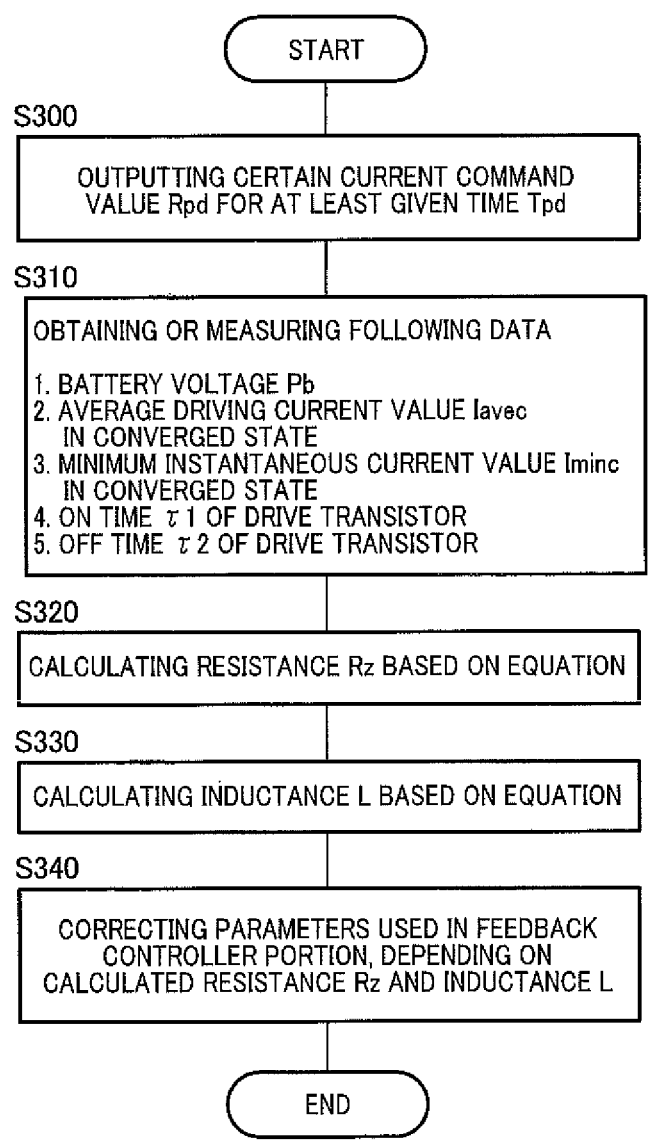
FIG. 33 is a flow chart showing a process for control of correction of the parameters in the electronic control unit shown in FIG. 31.

FIG. 33 is a flow chart showing a process for control of correction of the parameters in the electronic control unit 170c shown in FIG. 31. In the present embodiment, this process shown in the flow chart of FIG. 33 is started, for example, upon an inspection made during a process of manufacturing the hydraulic control unit 18 that is provided to control the automatic transmission 14. However, the process may be started, for example, when an inspection is made when the hydraulic control unit 18 including the linear solenoid SSLT is attached to the vehicle after having been repaired, when a total traveled distance of the vehicle exceeds a certain distance (e.g. 10,000 km) for checking aging, or when an unusual condition such as low or high temperature comes up. Since the process shown in the flow chart of FIG. 33 is completed in a short length of time such as 0.1 [s], the process is executed during a running state of the vehicle when the total traveled distance of the vehicle exceeds the certain distance, for example, such that the running is not affected even by supply of the driving current i(t) to the linear solenoid SSLT. The unusual condition is detected, for example, through the output signal which is supplied from the oil temperature sensor 88 which is indicative of the working-fluid temperature Thoil, for example, when the engine 10 is started after having been stropped for a large length of time in a cold area, or when the linear solenoid SSLT is heated to a high temperature by an increase of the working fluid which is caused by running of the vehicle on an uphill for a larger length of time.

The process is initiated with step S300 corresponding to function of the command-value setting portion 172, which is implemented to output the certain current command value Rpd as the current command value r(t) for at least a given length Tpd of time. Step S300 is followed by step S310.

At step S310 corresponding to function of the measuring portion 180, the battery voltage Pb, the average Iavec in the converged state, the minimum instantaneous current value Iminc in the converged state and the driving period $\tau$, ON time $\tau_1$ and OFF time $\tau_2$ of the drive transistor Tr are obtained or measured. Step S310 is followed by step S320.

At step S320 corresponding to function of the calculating portion 182, the resistance Rz is calculated in accordance with the equation (5). Step S320 is followed by step S330.

At step S330 corresponding to function of the calculating portion 182, the inductance L is calculated in accordance with the equation (6). Step S330 is followed by step S340.

At step S340 corresponding to function of the correcting portion 184, the parameters used in the feedback controller portion 176c are corrected based on the calculated resistance Rz and inductance L. The process shown in the flow chart of FIG. 33 is completed with the implementation of step S340.

In the electronic control unit 170b according to the second embodiment, the driving current i(t) supplied to the linear solenoid SSLT is controlled by the battery voltage Pb and the ON time $\tau_1$ and OFF time $\tau_2$ of the driving period $\tau$, wherein the resistance Rz[Ω] of the electric circuit of the linear solenoid SSLT, through which the driving current i(t) flows, is calculated in accordance with equation (5), and the inductance L[H] of the electric circuit is calculated in accordance with equation (6), where "Iavec[A]" represents the average value of the driving current i(t) in the converged state, and "Iminc[A]" represents the minimum instantaneous current value of the driving current i(t) in the converged state, and wherein the parameters are corrected depending on the resistance Rz[Ω] and the inductance L[H] that are calculated in accordance with the respective equations (5) and (6). Thus, the actual values of the resistance Rz and the inductance L even after aging for years after production of the vehicle or even under unusual condition such as low or high temperature can be calculated by the equations (5) and (6). Thus, even where the equivalent resistance Rs and the equivalent inductance Ls of the linear solenoid SSLT and the detection resistance Rd of the drive circuit DRV have been changed with aging for years after production of the vehicle or even where the equivalent resistance Rs, equivalent inductance Ls and detection resistance Rd are considerably different, under unusual condition such as low or high temperature, from in a normal condition, the feedback control of the linear solenoid SSLT can be executed such that the driving current i(t) is controlled to provide a high responsiveness without its fluctuation, without causing coupled vibration in the linear solenoid SSLT.

Third Embodiment

As described above, FIG. 1 shows also the construction of the hydraulic variable valve-timing apparatus 200 including the electronic control unit 270 according to this third embodiment of the invention. In the above-described first and second embodiments, the present invention is applied to the electronic control unit 170 of the linear solenoid SSLT of the hydraulic control unit 18 configured to control shifting actions of the automatic transmission 14. Unlike in the first and second embodiments, in the third embodiment, the invention is applied to the hydraulic variable valve-timing apparatus 200. The same reference signs as used in the above-described first and second embodiments will be used to identify the functionally corresponding elements, and descriptions thereof are omitted as needed.

The variable valve-timing apparatus 200 includes an intake cam shaft 204, a variable valve-timing mechanism 202 (VVT-i: Variable Valve Timing-intelligent), a hydraulic control unit 232 and the above-described electronic control unit 270.

The engine 10 includes intake valves 208 that are to be opened and closed at suitable timing with respective cams 206 being driven, so that a fuel-air mixture is drawn into respective cylinders of the engine 10 at given timing. Each of the cams 206 has, in its cross section, a generally egg shape that is defined by a circle having a smoothly protruded part. A rotary motion of each cam 206 is converted into a reciprocating motion of the corresponding intake valve 208, whereby the intake valve 208 is opened and closed. Where the engine 10 includes a plurality of cylinders, the intake cam shaft 204 is provided with the plurality of cams 206. A rotation of the crank shaft 26 is transmitted to a sprocket 220 that is rotatably held at an axis CL2, for example, via a sprocket 24 provided on the crank shaft 26 and a timing chain 212. A rotary member 210 is provided to be rotated at the same rotational speed as the sprocket 220. As described below, a rotational position or phase of the rotary member 210 relative to the sprocket 220 is adjustable. The intake cam shaft 204 and the rotary member 210 are fixed to each other, and are rotatably held at the axis CL2. Where the engine 10 is a four-cycle engine, each cam 206 is rotated once and the crank shaft 26 is rotated twice during four strokes (i.e., intake stroke, compression stroke, explosion stroke and exhaust stroke) of the engine 10, so that the sprocket 220 has a diameter twice as large as a diameter of the sprocket 24.

The variable valve-timing mechanism 202 includes the rotary member 210 fixed to an end portion of the intake cam shaft 204, and the sprocket 220 rotatably held in the end portion of the intake cam shaft 204. As described below, the variable valve-timing mechanism 202 is configured to adjust the rotational phase of the intake cam shaft 204 by a hydraulic pressure supplied from the hydraulic control unit 232, whereby opening/closing timing of the intake valves 208 of the engine 10 is adjusted.

Figure 34:
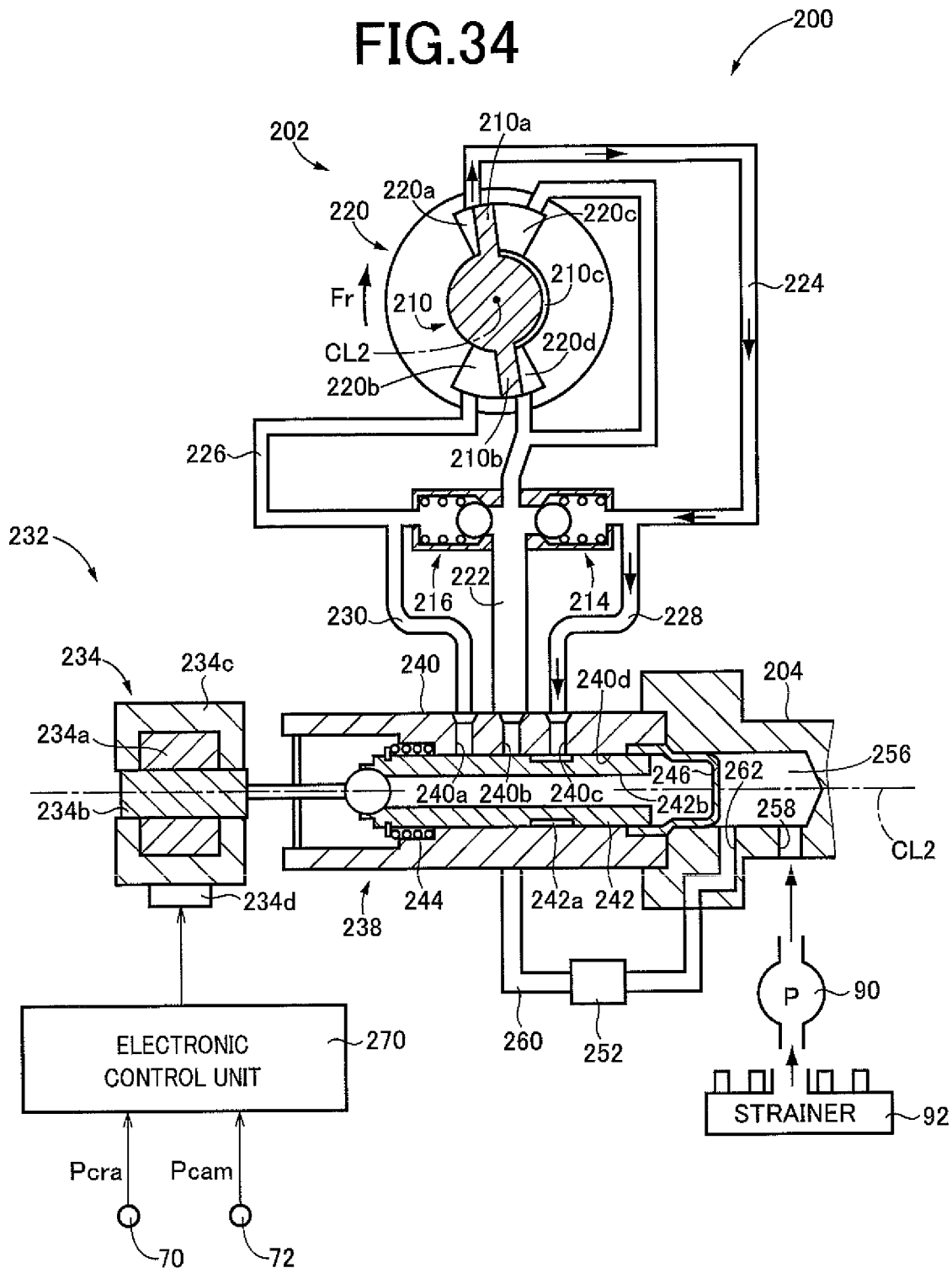
FIGS. 34-36 are views showing constructions of main portions of a variable valve-timing apparatus including an electronic control unit constructed according to another embodiment of the invention.
Figure 35:
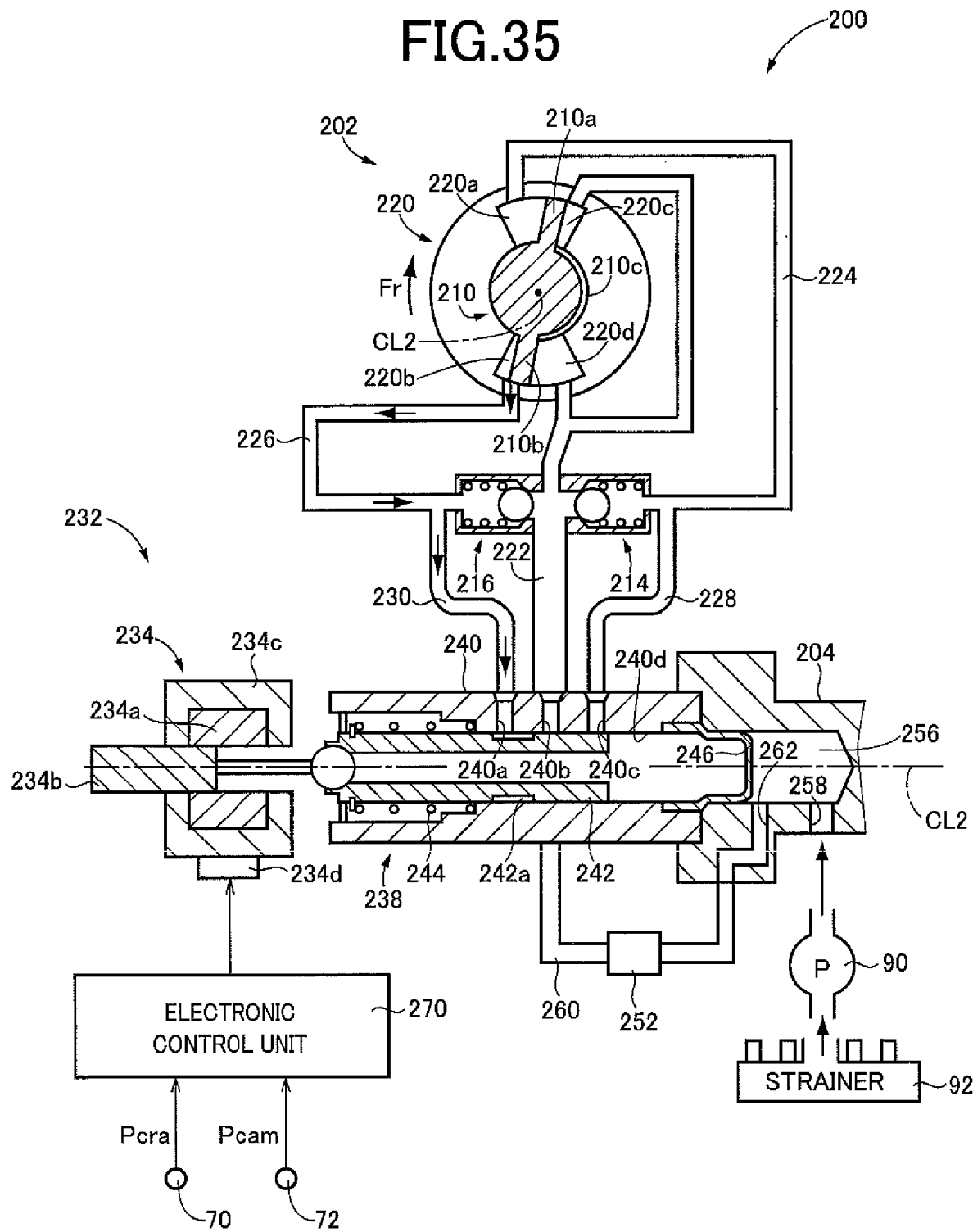
Figure 36:
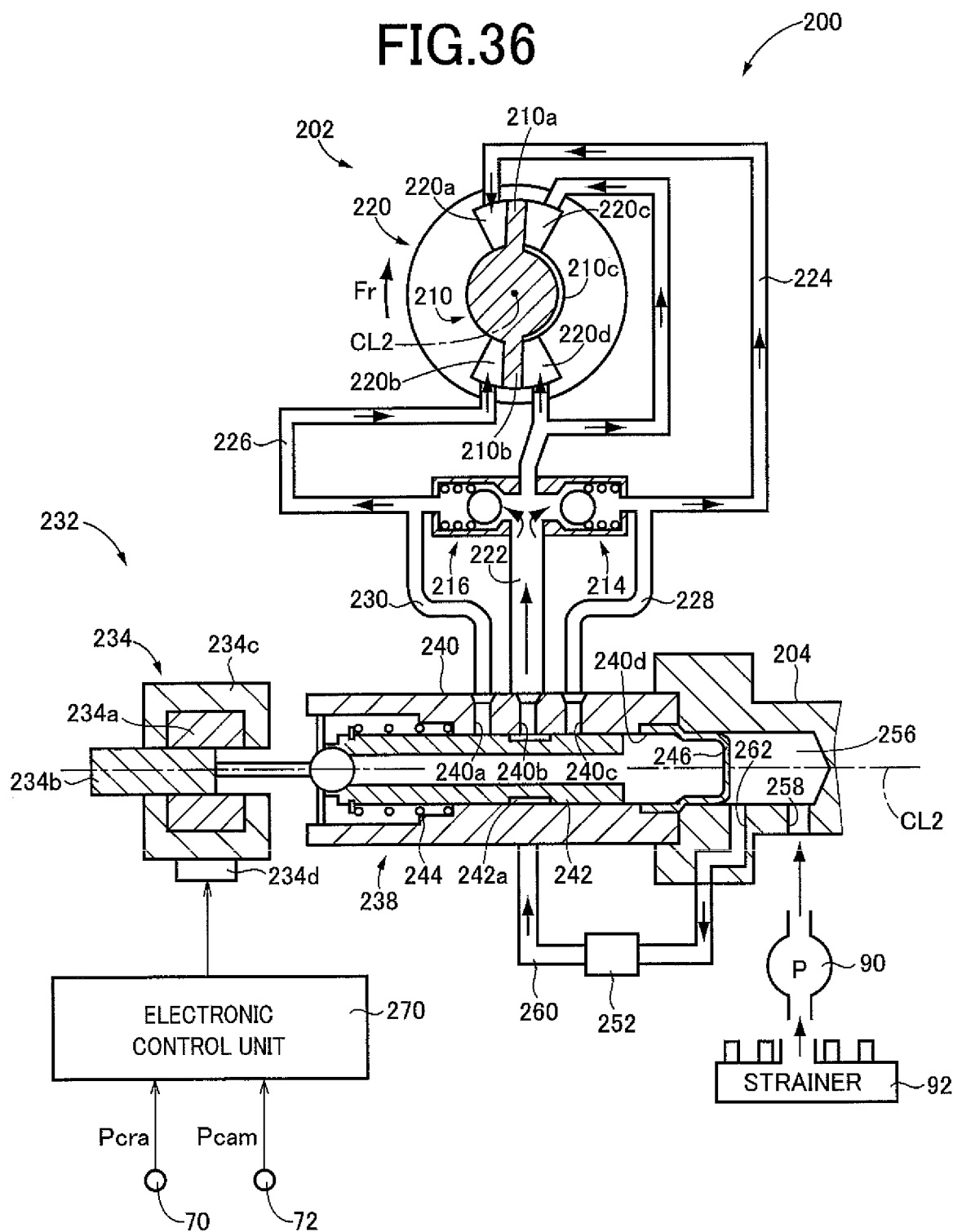

Each of FIGS. 34-36 is a view showing constructions of main portions of the variable valve-timing apparatus 200 including the electronic control unit 270 according to the third embodiment. In FIG. 34, a cross section of each of the sprocket 220 and the rotary member 210 as seen in a direction of the axis CL2 is shown, and a cross section of each of the intake cam shaft 204, a valve unit 238 (described below) and an actuator 234 (described below) as seen in the direction of the axis CL2 is also shown. FIG. 34 shows a case in which the rotational phase of the intake cam shaft 204 is adjusted to be delayed or retarded. The rotary member 210, which is fixed to the intake cam shaft 204, includes a pair of vane portions 210a, 210b that protrude radially outwardly from an outer circumferential surface of a cylindrical main body portion of the rotary member 210. The rotary member 210 is received inside a cylindrical core portion of the sprocket 220 in which an advance-side fluid chamber 220a, a retard-side fluid chamber 220b and fluid chambers 220c, 220d are defined. The advance-side fluid chamber 220a and the fluid chamber 220c are located in respective opposite sides of the vane portion 210a in a circumferential direction of the sprocket 220 such that the advance-side fluid chamber 220a is located on a rear side of the fluid chamber 220c in a rotation direction Fr of the sprocket 220. The retard-side fluid chamber 220b and the fluid chamber 220d are located in respective opposite sides of the vane portion 210b in the circumferential direction such that the retard-side fluid chamber 220b is located on a front side of the fluid chamber 220d in the rotation direction Fr. Each of the advance-side fluid chamber 220a, retard-side fluid chamber 220b and fluid chambers 220c, 220d is sealed by a sealing member so that a hydraulic pressure therein is maintained. The hydraulic pressure in each of these chambers 220a-220d is controlled by the hydraulic control unit 232, as described below.

The hydraulic control unit 232 includes, in addition to the above-described actuator 234 and valve unit 238, check valves 214, 216, a fluid supply passage 222, a fluid supply sub-passages 224, 226 and fluid discharge passages 228, 230. The actuator 234 includes a linear solenoid 234a, a pressing portion 234b, a solenoid housing 234c and a drive circuit portion 234d. In the actuator 234, the driving current i(t) of the linear solenoid 234a is controlled by the PWM signal supplied from the electronic control unit 270 to the drive circuit portion 234d, and the pressing portion 234b disposed in the solenoid housing 234c is moved, by a thrust based on a driving signal SD2 corresponding to the driving current i(t), in a direction of the axis CL2. The valve unit 238 includes a cylindrical main body 240, a spool valve body 242, a spring 244 and a bottom end portion 246. The spool valve body 242 is received in a through-hole 240d which is formed in the cylindrical main body 240 and which extends in the direction of the axis CL2, such that the spool valve body 242 is movable in the direction of the axis CL2. The spring 244 is held in the spool valve body 242 by means of a snap ring that is fixedly disposed on the spool valve body 242, such that the spool valve body 242 is constantly forced or biased by the spring 244 in a direction toward the actuator 234. With movement of the pressing portion 234b of the actuator 234 in the direction of the axis CL2, the spool valve body 242, which is disposed in the cylindrical main body 240, is moved in the direction of the axis CL2. Depending on a position of the spool valve body 242 relative to the cylindrical main body 240 in the direction of the axis CL2, the working fluid is selectively supplied and discharged through the fluid supply passage 222, fluid supply sub-passages 224, 226 and fluid discharge passages 228, 230. Thus, an output pressure PW1, which is to be supplied from the valve unit 238 to the fluid supply passage 222, an output pressure PW2, which is to be supplied from the valve unit 238 to the fluid discharge passage 228, and an output pressure PW3, which is to be supplied from the valve unit 238 to the fluid discharge passage 230, are controlled, whereby the working fluid is supplied to or discharged from the advance-side fluid chamber 220a, retard-side fluid chamber 220b and fluid chambers 220c, 220d. It is noted that each of the output pressures PW1, PW2, PW3 corresponds to "signal pressure" which is recited in the appended claims, and which serves as a high pressure by which the working fluid or as a discharging pressure by which the working fluid is discharged.

Like the electronic control unit 170 according to the above-described first embodiment, the electronic control unit 270 includes a so-called microcomputer, and is configured to control the variable valve-timing apparatus 200, by causing the CPU to process various input signals, according to control programs stored in the ROM, while utilizing a temporary data-storage function of the RAM. The electronic control unit 270 corresponds to "control apparatus" recited in the appended claims.

The electronic control unit 270 receives an output signal which is supplied from a crank position sensor 70 configured to detect a rotation angle of the crank shaft 26 and which is indicative of a crank-shaft rotation angle Pcra[rad] corresponding to the rotation angle of the crank shaft 26, and an output signal which is supplied from a cam position sensor 72 configured to detect a rotation angle of the intake cam shaft 204 and which is indicative of a cam rotation angle Pcam[rad] corresponding to the rotation angle of the intake cam shaft 204. The electronic control unit 270 outputs the PWM signal to the drive circuit portion 234d of the actuator 234, as described above.

The electronic control unit 270 has substantially the same control functions as those of the electronic control unit 170b according to the above-described first embodiment, which is described with reference to the functional block diagram of FIG. 6. The linear solenoid 234a of the actuator 234 has an equivalent circuit which is identical with that of the linear solenoid SSLT in the first embodiment and which is expressed by the RL series circuit constituted by the equivalent inductance Ls and the equivalent resistance Rs. The drive circuit portion 234d of the actuator 234 has an equivalent circuit which is identical with the drive circuit DRV in the first embodiment and which is constituted by the terminal Bt (to which the battery voltage Pb is supplied), drive transistor Tr, detection resistance Rd, operational amplifier AMP and A/D converter ADC.

In FIG. 34, arrow Fr indicates a direction of rotation of the sprocket 220, which is to be made when rotation of the crank shaft 26 is transmitted to the sprocket 220 via the sprocket 24 and the timing chain 212. The driving current i(t) flowing through the linear solenoid 234a is controlled by the PWM signal outputted from the electronic control unit 270, whereby the pressing portion 234b of the actuator 234 is moved against a biasing force of the spring 244 so as to be positioned in such a position that brings a discharge hole 242a into communication with a fluid hole 240c. In this instance, the working fluid from the advance-side fluid chamber 220a of the sprocket 220 is caused to flow in a direction indicated by arrows through the fluid supply sub-passage 224, fluid discharge passage 228, fluid hole 240c and discharge hole 242a, and is discharged to a fluid passage 242b which is formed in the spool valve body 242 and which extends in the direction of the direction of the axis CL2.

Thus, with the sprocket 220 being forced to be rotated in the direction of arrow Fr, the working fluid in the advance-side fluid chamber 220a is discharged by the vane portion 210a, and the working fluid in the fluid chamber 220d is caused to flow into the fluid chamber 220c via a groove 210c, thereby causing the rotary member 210 to be rotated in a direction opposite to the direction of arrow Fr. Consequently, the rotational phase of the intake cam shaft 204 connected to the rotary member 210 is delayed or retarded relative to the rotational phase of the sprocket 220 that is mechanically associated with the crank shaft 26, whereby the opening/closing timing of the intake valves 208 is delayed or retarded.

FIG. 35 is a view showing the construction of the main portions of the variable valve-timing apparatus 200 including the electronic control unit 270, in a case in which the rotational phase of the intake cam shaft 204 is adjusted to be advanced. The supply of the PWM signal from the electronic control unit 270 to the drive circuit portion 234d is stopped whereby the actuator 234 is controlled such that the driving current i(t) is not supplied to the linear solenoid 234a. With the driving current i(t) being not supplied to the linear solenoid 234a, the spool valve body 242 disposed in the cylindrical main body 240 is moved, by the biasing force of the spring 244, in the direction of the direction of the axis CL2 in the valve unit 238. Thus, the spool valve body 242 is positioned in such a position that brings the discharge hole 242a of the spool valve body 242 into communication with a fluid hole 240a. In this instance, the working fluid from the retard-side fluid chamber 220b of the sprocket 220 is caused to flow in a direction indicated by arrows through the fluid supply sub-passage 226, fluid discharge passage 230, fluid hole 240a and discharge hole 242a, and is discharged to the fluid passage 242b.

Thus, with the sprocket 220 being forced to be rotated in a direction opposite to the direction of arrow Fr, the working fluid in the retard-side fluid chamber 220b is discharged by the vane portion 210b, and the working fluid in the fluid chamber 220c is caused to flow into the fluid chamber 220d via the groove 210c, thereby causing the rotary member 210 to be rotated in the direction of arrow Fr. Consequently, the rotational phase of the intake cam shaft 204 connected to the rotary member 210 is advanced relative to the rotational phase of the sprocket 220 that is mechanically associated with the crank shaft 26, whereby the opening/closing timing of the intake valves 208 is advanced.

FIG. 36 is a view showing the construction of the main portions of the variable valve-timing apparatus 200 including the electronic control unit 270, in a case in which the rotational phase of the intake cam shaft 204 is adjusted to be maintained. When the cam rotation angle Pcam becomes a target angle, the spool valve body 242 is moved by movement of the pressing portion 234*b* of the actuator 234 which is made by the PWM signal outputted to the drive circuit portion 234*d* from the electronic control unit 270, and the spool valve body 242 is positioned in such a position that brings the discharge hole 242*a* of the spool valve body 242 into communication with a fluid hole 240*b*, while isolating the discharge hole 242*a* from the fluid holes 240*a*, 240*c*, so that the working fluid is not discharged from the fluid discharge passages 228, 230 to the fluid passage 242*b*. In this instance, the working fluid in the advance-side fluid chamber 220*a* and the working fluid in the retard-side fluid chamber 220*b* are not discharged since the fluid holes 240*a*, 240*c* are closed by the spool valve body 242, while the fluid chambers 220*c*, 220*d* are filled with the working fluid that is supplied to the fluid chambers 220*c*, 220*d* through the fluid supply passage 222. Further, the working fluid in the fluid supply passage 222 is supplied to the advance-side fluid chamber 220*a* and the retard-side fluid chamber 220*b*, through the check valves 214, 216 and the fluid supply sub-passage 224, 226. Consequently, the rotational phase of the intake cam shaft 204 connected to the rotary member 210 relative to the rotational phase of the sprocket 220 that is mechanically associated with the crank shaft 26, whereby the opening/closing timing of the intake valves 208 is determined. It is noted that the working fluid is supplied to the fluid supply passage 222 from the hydraulic pump 90 via a fluid hole 258, a fluid chamber 256 that is provided in an end portion of the intake cam shaft 204, a fluid hole 262, a check valve 252, a fluid passage 260 and the above-described fluid hole 240*b*.

The feedback control, which is executed by the electronic control unit 270 for the drive circuit portion 234*d* is substantially the same as the feedback control executed by the electronic control unit 170*b* for the drive circuit DRV in the above-described first embodiment. That is, the PWM signal corresponding to the current command value r(t) is supplied from the electronic control unit 270 to the drive circuit portion 234*d*, and the current signal Iact representing the driving current i(t) actually supplied from the drive circuit portion 234*d* to the linear solenoid 234*a*, is received by the electronic control unit 270. The electronic control unit 270 executes the feedback control with use of the feedback control system having the parameters that are determined in substantially the same manner as in the above-described first embodiment.

In the electronic control unit 270 according to the third embodiment, the linear solenoid 234*a* is provided in the actuator 234, wherein, in the hydraulic control unit 232 for controlling the variable valve-timing mechanism 202 configured to adjust the opening/closing timing of the intake valves 208 of the engine 10, the valve unit 238 of the hydraulic control unit 232 is caused to supply, to the variable valve-timing mechanism 202, the output pressures PW1, PW2, PW3 each of which corresponds to the signal pressure whose magnitude corresponds to the driving current i(t) that is determined through the feedback control, for generating the hydraulic pressure for adjusting the opening/closing timing. Owing to this arrangement, the signal pressure, which is supplied from the valve unit 238 to the variable valve-timing mechanism 202, can be controlled to provide a high responsiveness without its fluctuation, whereby the adjustment of the opening/closing timing by the variable valve-timing mechanism 202 can be also controlled to provide a high responsiveness without its vibration.

While the preferred embodiments of this invention have been described in detail by reference to the drawings, it is to be understood that the invention may be otherwise embodied.

In the above-described second embodiment, the parameters of the feedback control system are corrected only based on the calculated resistance Rz and inductance L of the electric circuit through which the driving current i(t) flows. For example, the parameters of the feedback control system may be corrected based on the calculated values of the resistance Rz and the inductance L and also the nominal values of the resistance Rz and the inductance L. In this modification, a weighting may be given to the nominal value and the calculated value, for example, such that a weighting ratio of 7:3 is given to the nominal value and the calculated value whereby the parameters of the feedback control system is corrected based on a value corresponding to (0.7*nominal value+0.3*calculated value) of the resistance Rz and a value corresponding to (0.7*nominal value+ 0.3*calculated value) of the inductance L. In this modification, even if the calculated value is erroneously deviated from the actual value, the nominal value that is given the higher weighting is reflected largely on the correction of the parameters, so that the feedback control is satisfactorily executed. Further, in the electronic control unit 270 according to the above-described third embodiment, too, the correction of the parameters of the feedback control system may be made based on the actual values of the resistance Rz and the inductance L of the electric circuit through which the driving current i(t) flows, as in the second embodiment.

In the above-described first and second embodiments, the linear solenoid SSLT, which is controlled in accordance with the principle of the present invention, is provided for the linear solenoid valve SLT configured to supply the control hydraulic pressure PS as the signal pressure to the line-pressure regulator valve 110 for controlling the line pressure PL generated by the line-pressure regulator valve 110 in the hydraulic control unit 18 of the automatic transmission 14. However, the linear solenoid, which is to be controlled by the principle of the present invention, may be, for example, a linear solenoid provided for each of the first electromagnetic opening/closing valve SV1 and second electromagnetic opening/closing valve SV2 that are linear solenoid valves configured to control the clutches C1, C2, C3 and brakes B1, B2, B3 of the hydraulic control unit 18 as the hydraulic friction engagement devices operated to establish the gear positions in the automatic transmission 14. For example, each of the first and second electromagnetic opening/closing valves SV1, SV2 has substantially the same construction as the linear solenoid valve SLT in the above-described first embodiment, so that output pressures PV1, PV2 whose magnitudes correspond to the driving current i(t) flowing through the linear solenoid provided for each of the first and second electromagnetic opening/closing valves SV1, SV2, are outputted from the respective first and second electromagnetic opening/closing valves SV1, SV2. In this modification, each of the output pressures PV1, PV2 of the respective first and second electromagnetic opening/closing valves SV1, SV2 corresponds to "signal pressure" recited in the appended claims. In this modification, the output pressures PV1, PV2 of the first and second electromagnetic opening/closing valves SV1, SV2 is controlled to provide a high responsiveness without vibration thereof, whereby engaging and releasing actions of each of the hydraulic friction engagement devices can be also controlled to provide a high responsiveness without its vibration.

In the above-described third embodiment, the opening/closing timing of the intake valves 208 is controlled by controlling the linear solenoid 234a by the electronic control unit 270. However, in place of or in addition to the intake valves 208, exhaust valves of the engine 10 may be controlled In the above-described embodiments, the ILQ design method is used for reducing the adapting steps, reducing the coupled vibration and establishing a high responsiveness. However, as long as a high priority is not necessarily given to the establishment of a high responsiveness, the feedback controller portion may be designed in accordance with, in place of the ILQ design method, other design method or control theory such as the method according to the above-describe comparative example, a LQ design method (Linear Quadratic Design method), a SPR (Strictly Positive Real) controller, a sliding mode control and a PID control. In this case, too, the transfer function, which is accurately linearized and approximated, is derived so that it is possible to reduce the adapting steps of adapting the parameters for each of various levels of the state value such as the power supply voltage, which is the responsiveness factor.

It is to be understood that the embodiments described above are given for illustrative purpose only, and that the present invention may be embodied with various modifications and improvements which may occur to those skilled in the art.

NOMENCLATURE OF ELEMENTS

10: vehicle engine
14: vehicle automatic transmission
18: hydraulic control unit
110: line-pressure regulator valve
170: 170a, 170b, 170c: electronic control unit (control apparatus)
202: variable valve-timing mechanism
208: intake valve (valve)
232: hydraulic control unit
234: actuator
234a: linear solenoid
270: electronic control unit (control apparatus)
B1-B3: brakes (hydraulic friction engagement devices)
C1-C3: clutches (hydraulic friction engagement devices)
d: disturbance
$G_{yd}(s)$: transfer function
i(t): driving current
$i(n\tau)$, Iave, Iavec: average driving current (controlled variable)
Iminc: minimum instantaneous current values
K: gain (parameter)
L: inductance
Pb: battery voltage
PL: line pressure
PS: control hydraulic pressure (signal pressure)
PV1, PV2: output pressure (signal pressure)
PW1, PW2, PW3: output pressure (signal pressure)
Rz: resistance
SLT, SV1, SV2: linear solenoid valve
SSLT: linear solenoid
t: time
vin(t): input voltage
y: output
Σ: positive definite matrix (parameter)
τ: driving period
$\tau_1$: ON time
$\tau_2$: OFF time

What is claimed is:

1. A control apparatus comprising:
a processor programmed to:
    approximate an electric circuit of a linear solenoid, through which a driving current flows, by a series circuit of a resistance and an inductance;
    formulate a circuit equation related to an instantaneous value of the driving current flowing through the series circuit;
    formulate an equation related to a controlled variable for controlling the driving current;
    derive a recurrence equation from the equation related to the controlled variable;
    solve the recurrence equation;
    linearize the solved recurrence equation by an approximation equation;
    derive, by an Inverse Linear Quadratic (ILQ) design method, a transfer function of a feedback control from the recurrence equation that has been linearized and solved,
    wherein the transfer function is derived from the linearized equation related to the controlled variable, and is used to determine the controlled variable, and
    execute the feedback control with a feedback control system having parameters that are determined by using the ILQ design method, and which are applied to the derived transfer function,
    wherein a gain of the transfer function is a ratio of an output to a disturbance in the feedback control system, and the gain is lower than 0 throughout all frequency ranges, and
    control, by the feedback control, the linear solenoid by controlling the driving current supplied to the linear solenoid.

2. The control apparatus according to claim 1,
wherein the linear solenoid is provided in a linear solenoid valve, and
wherein the linear solenoid valve is configured to output a signal pressure whose magnitude corresponds to the driving current that is determined through the feedback control.

3. The control apparatus according to claim 2,
wherein, in a hydraulic control unit of a vehicle automatic transmission, the linear solenoid valve is configured to supply the signal pressure to a line-pressure regulator valve for controlling a line pressure generated by the line-pressure regulator valve.

4. The control apparatus according to claim 2,
wherein, in a hydraulic control unit of a vehicle automatic transmission, the linear solenoid valve is configured to supply the signal pressure to hydraulic friction engagement devices for controlling the hydraulic friction engagement devices that are operated to establish gear positions in the vehicle automatic transmission.

5. The control apparatus according to claim 1,
wherein the linear solenoid is provided in an actuator, and
wherein, in a hydraulic control unit for controlling a variable valve-timing mechanism configured to adjust opening/closing timing of valves of a vehicle engine, the actuator is configured to supply, to the variable valve-timing mechanism, a signal pressure whose magnitude corresponds to the driving current that is determined through the feedback control, for generating hydraulic pressure for adjusting the opening/closing timing.

6. The control apparatus according to claim 1, wherein the driving current supplied to the linear solenoid is controlled by an input voltage that is obtained by causing a battery voltage to be subjected to an ON-OFF control based on a PWM signal.

7. The control apparatus according to claim 6, wherein the circuit equation is formulated as the following equation:

$$\frac{di(t)}{dt} Ls + Rs \cdot i(t) + Rd \cdot i(t) = u(t);$$

the equation related to the controlled variable that is an average value of the driving current in an n-th period, where n is a natural number, is formulated as the following equation:

$$\bar{i}(n\tau) = \frac{\int_{(n-1)\tau}^{n\tau} i(t)dt}{\tau};$$

the recurrence equation is formulated as the following equation:

$$\bar{i}(n\tau) = \frac{Pb}{\tau} \left\{ \frac{L}{R_z^2} \left(1 - e^{\frac{R_z}{L}\tau_1}\right)\left(1 - e^{\frac{R_z}{L}\tau}\right) \right\} \left(e^{\frac{R_z}{L}\tau}\right)^n + \bar{i}((n-1)\tau);$$

and the approximation equation is formulated as the following equation:

$$\frac{\left(e^{\frac{R_z}{L}\tau_1} - 1\right)}{\tau} \doteq \frac{\tau_1}{\tau^2}\left(e^{\frac{R_z}{L}\tau_1} - 1\right);$$

wherein t represents a time, $\tau$ represents each driving period of the PWM signal, $\tau_1$ represents an ON time that is a length of time for which the driving current (i(t)) is supplied to the linear solenoid in each driving period, Pb represents the battery voltage, and L represents the inductance.

8. The control apparatus according to claim 1, wherein the driving current supplied to the linear solenoid is controlled by an input voltage that is obtained by causing a battery voltage to be subjected to an ON-OFF control based on a PWM signal, wherein a resistance Rz of an electric circuit of the linear solenoid, through which the driving current flows, is calculated in accordance with a first equation:

$$Rz = \frac{\tau_1}{\tau} \cdot \frac{Pb}{Iavec};$$

wherein an inductance L of the electric circuit is calculated in accordance with a second equation:

$$Iminc = \frac{Pb}{Rz} \cdot \frac{e^{-\frac{Rz}{L}\tau_2} - e^{-\frac{Rz}{L}\tau}}{1 - e^{-\frac{Rz}{L}\tau}};$$

wherein $\tau$ represents each driving period of the PWM signal, $\tau_1$ represents an ON time that is a length of time for which the driving current is supplied to the linear solenoid in each driving period, $\tau_2$ represents an OFF time that is a length of time for which the driving current is not supplied to the linear solenoid in each driving period, Pb represents the battery voltage, Iavec represents an average value of the driving current in a converged state, and Iminc represents a minimum instantaneous current value of the driving current in the converged state, and wherein the parameters are corrected depending on the resistance Rz and the inductance L that are calculated in accordance with the respective first and second equations.

* * * * *